(12) United States Patent
Touma et al.

(10) Patent No.: US 10,076,839 B2
(45) Date of Patent: Sep. 18, 2018

(54) ROBOT OPERATION APPARATUS, ROBOT SYSTEM, AND ROBOT OPERATION PROGRAM

(71) Applicant: DENSO WAVE INCORPORATED, Chita-gun, Aichi-pref. (JP)

(72) Inventors: Hirota Touma, Kariya (JP); Daisuke Kawase, Konan (JP); Akira Ogawa, Kariya (JP); Daisuke Yui, Chiryu (JP); Motoki Kanada, Toyohashi (JP); Yoshinobu Ohashi, Nagoya (JP); Atsuko Sugano, Kariya (JP); Satoshi Ide, Chita (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 48 days.

(21) Appl. No.: 15/023,622

(22) PCT Filed: Sep. 19, 2014

(86) PCT No.: PCT/JP2014/074891
§ 371 (c)(1),
(2) Date: Mar. 21, 2016

(87) PCT Pub. No.: WO2015/041332
PCT Pub. Date: Mar. 26, 2015

(65) Prior Publication Data
US 2016/0229052 A1 Aug. 11, 2016

(30) Foreign Application Priority Data

Sep. 20, 2013 (JP) .................................. 2013-195423
Aug. 29, 2014 (JP) .................................. 2014-175753

(51) Int. Cl.
*B25J 13/06* (2006.01)
*B25J 9/16* (2006.01)
(Continued)

(52) U.S. Cl.
CPC ............. *B25J 9/161* (2013.01); *B25J 9/1658* (2013.01); *B25J 13/06* (2013.01); *G05B 19/409* (2013.01);
(Continued)

(58) Field of Classification Search
CPC .. G06F 3/04847; G06F 3/0412; G06F 3/0486; G06F 3/04883; B25J 9/1656; B25J 13/06; G05B 19/409
See application file for complete search history.

(56) References Cited

U.S. PATENT DOCUMENTS

| 6,088,628 A * | 7/2000 | Watanabe | B25J 9/1656 |
|  |  |  | 700/251 |
| 2009/0292390 A1* | 11/2009 | Friedrich | G05B 19/409 |
|  |  |  | 700/180 |

(Continued)

FOREIGN PATENT DOCUMENTS

| JP | H11-262883 A | 9/1999 |
| JP | 2001-306247 A | 11/2001 |

(Continued)

OTHER PUBLICATIONS

Nov. 25, 2014 International Search Report issued in International Patent Application No. PCT/JP2014/074891.
(Continued)

Primary Examiner — Patrick Hewey Mackey
(74) Attorney, Agent, or Firm — Oliff PLC

(57) ABSTRACT

A robot operation apparatus includes touch panel, touch operation detecting unit, action command generating unit, and selection operation detecting unit. The action command generating unit is capable of performing an operation determining process and an action command generating process. The operation determining process is a process for determining a drive axis or an action mode of a robot to be operated based on the selection operation detected by the selection operation detecting unit, and when a touch operation detected by the touch operation detecting unit is a drag operation, determining a movement amount of the drag operation. The action command generating process is a process for determining a movement amount of the robot (Continued)

based on the movement amount determined by in the operation determining process, and generating an action command for moving the robot at the drive axis or in the action mode to be operated by the movement amount.

25 Claims, 49 Drawing Sheets

(51) Int. Cl.
*G06F 3/0488* (2013.01)
*G05B 19/409* (2006.01)

(52) U.S. Cl.
CPC ............ *G06F 3/04883* (2013.01); *G05B 2219/36168* (2013.01); *G05B 2219/40392* (2013.01); *G06F 2203/04808* (2013.01)

(56) References Cited

U.S. PATENT DOCUMENTS

| | | |
|---|---|---|
| 2010/0305758 A1 | 12/2010 | Nishi et al. |
| 2012/0127102 A1 | 5/2012 | Uenohara et al. |
| 2012/0287067 A1 | 11/2012 | Ikegami |
| 2013/0234936 A1 | 9/2013 | Urakawa |
| 2014/0236565 A1* | 8/2014 | Kuwahara ............ B25J 9/1671 703/22 |
| 2015/0057804 A1 | 2/2015 | Som |
| 2015/0190925 A1* | 7/2015 | Hoffman ................ B25J 9/161 700/257 |

FOREIGN PATENT DOCUMENTS

| | | |
|---|---|---|
| JP | 2006-142480 A | 6/2006 |
| JP | 2008-084158 A | 4/2008 |
| JP | 2009-142941 A | 7/2009 |
| JP | 2010-277425 A | 12/2010 |
| JP | 2011-028603 A | 2/2011 |
| JP | 2012-113389 A | 6/2012 |
| JP | 2012-238124 A | 12/2012 |
| JP | 2013-154410 A | 8/2013 |
| JP | 2013-186874 A | 9/2013 |
| WO | 2012/062374 A1 | 5/2012 |
| WO | WO-2012062374 A1 * | 5/2012 ............. B25J 13/06 |

OTHER PUBLICATIONS

Niederhuber, Christoph, "Operating Panel: Multi-touch Technology Combined with Haptic Elements," Fertigungs- & Maschinenautomation, pp. 1-3.

* cited by examiner

FIG.3
| TYPE OF ACTION | OPERATING METHOD | |
|---|---|---|
| (1) X-Y PLANE MOVEMENT ACTION (PLANAR ACTION) | DRAG OPERATION BY SINGLE FINGER |  |
| (2) VERTICAL MOVEMENT ACTION (Z-AXIS ACTION) | DRAG OPERATION BY TWO FINGERS (OPEN/CLOSE) | 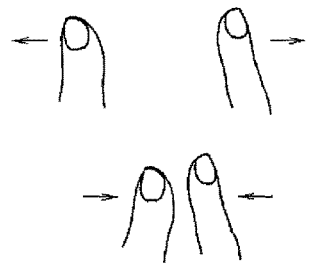 |
| (3) ROTATION ACTION (Rz-AXIS ACTION) | DRAG OPERATION BY TWO FINGERS (ROTATE) |  |

FIG.15

| TYPE OF ACTION | OPERATING METHOD | |
|---|---|---|
| (1) X-Y PLANE MOVEMENT ACTION | DRAG OPERATION BY SINGLE FINGER | |
| (2) VERTICAL MOVEMENT ACTION (Z-AXIS ACTION) | DRAG OPERATION BY TWO FINGERS IN VERTICAL DIRECTION | |
| (3) ROTATION ACTION (Rz-AXIS ACTION) | DRAG OPERATION BY TWO FINGERS IN LATERAL DIRECTION | (A) (OR) (B) |

FIG.16
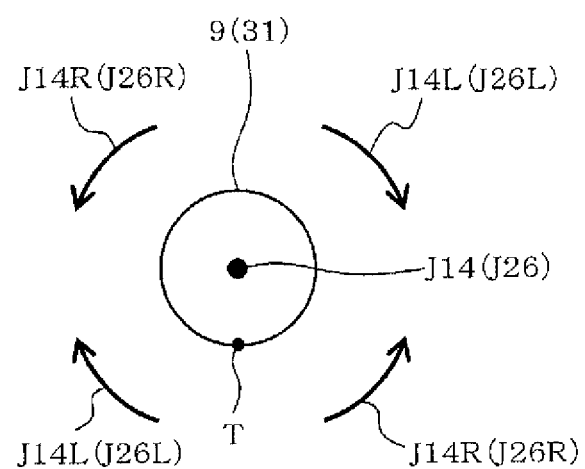
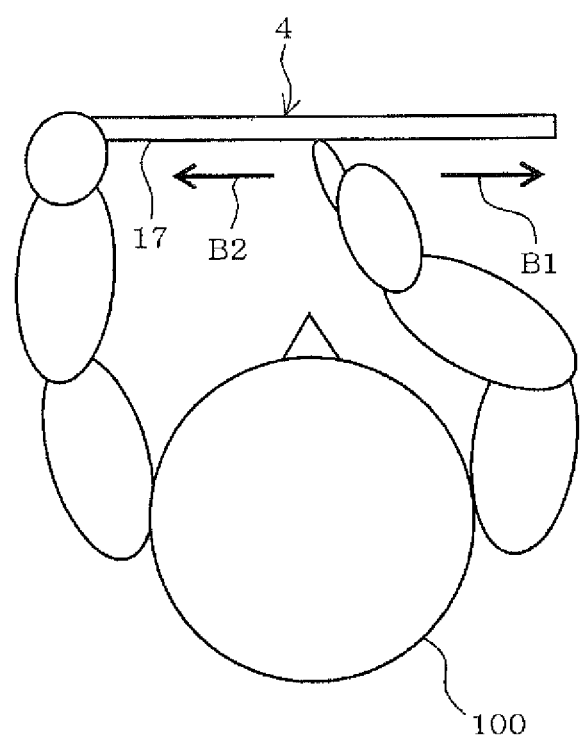

FIG.19
| DRIVE AXIS | OPERATING METHOD | |
|---|---|---|
| (1) FIRST AXIS | DRAG OPERATION BY SINGLE FINGER IN LATERAL DIRECTION | 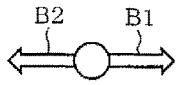 |
| (2) SECOND AXIS | DRAG OPERATION BY TWO FINGERS IN LATERAL DIRECTION | 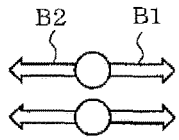 |
| (3) THIRD AXIS | DRAG OPERATION BY SINGLE FINGER IN VERTICAL DIRECTION | 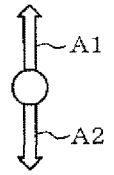 |
| (4) FOURTH AXIS | DRAG OPERATION BY THREE FINGERS IN LATERAL DIRECTION | 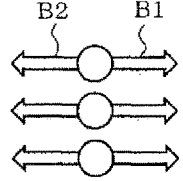 |

FIG.20
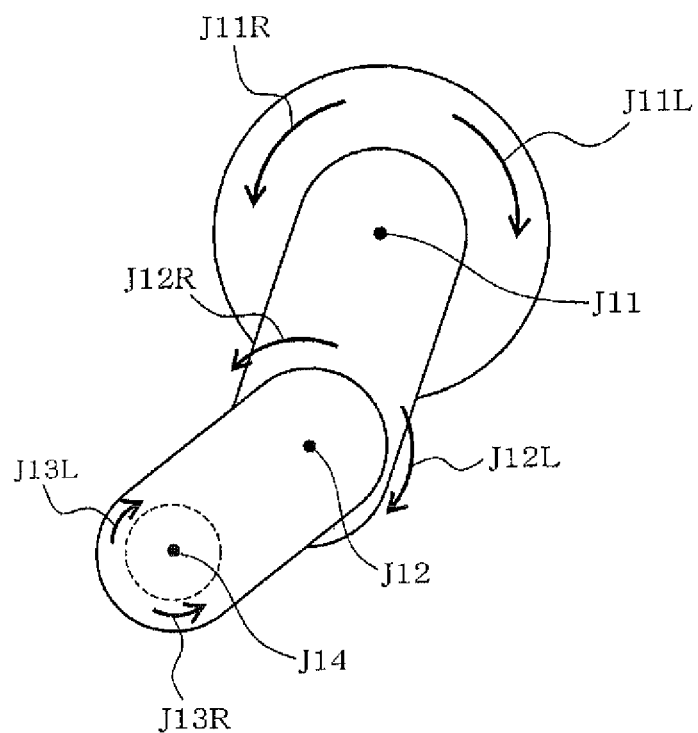
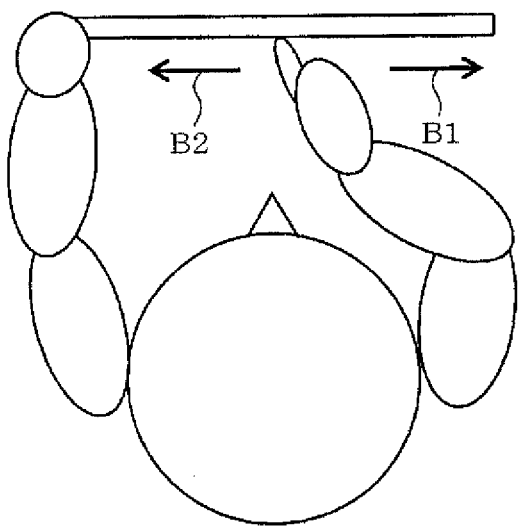

FIG.22

| | DRIVE AXIS | OPERATING METHOD | |
|---|---|---|---|
| (1) | FIRST AXIS | DRAG OPERATION BY SINGLE FINGER IN LATERAL DIRECTION | 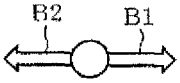 |
| (2) | SECOND AXIS | DRAG OPERATION BY SINGLE FINGER IN VERTICAL DIRECTION | 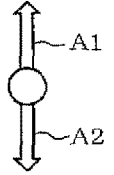 |
| (3) | THIRD AXIS | DRAG OPERATION BY TWO FINGERS IN VERTICAL DIRECTION | 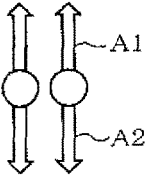 |
| (4) | FOURTH AXIS | DRAG OPERATION BY TWO FINGERS IN LATERAL DIRECTION | 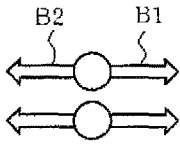 |
| (5) | FIFTH AXIS | DRAG OPERATION BY THREE FINGERS IN VERTICAL DIRECTION | 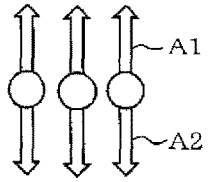 |
| (6) | SIXTH AXIS | DRAG OPERATION BY THREE FINGERS IN LATERAL DIRECTION | 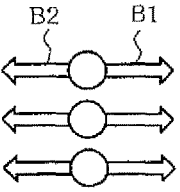 |

FIG.23
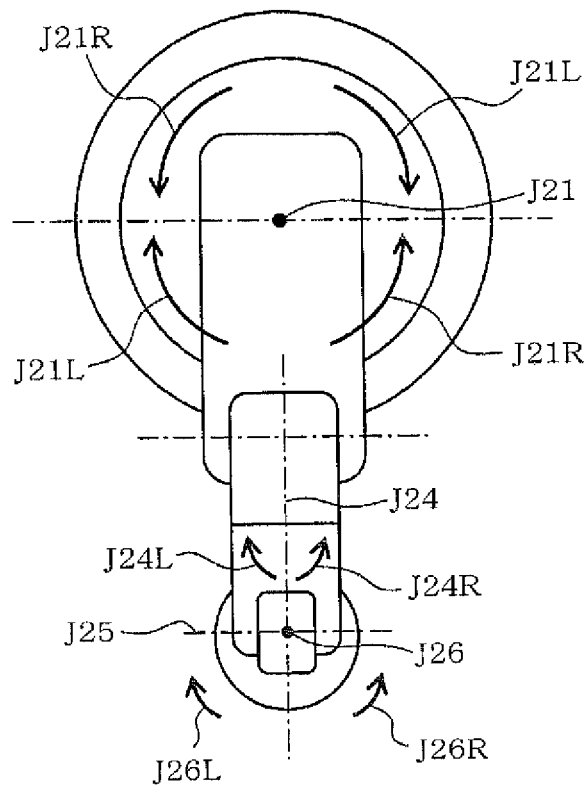
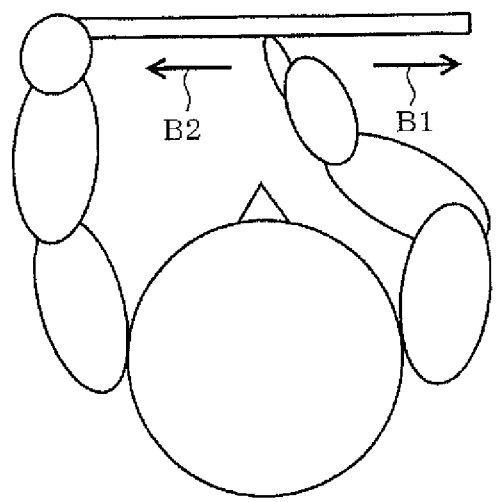

FIG.26
| DRIVE AXIS | OPERATING METHOD | |
|---|---|---|
| (1) FIRST AXIS | DRAG OPERATION BY SINGLE FINGER IN LATERAL DIRECTION | 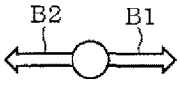 |
| (2) SECOND AXIS | DRAG OPERATION BY TWO FINGERS IN LATERAL DIRECTION | 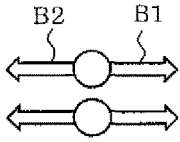 |
| (3) THIRD AXIS | DRAG OPERATION BY SINGLE FINGER IN VERTICAL DIRECTION | 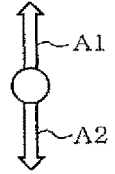 |
| (4) FOURTH AXIS | DRAG OPERATION BY TWO FINGERS IN CIRCUMFERENTIAL DIRECTION | 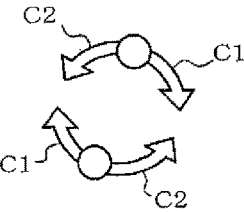 |

FIG.27

| DRIVE AXIS | | OPERATING METHOD | |
|---|---|---|---|
| (1) | FIRST AXIS | DRAG OPERATION BY SINGLE FINGER IN LATERAL DIRECTION | 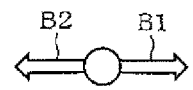 |
| (2) | SECOND AXIS | DRAG OPERATION BY SINGLE FINGER IN VERTICAL DIRECTION | 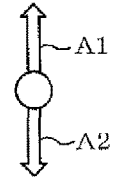 |
| (3) | THIRD AXIS | DRAG OPERATION BY TWO FINGERS IN VERTICAL DIRECTION | 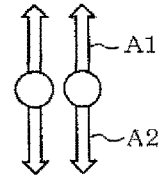 |
| (4) | FOURTH AXIS | DRAG OPERATION BY TWO FINGERS IN CIRCUMFERENTIAL DIRECTION | 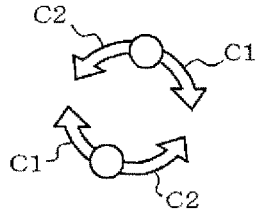 |
| (5) | FIFTH AXIS | DRAG OPERATION BY THREE FINGERS IN VERTICAL DIRECTION | 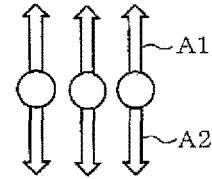 |
| (6) | SIXTH AXIS | DRAG OPERATION BY THREE FINGERS IN LATERAL DIRECTION | 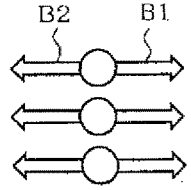 |

FIG.28
| DRIVE AXIS | OPERATING METHOD | |
|---|---|---|
| (1) FIRST AXIS | DRAG OPERATION BY SINGLE FINGER IN LATERAL DIRECTION | 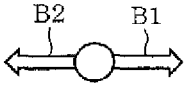 |
| (2) SECOND AXIS | DRAG OPERATION BY TWO FINGERS IN LATERAL DIRECTION | 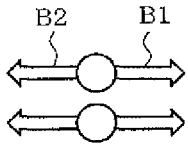 |
| (3) THIRD AXIS | DRAG OPERATION BY SINGLE FINGER IN VERTICAL DIRECTION | 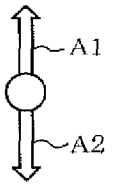 |
| (4) FOURTH AXIS | DRAG OPERATION BY THREE FINGERS IN CIRCUMFERENTIAL DIRECTION | 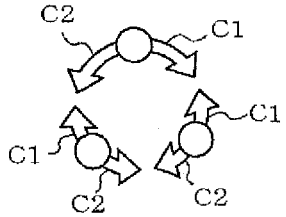 |

FIG.30

| DRIVE AXIS | OPERATING METHOD | |
|---|---|---|
| (1) FIRST AXIS | DRAG OPERATION BY SINGLE FINGER IN LATERAL DIRECTION | 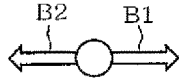 |
| (2) SECOND AXIS | DRAG OPERATION BY SINGLE FINGER IN VERTICAL DIRECTION | 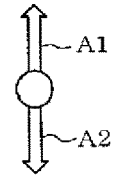 |
| (3) THIRD AXIS | DRAG OPERATION BY TWO FINGER IN VERTICAL DIRECTION | 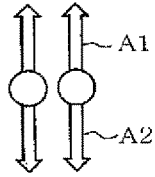 |
| (4) FOURTH AXIS | DRAG OPERATION BY TWO FINGERS IN LATERAL DIRECTION | 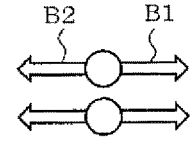 |
| (5) FIFTH AXIS | DRAG OPERATION BY THREE FINGERS IN VERTICAL DIRECTION | 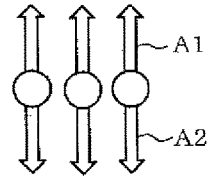 |
| (6) SIXTH AXIS | DRAG OPERATION BY THREE FINGERS IN CIRCUMFERENTIAL DIRECTION | 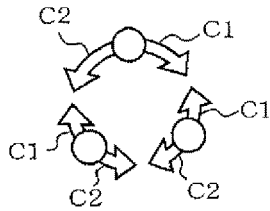 |

FIG.31

| DRIVE AXIS | OPERATING METHOD | |
|---|---|---|
| (1) FIRST AXIS | DRAG OPERATION BY SINGLE FINGER IN LATERAL DIRECTION | |
| (2) SECOND AXIS | DRAG OPERATION BY SINGLE FINGER IN VERTICAL DIRECTION | |
| (3) THIRD AXIS | DRAG OPERATION BY TWO FINGERS IN VERTICAL DIRECTION | |
| (4) FOURTH AXIS | DRAG OPERATION BY TWO FINGERS IN CIRCUMFERENTIAL DIRECTION | |
| (5) FIFTH AXIS | DRAG OPERATION BY THREE FINGERS IN VERTICAL DIRECTION | |
| (6) SIXTH AXIS | DRAG OPERATION BY THREE FINGERS IN CIRCUMFERENTIAL DIRECTION | |

FIG.32

| | DRIVE AXIS | OPERATING METHOD | |
|---|---|---|---|
| (1) | FIRST AXIS | DRAG OPERATION BY SINGLE FINGER IN LATERAL DIRECTION | B2 B1 ←○→ |
| (2) | SECOND AXIS | DRAG OPERATION BY TWO FINGERS IN LATERAL DIRECTION | B2 B1 ←○→ ←○→ |
| (3) | THIRD AXIS | DRAG OPERATION BY THREE FINGERS IN LATERAL DIRECTION | B2 B1 ←○→ ←○→ ←○→ |
| (4) | FOURTH AXIS | DRAG OPERATION BY FOUR FINGERS IN LATERAL DIRECTION | B2 B1 ←○→ ←○→ ←○→ ←○→ |
| (5) | FIFTH AXIS | DRAG OPERATION BY FIVE FINGERS IN LATERAL DIRECTION | B2 B1 ←○→ ←○→ ←○→ ←○→ ←○→ |
| (6) | SIXTH AXIS | DRAG OPERATION BY SINGLE FINGER IN VERTICAL DIRECTION | ↑ A1 ○ ↓ A2 |

FIG.33
| AXIS DIRECTION / MOVEMENT DIRECTION | OPERATING METHOD |
|---|---|
| (1) FIRST AXIS / X DIRECTION | 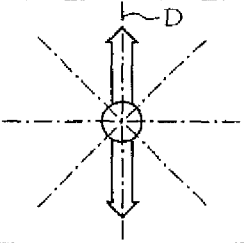 |
| (2) SECOND AXIS / Y DIRECTION | 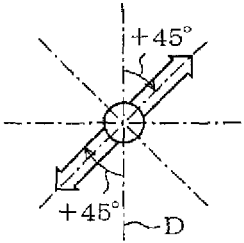 |
| (3) THIRD AXIS / Z DIRECTION | 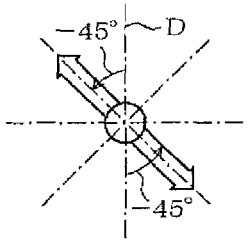 |
| (4) FOURTH AXIS / Rz DIRECTION | 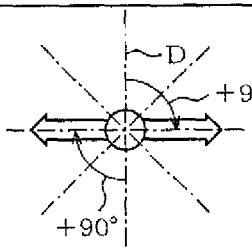 |

FIG.34
| | AXIS DIRECTION / MOVEMENT DIRECTION | OPERATING METHOD |
|---|---|---|
| (1) | FIRST AXIS / Z DIRECTION | 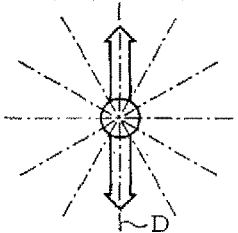 |
| (2) | SECOND AXIS / X DIRECTION | 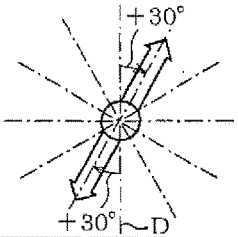 |
| (3) | THIRD AXIS / Y DIRECTION | 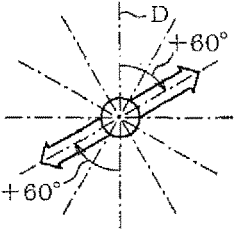 |
| (4) | FOURTH AXIS / Rx DIRECTION | 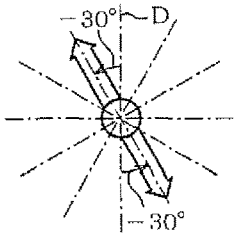 |
| (5) | FIFTH AXIS / Ry DIRECTION | 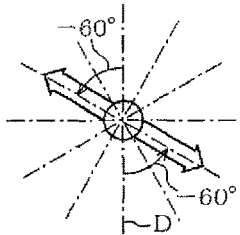 |
| (6) | SIXTH AXIS / Rz DIRECTION | 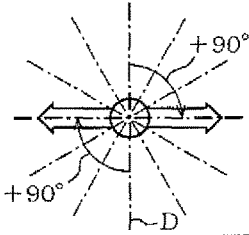 |

FIG.35

| ROBOT TYPE | AXIS SYSTEM / HAND SYSTEM | MAIN OPERATION | | SUB-OPERATION | |
|---|---|---|---|---|---|
| | | FIRST AREA (VERTICAL/LATERAL) | SECOND AREA (VERTICAL) | FIRST AREA (VERTICAL/LATERAL) | SECOND AREA (VERTICAL) |
| FOUR-AXIS TYPE | AXIS SYSTEM | FIRST AXIS/SECOND AXIS | THIRD AXIS | —/FOURTH AXIS | — |
| | HAND SYSTEM | X DIRECTION/Y DIRECTION | Z DIRECTION | —/Rz DIRECTION | — |
| SIX-AXIS TYPE | AXIS SYSTEM | SECOND AXIS/THIRD AXIS | FIRST AXIS | FOURTH AXIS/FIFTH AXIS<br>FIFTH AXIS/SIXTH AXIS | SIXTH AXIS<br>FOURTH AXIS |
| | HAND SYSTEM | X DIRECTION/Y DIRECTION | Z DIRECTION | Rx DIRECTION/Ry DIRECTION | Rz DIRECTION |

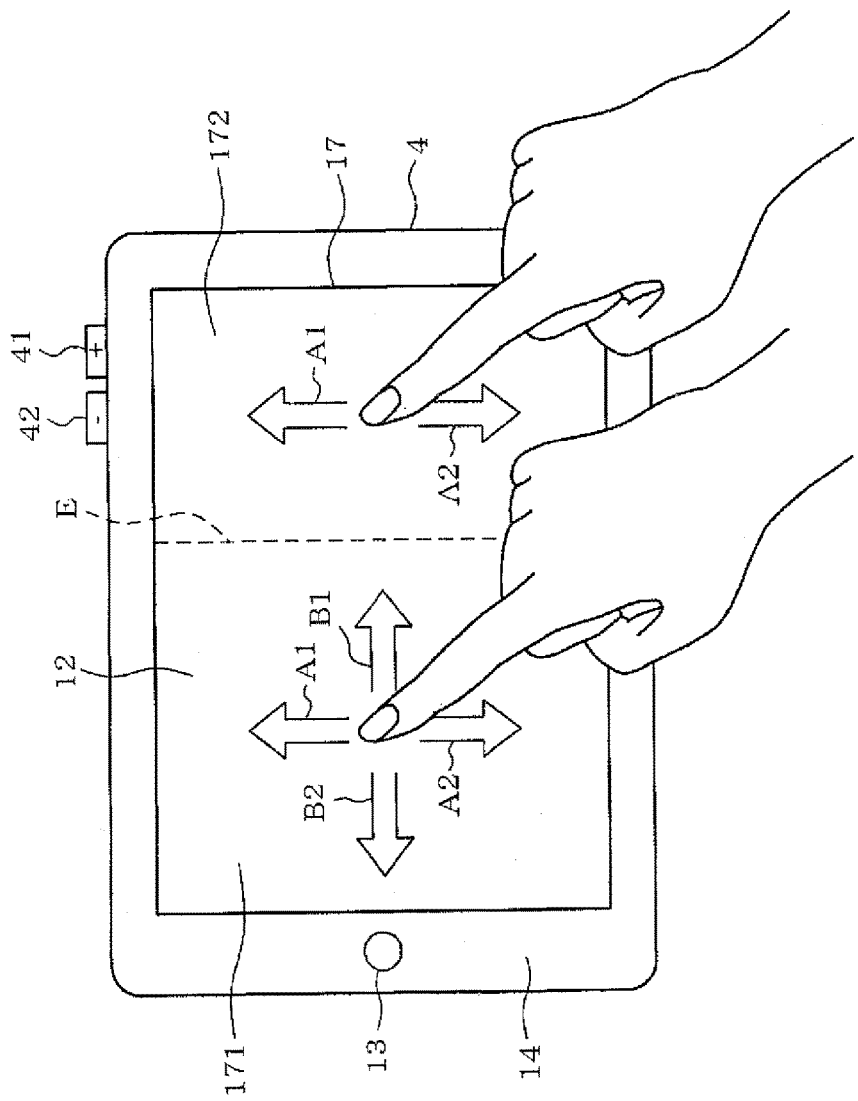

FIG.47
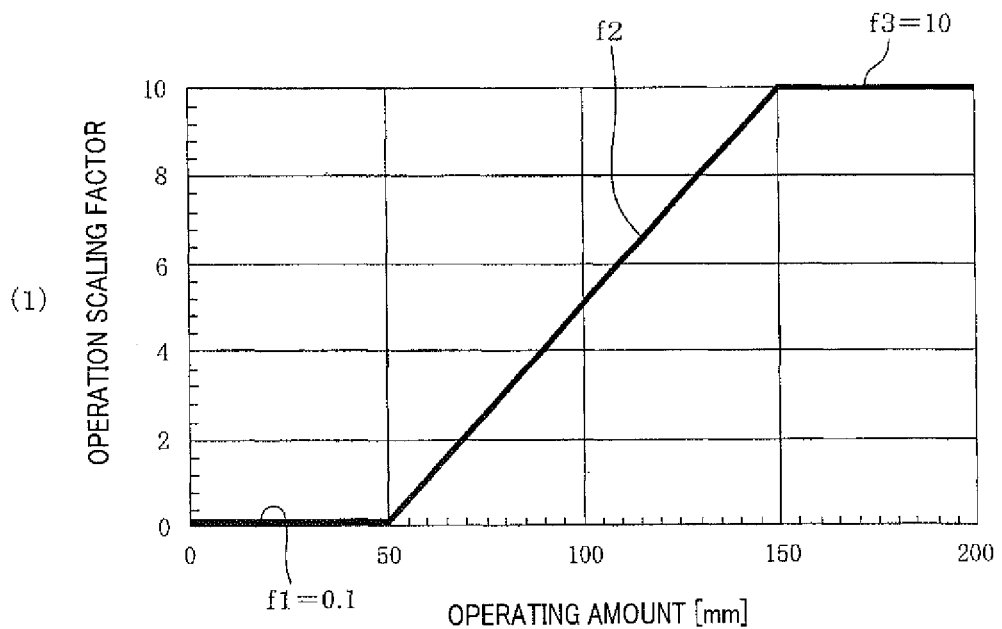
(1)
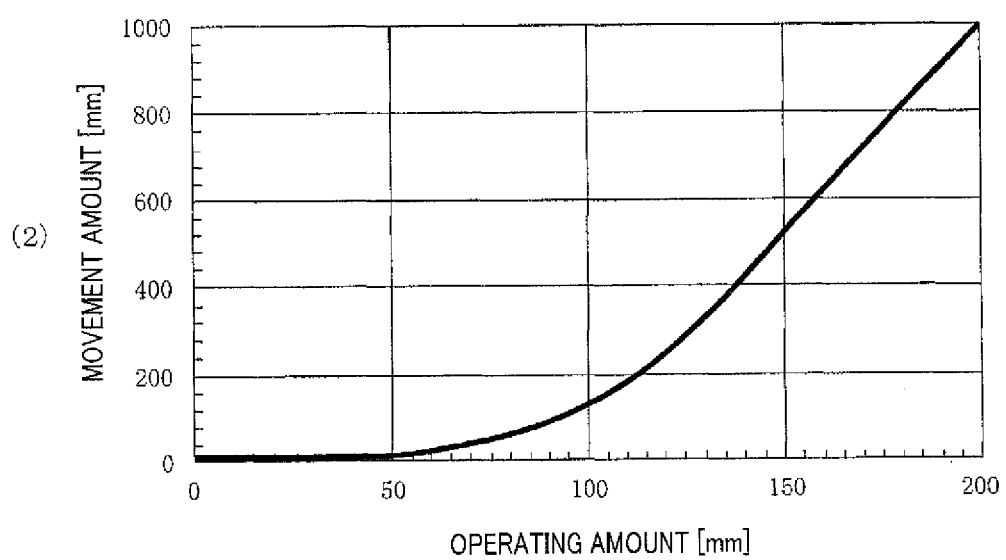
(2)

FIG.48
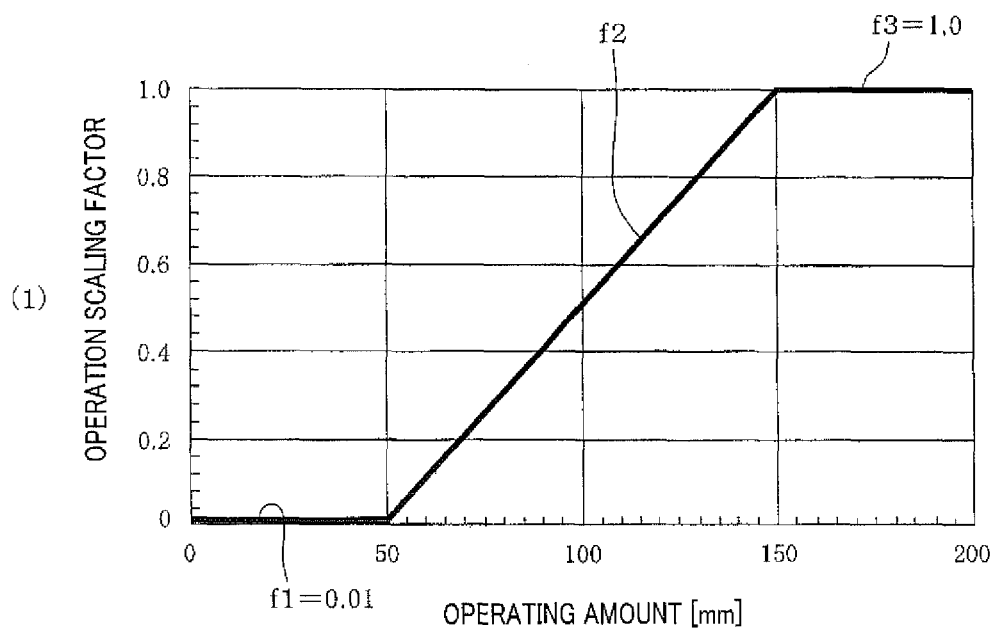
(1)
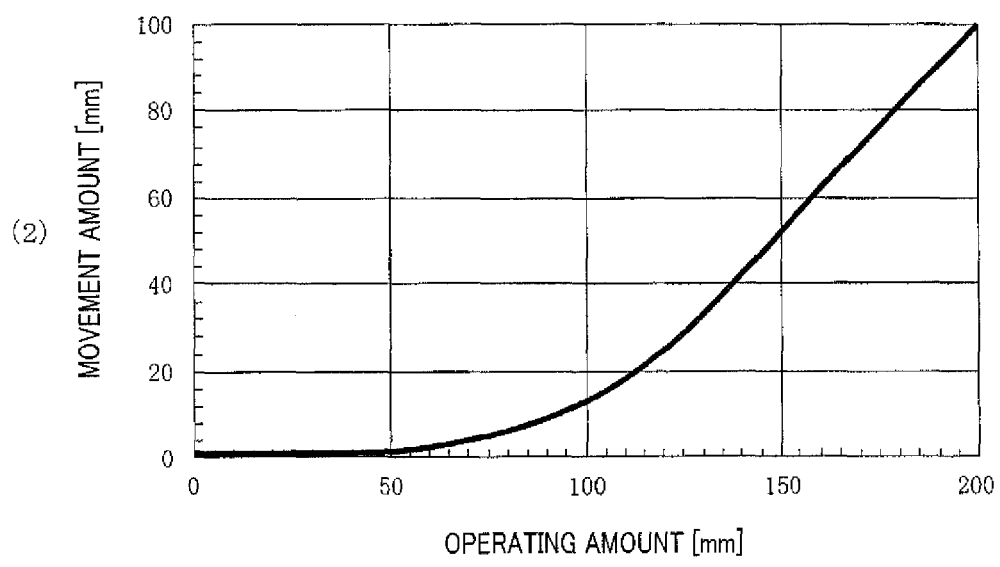
(2)

ROBOT OPERATION APPARATUS, ROBOT SYSTEM, AND ROBOT OPERATION PROGRAM

CROSS-REFERENCE TO RELATED APPLICATION

This application is based on and claims the benefit of priority from earlier Japanese Patent Applications No. 2013-195423 flied Sep. 20, 2013 and No. 2014-175753 filed Aug. 29, 2014, the description of which is incorporated herein by reference.

BACKGROUND

Technical Field

The present invention relates to a robot operation apparatus that is used when a robot is manually operated, a robot system including the robot operation apparatus, and a robot operation program used in the robot system.

Background Art

In a robot system for industrial use, for example, a robot can be manually operated (manual operation). Such operations are used when a teaching operation, for example, is performed. In this case, a user manually operates the robot using a pendant (teaching pendant) or the like that is connected to a controller that controls the robot. Therefore, the pendant is provided with various dedicated operating keys (keys composed of mechanical switches) for enabling manual operation.

CITATION LIST

Patent Literature

[PTL 1] JP-A-2006-142480

Technical Problem

A touch panel that can be touch-operated is often used in a display unit of the pendant. As a result of the above-described manual operation being able to be performed by touch operation using such a touch panel or the like, the dedicated operating keys are no longer required to be provided. Effects, such as actualization of size reduction of the pendant (or enlarged screen size of the display unit) and cost reduction, can be anticipated. However, the following problems occur when a simple substitution is merely made by touch switches similar to the dedicated operating keys being formed on the touch panel.

That is, in the case of physical operating keys, the user is capable of knowing, by groping, the position of the operating key to be operated, without directly looking at the pendant, although this does depend on the degree of experience with the operation. Meanwhile, unlike with the operating keys, the user is not able to know the position of a touch switch formed on the touch panel by groping. When manual operation of the robot is performed, it is extremely important in terms of safety that the user does not look away from the robot, that is, does not directly look at the pendant. However, when the operating keys are simply replaced with touch switches, the user is required to look at the display unit of the pendant for each operation. When doing so, the user has no choice but to look away from the robot. Therefore, safety may decrease.

SUMMARY

Thus it is desired to provide a robot operation apparatus that is capable of easily actualizing manual operation of a robot by touch operation, without causing decrease in safety, a robot system including the robot operation apparatus, and a robot operation program used in the robot system.

Solution to Problem

A robot operation apparatus 1 according to an exemplary embodiment includes: a touch panel that receives input of a touch operation from a user; a touch operation detecting unit that is capable of detecting a touch operation in a planar direction that is inputted to the touch panel; an action command generating unit that generates an action command for operating an articulated-type robot having a plurality of drive axes, based on a detection result from the touch operation detecting unit; and a selection operation detecting unit that detects a selection operation by a user for selecting a drive axis or an action mode of the robot to be operated. That is, the robot operation apparatus actualizes manual operation of a robot by touch operation. The robot that is to be operated by the robot operation apparatus is an articulated-type robot that has a plurality of drive axes. When the articulated-type robot is manually operated, either of a mode in which the plurality of drive axes are driven in combination with reference to the hand of the robot or a mode in which the drive axes individually driven can be considered. In the description below, the former mode that references the hand of the robot is referred to as action of a hand system, and the later mode in which the drive axes are individually driven is referred to as action of an axis system.

In general, manual operation of a robot is often used, for example, for fine adjustment in the final stage of robot adjustment. Therefore, in manual operation of a robot, all that is required is that intricate action with reference to the hand of the robot be possible. In this case, regarding the action of the hand system, it is considered sufficient if an action referred to as horizontal movement action, an action referred to as vertical movement action, and an action referred to as rotation action can be performed. The horizontal movement action is an action in which the hand of the robot is moved in a planar direction that is horizontal to an action reference plane of the robot. The vertical movement action is an action in which the hand of the robot moves in a vertical axis direction that is perpendicular to the action reference surface. The rotation action is an action in which the hand of the robot is rotated around a vertical axis.

Therefore, when the action of the hand system is performed, the robot operation apparatus is required to be capable of switching, as appropriate, between at least three action modes, that is, the horizontal movement action, the vertical movement action, and the rotation action. In addition, when the action of the axis system is performed, the robot operation apparatus is required to be capable of switching, as appropriate, between drive axes and operating the drive axis. However, most typical touch panels detect input in an X direction and a Y direction when the screen is an X-Y plane. That is, a two-dimensional input such as that in which the user traces the screen is detected. Therefore, when the touch panel is used in the robot operation apparatus, it is required for switching to be performed between a plurality of types of actions and the action to be performed by a two-dimensional input, or in other words, two types of operation inputs. Moreover, the operation is required to be intuitive to the user and able to be performed without the user directly looking at the screen to the most possible extent.

Therefore, the robot operation apparatus above described includes a selection operation detecting unit. The selection operation detecting unit detects a selection operation by a user for selecting a drive axis or an action mode of the robot to be operated. The action command generating unit is capable of performing an operation determining process and an action command generating process. The operation determining process is a process for determining the drive axis or the action mode of the robot to be operated based on the selection operation detected by the selection operation detecting unit. In addition, the operation determining process is a process for determining, when the touch operation detected by the touch operation detecting unit is a drag operation, a movement amount of the drag operation.

Here, the drag operation is an operation in which a finger of a user is moved while in a state in which the finger is touching the touch panel. That is, the drag operation is an operation in which the finger of the user is continuously moved over a certain distance in a state in which the finger is in contact with the touch panel. Determination of as whether or not a touch operation is a drag operation does not include determination of whether the trajectory thereof is a straight line or a curved line. That is, the drag operation includes an operation in a curved line, in addition to an operation in a straight line. Regarding the drag operation, all that is needed is that a start point and an end point of the operation on the touch panel be determined. The start point of the operation is a position at which the user touches the finger on the touch panel. The end point of the operation is a position at Which the user separates the finger from the touch panel. In this case, the drag operation also includes an operation in which the user flicks a finger on the touch panel, that is, a so-called flick operation. En addition, a movement amount of the robot includes a movement speed or a movement time of the robot, in addition to the amount by which the robot actually moves, or in other words, the movement distance of the robot. A reason for this is that the movement distance is determined if the movement speed and the movement time are determined.

In this way, through information that commands movement of the hand of the robot in space, that is, drag operations on the touch panel that imitate or suggest actions, such as horizontal movement action, vertical movement action, and rotation action, or in other words, gestures, the robot can be taught such movements. Therefore, the present inventors and the like refer to this teaching method in the field as "gesture teaching".

In the robot operation apparatus according to the exemplary embodiment, the user can select the drive axis to be operated or the action mode of the robot by performing a selection operation. In addition, as a result, of the user performing a drag operation on the touch panel, the movement amount of the robot can be determined based on the movement amount of the drag operation. The drag operation is performed by the finger of the user directly or indirectly touching the touch panel. Therefore, the user can more easily acquire information, such as the operating amount of the drag operation, directly through the sense of touch. That is, the user can acquire the operating amount of the drag operation with relatively high accuracy, even without the sense of sight. Therefore, the user can perform at least an operation for determining the movement amount of the robot through feeling, without directly looking at the screen. Therefore, the robot operation apparatus is capable of enabling the user to perform an intuitive operation without directly looking at the screen, while a touch panel is being used. As a result, improvement in operability is achieved. Manual operation of the robot can be easily actualized by touch operation, without causing a decrease in safety. In addition, as a result of improved operability, time required for teaching can be shortened.

In a robot operation apparatus according to another exemplary embodiment, the selection operation detecting unit detects an operation of a button displayed in the touch panel or a button differing from the touch panel. In addition, the operation determining process includes a process for determining the drive axis or the action mode to be operated based on the operation detected by the selection operation detecting unit. As a result, the user can select the drive axis or the action mode to be operated by operating a button displayed in the touch panel or a button differing from the touch panel.

In this case, to operate such buttons, the user may directly look at the buttons for a moment. However, in ordinary usage mode of a robot, an operation for selecting (switching) the drive axis or the action mode to be operated is usually performed before driving of the robot, that is, when the robot is not actually in operation. In addition, through modification of settings, such as the shape, size, and color of the buttons, the amount of time over which the user directly looks at the buttons can be shortened. Therefore, even should the user directly look at a button displayed in the touch panel or a button differing from the touch panel for a moment to operate such buttons, it is thought that the effect on decrease in safety is small.

Rather, according to a configuration such as this, the user holds the intention to operate the button to switch the drive axis or the action mode. Therefore, the user becomes more easily aware that the operation of the button is an operation for selecting the drive axis or the action mode to be operated. Consequently, as a result, the risk of an erroneous operating target being selected by the user performing an erroneous operation, and thereby causing erroneous action by the robot can be reduced. Therefore, improvement in operability is achieved, and manual operation of the robot can be actualized by touch operation without causing decrease in safety. In addition, as a result of improved operability, the time required for teaching can be shortened.

In a robot operation apparatus according to another exemplary embodiment, the selection operation detecting unit detects a touch operation on the touch panel. In addition, the operation determining process includes a process for determining the drive axis or the action mode to be operated based on a number of fingers or an operating direction, or the number of fingers and the operating direction of a drag operation, when the touch operation detected by the selection operation detecting unit is the drag operation.

As a result, the user can switch the actions of the robot by changing the number of fingers or the operating direction, or the number of fingers and the operating direction of the drag operation. Therefore, the robot operation apparatus is capable of enabling the user to perform an intuitive operation without directly looking at the screen, while a touch panel is being used. As a result, improvement in operability is achieved. Manual operation of the robot can be easily actualized by touch operation, without causing a decrease in safety. In addition, as a result of improved operability, time required for teaching can be shortened.

In a robot operation apparatus according to another exemplary embodiment, the user can perform actions that are frequently used in the action of the hand system, or specifically, the horizontal movement action, the vertical movement action, and the rotation action, by drag operations with a single finger or two fingers. That is, in the robot operation apparatus, the user can make the robot perform the horizontal movement action by a drag operation with a single finger.

In addition, the user can make the robot perform the vertical movement action or the rotation action by a drag operation with two fingers.

To actualize actions such as those described above, the action command generating unit includes a first operation determining process, a second operation determining process, and a third operation determining process. The first operation determining process is a process for determining whether or not the detected touch operation is a first operation that is a drag operation by a single finger. The second operation determining process is a process for determining whether or not the detected touch operation is a second operation that is an operation that is a drag operation by two fingers in a predetermined direction. The third determining process is a process for determining whether or not the detected touch operation is a third operation that is an operation that is a drag operation by two fingers in a direction differing from that of the second operation.

In addition, as the action command generating process, the action command generating unit performs a horizontal movement action command generating process, a vertical movement action command generating process, and a rotation action command generating process. The horizontal movement action command generating process is a process for generating, when determined that the touch operation is the first operation in the first operation determining process, the action command for moving the hand of the robot in a planar direction that is horizontal to an action reference plane of the robot. The vertical movement action command generating process for generating, when determined that the touch operation is the second operation in the second operation determining process, the action command for moving the hand of the robot along a vertical axis direction perpendicular to the action reference plane. The rotation action command generating process for generating, when determined that the touch operation is the third operation in the third operation determining process, the action command for rotating the hand of the robot. The above-described action commands are transmitted to a controller in the action command generating process. The controller controls the action of the robot based on the action command. As a result, the horizontal movement action, the vertical movement action, and the rotation movement action are performed as appropriate.

When a predetermined operation is performed, the robot operation apparatus described herein makes the robot perform an action that is considered easily associated with the operation by the user. That is, described above, when the drag operation by a single finger is performed, the robot operation apparatus makes the robot perform an action that is considered easily associated with the operation by the user, that is, in this case, the horizontal movement action of the hand. The reasoning for the horizontal movement action of the hand of the robot being associated with the operation is based on visual and tactile information, and the like of humans. For example, the reasoning lies in the following point. That is, the touch panel to be touch-operated is typically a plane, and a two-dimensional coordinate system is formed thereon. When the drag operation by a single finger is performed, the mode is such that a single touch location moves along a plane such as this. That is, in this case, a close correlation is thought to be present between the touch location by the single finger moving over the plane and the robot moving in the planar direction. Therefore, the user can easily recognize the horizontal movement of the hand of the robot and the operation in the planar direction on the screen in association.

In a robot operation apparatus according to another exemplary embodiment, the second operation is a drag operation by two fingers in a linear direction, and an operation in which a distance between the fingers gradually shortens or gradually lengthens during a period in which the drag operation is performed. In this case, the drag operation in a linear direction refers to an operation in an arbitrary linear direction on the screen of the touch panel. The relative relationship to the screen, such as a vertical direction, a lateral direction, or a diagonal direction, is irrelevant. In addition, the third operation is a drag operation by two fingers in a circumferential direction. In this case, the drag operation in the circumferential direction refers to an operation in which a rotation component is included in at least one of the drag operations by the two fingers.

Furthermore, the vertical movement action command generating process includes an approaching command generating process and a separating command generating process. The approaching command generating process is a process for generating, when the second operation is that in which the distance between the fingers gradually lengthens, the action command for moving the hand of the robot in a direction approaching the action reference plane, that is, downwards. The separating command generating process is a process for generating, when the second operation is that in which the distance between the fingers gradually shortens, the action command for moving the hand of the robot in a direction away from the action reference plane, that is, upwards. The action command generated in the vertical movement action command generating process is transmitted to a controller from a communication unit. The controller that has received the action command from the communication unit controls the action of the robot based on the action command. As a result, the upward or downward vertical movement action is performed.

As described above, when the operation that is a drag operation by two fingers in a linear direction, and an operation in which a distance between the fingers gradually lengthens during a period in which the drag operation is performed, is performed, the robot operation apparatus makes the robot perform an action that is considered easily associated with the operation by the user, that is, in this case, the downward vertical direction action of the hand. The reasoning for the downward vertical direction action of the hand of the robot being associated with the drag operation in which the distance between the fingers gradually lengthens lies in the following two points. When such an operation is performed, the mode is such that the two fingers are spread apart. The spreading apart of the fingers is thought to suggests, to the user, movement in the downward direction. This is a first reasoning. In addition, the above-described operation is generally referred to as a spread operation or a pinch-out operation, and is often used when enlarging an image or the like. When a camera for imaging an object, such as a workpiece disposed on the action reference plane, is attached to the hand of the robot, the image captured by the camera is enlarged when the hand moves downward. That is, there is a strong association between the distance between the fingers lengthening, that is, the space between the two fingers widening, and an image becoming enlarged. This is a second reasoning.

In addition, as described above, when the operation that is a drag operation by two fingers in a linear direction, and an operation in which a distance between the fingers gradually shortens during a period in which the drag operation is performed, is performed, the robot operation apparatus makes the robot perform an action that is considered easily associated with the operation by the user, that is, in this case, the upward vertical direction action of the hand. The reasoning for the upward vertical direction action of the hand of the robot being associated with the drag operation in which the distance between the fingers gradually shortens lies in the following two points. When such an operation is performed, the mode is such that the two fingers are lifted upwards. The lifting up of the fingers is thought to suggest, to the user, movement in the upward direction. This is a first reasoning. In addition, the above-described operation is generally referred to as a pinch operation or a pinch-in operation, and is often used when reducing an image or the like. When the above-described camera is attached to the hand of the robot, the image captured by the camera is reduced when the hand moves upward. That is, in this case, there is a strong association between the distance between the fingers shortening, that is, the space between the two fingers narrowing, and an image becoming reduced. This is a second reasoning.

In addition, when the drag operation by two fingers in the circumferential direction, that is, a rotation operation by either of the two fingers is performed, the robot operation apparatus makes the robot perform an action that is considered easily associated with the operation by the user, that is, in this case, the rotation action of the robot. The reasoning for the rotation action being associated with the rotation operation by either of the two fingers lies in the following point. That is, for example, a circular cylindrical member, such as a flange is often attached to the hand portion of the robot. That is, the shape of the hand portion of the robot is often rounded. When the rotation operation is performed, the mode is such that the hand rotates while drawing a circular arc. That is, in this case, the hand rotating while drawing a circular arc is thought to suggest, to the user, a rotation action in which a rounded object is rotated, that is, the hand of the robot is rotated.

In this way, each operation performed on the robot operation apparatus enables the user to intuitively associate the operation with the action performed by the robot in response to the operation. In addition, each operation is a simple operation. Therefore, the user can perform each operation without looking at their own hand, that is, the operating location. As a result, the user no longer looks away from the robot during manual operation of the robot, and safety thereof can be favorably maintained. In this way, according to the present means, an excellent effect is achieved in that manual operation of the robot can be actualized by touch operation, without causing decrease in safety.

In a robot operation apparatus according to another exemplary embodiment, the second operation is an operation in a vertical direction on the touch panel. In addition, the third operation is an operation in a lateral direction perpendicular to the vertical direction on the touch panel. In this case, the vertical direction on the touch panel refers to a direction away from the user who is holding the robot operation apparatus. In addition, the lateral direction on the touch panel refers to a direction parallel to the user who is holding the robot operation apparatus.

When an operation by two fingers in a linear direction is performed, the robot operation apparatus makes the robot perform an action that is considered easily associated with the operation by the user. In this case, when an operation that is the drag operation by two fingers in the vertical direction (second operation) is performed, the robot operation apparatus makes the robot perform the vertical movement action in which the hand of the robot is moved in the vertical direction. The reasoning for the vertical movement action of the hand of the robot being associated with the operation is based on visual and tactile information, and the like of humans. For example, the reasoning lies in the following point. That is, the user often holds the robot operation apparatus between the hip and chest of the user. In this case, taking into consideration the visibility of the screen and the operability of the touch panel, it is natural for the user to hold the robot operation apparatus at an attitude in which the screen of the touch panel is tilted downward towards the user side. When the user holds the robot operation apparatus at such an attitude, the vertical direction, that is, the up/down direction of the screen of robot operation apparatus matches the vertical direction, that is, the up/down direction of the hand of the robot. Therefore, the user can easily recognize the operation in the vertical direction on the screen of the touch panel and the vertical movement action of the hand of the robot in association.

In addition, when an operation that is the drag operation by two fingers in the lateral direction (third operation) is performed, the robot operation apparatus makes the robot perform the rotation action in which the hand of the robot is rotated. The reasoning for the rotation action of the hand of the robot being associated with the operation is based on visual and tactile information, and the like of humans. For example, the reasoning lies in the following point. That is, manual operation of the robot is often performed for fine adjustment of the robot. Therefore, during manual operation, the hand of the robot is often facing downward. In this case, the rotation axis of the hand is at a right angle to the horizontal plane, or in other words, oriented in the vertical direction. When the hand of the robot is viewed in the horizontal direction in this state, a certain point on the hand of the robot appears to be moving in a linear manner in the horizontal direction, as a result of the hand of the robot being rotated. Therefore, the user is thought to associate the rotation action of the hand of the robot with the operation in the lateral direction in relation to the touch panel. As a result, the user recognizes the operation in the lateral direction in relation to the touch panel and the rotation action of the hand of the robot, in association.

In a robot operation apparatus according to another exemplary embodiment, the selection operation detecting unit detects a touch operation on the touch panel. In addition, the action command generating process includes a drive axis selecting process. The drive axis selecting process is a process for selecting, when the detected touch operation is a drag operation by a finger, a single drive axis to be driven among the plurality of drive axes based on a number of fingers or an operating direction, or the number of fingers and the operating direction, of the drag operation. That is, in the action of an axis system, the robot operation apparatus can switch the drive axis and operate the drive axis by the number of fingers or the operating direction, or the number of fingers and the operating direction, of the drag operation being changed. As a result, even when the touch panel is used in the robot operation apparatus, action of each axis system can be performed without any problems. Furthermore, the user can intuitively switch the drive axis by changing the number of fingers or the operating direction, or the number of fingers and the operating direction, of the drag operation. Therefore, the robot operation apparatus is capable of enabling the user to perform an intuitive operation without directly looking at the screen, while a touch panel is being used.

In a robot operation apparatus according to another exemplary embodiment, the drive axis selecting process includes a first drive axis selecting process and a second drive axis selecting process. The first drive axis selecting process is a process for selecting, when the operating direction of the drag operation is a vertical direction on the touch panel, a single drive axis to be driven, among drive axes of a first group. In this case, the drive axes of the first group refer to drive axes that enable the hand of the robot to move in a vertical direction in relation to the action reference plane of the robot. In addition, the second drive axis selecting process is a process for selecting, when the operating direction of the drag operation is a lateral direction perpendicular to the vertical direction, or a circumferential direction on the touch panel, a single drive axis to be driven, among drive axes other than the drive axes of the first group.

As described above, the user can easily recognize the operation in the vertical direction on the screen of the touch panel and the action of the hand of the robot in the vertical direction, in association. In addition, as described above, the user can easily recognize the operation in the lateral direction or the circumferential direction on the screen of the touch panel and the rotation action of the hand of the robot, in association. That is, in the robot operation apparatus, when a drive axis is operated for each axis, it is easy to recognize the movement direction of the hand and the operating direction in association. Therefore, in the robot operation apparatus, further improvement in operability can be achieved.

In a robot operation apparatus according to another exemplary embodiment, the drive axis selecting process determines the drive axis to be driven by transitioning from a drive axis on a base side of the robot to a drive axis on the hand side, in accompaniment with increase in the number of fingers of the drag operation. In general, the drive axes of an articulated-type robot are set such that the axis number increases, such as a first axis, a second axis, a third axis, . . . , in order towards the hand side of the base side. In this case, the user can increase the number of the axis to be driven by increasing the number of fingers needed in the operation. Therefore, the user can easily recognize the number of fingers needed in the operation and the drive axis to be driven in association.

In addition, in an articulated-type robot, as the drive axis to be driven becomes closer to the base side, the effect the driving has on the hand, that is, the movement amount of the hand increases. Meanwhile, the user is thought to be capable of a more precise operation as the number of fingers needed in the drag operation decreases. In the robot operation apparatus, the user is able to perform a precise operation with fewer fingers as the drive axis to be driven becomes closer to the base side, that is, as the effect the drive axis has on the hand of the robot increases. As a result, further improvement in operability is achieved.

In a robot operation apparatus according to another exemplary embodiment, the drive axis selecting process determines the drive axis to be driven by transitioning from a drive axis on the hand side of the robot to a drive axis on the base side, in accompaniment with increase in the number of fingers of the drag operation. That is, the drive axis selecting process determines the drive axis in the reverse order of that of the drive axis selecting process. Manual operation of the robot is often used for fine adjustment of the position of the hand of the robot. Therefore, in manual operation of the axis system of the robot, it can be expected that drive axes near the hand of the robot will be more frequently driven than the drive axes on the base side. In the robot operation apparatus, the user can perform a precise operation with fewer fingers, as the drive axis to be driven becomes closer to the hand side, that is, as the drive axis becomes that which is more frequently driven. As a result, further improvement in operability is achieved.

To facilitate confirmation of whether or not the robot is operating as intended during manual operation of the robot, the user often performs each action (horizontal movement action, vertical movement action, and rotation action) independently. For example, first, the horizontal movement action is performed. Next, the vertical movement action is performed. Finally, the rotation action is performed. In light of such circumstances, during manual operation of the robot, it is rare for a plurality of actions to be deliberately performed at the same time (mixed). Therefore, during manual operation of the robot, it is preferable that simultaneous execution of a plurality of actions is not permitted. To do so, it is necessary to clearly draw a line between (separate) the operations for performing the actions. When the line between actions is unclear, an action that is a mixture of a plurality of actions is performed. As a result, the likelihood of an action unintended by the user being performed (an erroneous action occurring) increases. To further suppress the likelihood of such erroneous actions occurring, the means above descried may be used to clarify the separation between operations.

In a robot operation apparatus according to another exemplary embodiment, the action command generating unit determines, when a single location of a touch operation is detected, the number of fingers of the touch operation after the elapse of a predetermined allowable delay time from the time of detection. When the user performs a touch operation with a plurality of fingers, it is difficult for the touch timings of the plurality of fingers to perfectly match. Therefore, for example, even when a touch operation by a plurality of fingers is performed so as to perform a certain action, an unintentional action is temporarily performed at the time the touch by one finger is performed. Subsequently, the originally intended action is performed at the time the touch by the other finger is performed.

In the robot operation apparatus, when the lag in the timing of touch among the plurality of fingers is less than the allowable delay time, the touch operation is determined to be a drag operation by a plurality of fingers. That is, a lag in the timing of touch among the plurality of fingers up to the allowable delay time is allowed. Therefore, when the allowable delay time is set based on, for example, the maximum value conceivable as the lag in timing by human operation, the occurrence of erroneous action, that is, an unintended action being temporarily performed, can be prevented with certainty.

In a robot operation apparatus according to another exemplary embodiment, the action command generating unit determines whether or not a drag operation by a plurality of fingers is an operation in a circumferential direction. That is, the action command generating unit extracts, in a touch operation by a plurality of fingers, two fingers of which a distance between touch positions of the fingers is the farthest, among the plurality of fingers. Then, the action command generating unit determines that the drag operation is not an operation in a circumferential direction when an angle formed by a vector related to movement of either of the two fingers and a vector between the two fingers is less than a determination threshold, and determines that the drag operation is an operation in a circumferential direction when the angle is the determination threshold or greater.

When the user performs the drag operation with a plurality of fingers, for example, to perform a certain action, it is difficult for the user to move each finger in a perfectly straight line. Therefore, even when the user attempts to move the two fingers in a straight line to perform the certain action, should either finger even slightly not move in a straight line, a determination is made that the drag operation is an operation in a circumferential direction. In this case, another action that is unintended is performed.

That is, in the robot operation apparatus, even when the two fingers are not moved in a perfectly straight line but moved such as to draw a slight curve, that is, a circular arc, for example, the determination is made that the drag operation is a drag operation by two fingers in a straight line. Therefore, as a result of the determination threshold being set based on the maximum value conceivable as a deviation (that is, the extent of curving in relation to a straight line) by human operation, the occurrence of an erroneous operation, that is, a drag operation by a plurality of fingers in a linear direction being determined to be an operation in a circumferential direction and another action that is unintended being performed can be prevented with certainty.

In a robot operation apparatus according to another exemplary embodiment, the selection operation detecting unit detects a touch operation on the touch panel. That is, the user can select the drive axis or the action mode of the robot to be operated by performing a touch operation on the touch panel. In addition, the action command generating unit assigns directions of the drag operation such as to be a differing direction for each drive axis or action mode of the robot. In this case, the robot operation apparatus is capable of performing action of an axis system or the hand system. Regarding the action of the hand system, the action modes of the robot include the horizontal movement action, the vertical movement action, and the rotation action of the hand.

In the robot operation apparatus, the user can select the drive axis or the action mode of the robot to be operated, that is, the type of operation by changing the direction of the drag operation. Therefore, the user is not required to learn complicated operations for selecting the type of action, and operation becomes easier. As a result, manual operation of the robot can be actualized by touch operation, without causing decrease in safety.

In addition, the number of fingers of the drag operation is not a concern in the robot operation apparatus. Therefore, the user can perform an input operation with a single finger. That is, the robot operation apparatus provides an advantage in that the user can easily perform operations with a single finger. This advantage is also effective when a pointing device, such as a so-called touch pen or stylus pen, is used That is, when an operating environment of a robot for industrial use is considered, the user may be wearing gloves to ensure the safety of the user, or a substance that inhibits the touch operation, such as a lubricant, may be attached to the hand and fingers of the user. In this case, even when the user performs a touch operation with their hand and fingers, the robot operation apparatus may not accurately recognize the touch operation. Meanwhile, even when the user is wearing gloves, or lubricant or the like is attached to the hands and fingers of the user, the user can perform an accurate touch operation by using the above-described pointing device. For such reasons, an advantage is achieved in that the above-described pointing device can be easily used when the robot operation apparatus is to operate a robot for industrial use.

In a robot operation apparatus according to another exemplary embodiment, the action command generating unit disables, when a drag operation is detected, detection of a touch operation in an area within a predetermined range near a touch location by the touch operation, over a period until the drag operation is completed. For example, the drag operation by a single finger is often performed with the index finger of the right hand or the left hand. Therefore, when the operation is performed, erroneous touch by the thumb on the same hand as the index finger performing the operation is likely to occur. When such erroneous touch by an unintended finger is detected, a determination is made that a drag operation by a plurality of fingers has been performed. As a result, unintentional action is performed.

In the robot operation apparatus, when a drag operation is once detected, detection of a touch operation in the area within a predetermined range near the touch location by the touch operation is disabled, over a period until the drag operation is completed. Therefore, when the range of the above-described area is set taking into consideration locations where the likelihood of an erroneous touch by an unintended finger is high, the occurrence of erroneous action, that is, another action that is unintended being performed, can be suppressed when a certain action is to be performed.

A robot operation apparatus according to another exemplary embodiment includes a switching unit. The switching unit is used to switch between a main operation and a sub-operation. The main operation is an operation for operating, among the plurality of drive axes or action modes of the robot, a drive axis or an action mode contributing to a position of a hand of the robot. The sub-operation being an operation for operating a drive axis or an action mode contributing to an attitude of the hand of the robot. As a result, the user can switch between the main operation and the sub-operation using the switching unit. Consequently, when operating the robot, the user can clearly be aware of whether the user performing an operation for determining a hand tip position of the robot or an operation for determining the attitude of the hand. Therefore, erroneous operation, such as the user performing an operation to change the position of the hand regardless of attempting to determine the attitude of the hand, can be suppressed. As a result, operability is improved.

Here, in the industrial arena, a four-axis type, horizontal articulated-type robot that includes four drive axes and a six-axis type, vertical articulated-type robot that includes six drive axes are often used. When action of an axis system is performed by manual operation of the four-axis type, horizontal articulated-type robot, the action command generating unit is preferably capable of determining four types of input operations for individually operating the drive axes. In addition, in the four-axis type, horizontal articulated-type robot, there are four types of action of the hand system, that is, in an X direction, a Y direction, a Z direction, and an Rz direction. Therefore, when action of the hand system is performed by manual operation of the four-axis type, horizontal articulated-type robot, the action command generating unit is preferably capable of determining four types of input operations for individually operating the four types of actions. From the foregoing, when the robot operation apparatus subjects the four-axis type, horizontal articulated-type robot to manual operation, the action command generating unit is preferably capable of determining at least four types of operation inputs.

In a similar manner, when action of an axis system is performed by manual operation of the six-axis type, vertical articulated-type robot, the action command generating unit is preferably capable of determining six types of input operations for individually operating the drive axes. In addition, in the six-axis type, vertical articulated-type robot, there are six types of action of the hand system, that is, in the X direction, the Y direction, the Z direction, an Rx direction, an Ry direction, and the Rz direction. Therefore, when action of the hand system is performed by manual operation of the six-axis type, vertical articulated-type robot, the action command generating unit is preferably capable of determining six types of input operations for individually operating the six types of actions. From the foregoing, when the robot operation apparatus subjects the six-axis type, vertical articulated-type robot to manual operation, the action command generating unit is preferably capable of determining at least six types of operation inputs.

Therefore, in a robot operation apparatus according to another exemplary embodiment, the touch panel is divided into a first area and a second area. The first area and the second area are areas on the touch panel in which an operation in a single direction or in two directions that are perpendicular to each other can be detected by the touch operation detecting unit. That is, the action command generating unit can determine a total of four types of drag operations by drag operations in two directions inputted in the first area and drag operations in two directions inputted in the second area. In addition, switching can be performed between the main operation and the sub-operation in each area. Therefore, the action command generating unit can determine a maximum of eight types of operation inputs. As a result, in a robot operation apparatus such as this, manual operation of the actions of the hand system and the actions of the axis system can be handled by both the four-axis type, horizontal articulated robot and the six-axis type, vertical articulated robot that are often used in the industrial arena.

A robot operation apparatus according to another exemplary embodiment includes a tilt operation detecting unit and an action command generating unit. The tilt operation detecting unit is capable of detecting input of a tilt operation by the user by detecting a tilt of the touch panel. The action command generating unit generates an action command for operating an articulated-type robot having a plurality of drive axes. In addition, the action command generating unit is capable of performing a horizontal movement action command generating process and a vertical movement action command generating process. The horizontal movement action command generating process is a process for generating the action command for moving a hand of the robot in a planar direction that is horizontal to an action reference plane of the robot, based on the touch operation detected by the touch operation detecting unit. The vertical movement action command generating process is a process for generating the action command for moving the hand of the robot along a vertical axis direction perpendicular to the action reference plane, based on the tilt operation detected by the tilt operation detecting unit.

That is, in the robot operation apparatus, the user can perform an operation to move the hand of the robot in the horizontal direction by performing a touch operation on the touch panel. As a result, when moving the hand of the robot in the horizontal direction, the user can easily recognize the two-dimensional operation on the touch panel and the movement of the hand of the robot in the horizontal direction, that is, the two-dimensional movement, in association. In addition, the user can perform an operation to move the hand of the robot in the vertical direction by performing an operation to tilt the touch panel. As a result, when moving the hand of the robot in the vertical direction, the user performs an operation of a mode differing from the touch operation on the touch panel, or in other words, performs an operation to tilt the touch panel. Therefore, the user can clearly differentiate between the operation for movement in the horizontal direction and the operation for movement in the vertical direction. Consequently, operability improves. As a result, safety can be improved, and time required for teaching the robot can be shortened.

In a robot operation apparatus according to another exemplary embodiment, the action command generating unit increases or decreases a movement speed or a movement amount of the robot based on a tilt amount of the tilt operation detected by the tilt operation detecting unit. As a result, the user can adjust the movement speed or the movement amount of the robot by adjusting the tilt amount of the touch panel during the tilt operation. Therefore, the user can intuitively perform the operation for moving the robot in the vertical direction. As a result, improvement in operability is achieved.

In a robot operation apparatus according to another exemplary embodiment, the touch panel has an action selection area and a movement amount determination area. The action selection area is an area that receives an operation for selecting a drive axis or an action mode of the robot to be operated. In this case, regarding the axis system, the drive axis is selected. Regarding the hand system, the action mode is selected. In addition, the movement amount determination area is an area that receives an operation for determining a movement amount of the robot. In this case, the movement amount of the robot includes a movement speed or a movement distance of the robot, in addition to the amount by which the robot is actually moved, that is, the movement distance of the robot. In a robot operation apparatus such as this, when selecting the action of the robot, the user performs a touch operation in the action selection area. When determining the movement amount of the robot, the user performs a touch operation in the movement amount determination area. Therefore, the user can clearly differentiate between the operation for selecting the action of the robot and the operation for determining the movement amount of the robot. Consequently, improvement in operability is achieved. As a result, improvement in safety is achieved, and the time required for teaching can be shortened.

A robot operation apparatus according to another exemplary embodiment further includes a start operation detecting unit that detects a start operation for starting reception of an operation in the action selection area. For example, the start operation detecting unit detects a touch operation on a button displayed on the touch panel or detects an operation of a button differing from the touch panel. The action command generating unit receives a touch operation in the action selection area after the start operation detecting unit detects the start operation.

That is, the action command generating unit does not receive a touch operation in the action selection area unless after the start operation detecting unit detects the start operation. That is, the user can perform an operation in the action selection area by intentionally performing the start operation. As a result, unintentional operation input in the action selection area can be reduced. Consequently, unintentional action being performed by erroneous operation can be suppressed. As a result, safety can be further improved.

In a robot operation apparatus according to another exemplary embodiment, the operation for selecting a drive axis or an action mode of a robot to be operated is an operation in which a number, a character, or a symbol corresponding to the drive axis or the action mode is inputted to the touch panel. As a result, when performing action of the axis system, for example, the user inputs the Arabic numeral "1" corresponding to a first axis when the first axis is to be operated. The user inputs the Arabic numeral "2" corresponding to a second axis when the second axis is to be operated. In addition, when performing action of the hand system, for example, the user inputs the alphabet "H" corresponding to a horizontal movement action when the robot is to be made to perform the horizontal movement action. The user inputs the alphabet "V" corresponding to a vertical movement action when the robot is to be made to perform the vertical movement action. The user inputs the alphabet "R" corresponding to a rotation action when the robot is to be made to perform the rotation action. Here, "H" is the first letter of "Horizontal", "V" is the first letter of "Vertical", and "R" is the first letter of "Rotational".

As a result, by inputting a number, a character, or a symbol to the touch panel, the user can perform an operation regarding a drive axis or an action mode corresponding to the input. Therefore, the user can easily recognize the operation input for determining the action of the robot and the action of the robot performed by the operation input, in association. Consequently, erroneous operation, that is, the user selecting an erroneous action is suppressed and improvement in operability is achieved. As a result, improvement in safety is achieved, and time required for teaching can be reduced.

In a robot operation apparatus according to another exemplary embodiment, in the robot operation apparatus, when an operation in the action selection area is detected, the action command generating unit disables detection of an operation in the movement amount determination area over a period until the operation is completed. For example, a touch operation by a single finger is often performed with the index finger of the right hand or the left hand. Therefore, when an operation for inputting a number or the like in the action selection area is performed, for example, erroneous touch in the movement amount determination area by the thumb on the same hand as the index finger performing the operation is likely to occur. In addition, the user may erroneously perform an operation running over the action selection area and the movement amount determination area. When such unintentional operation is detected, a determination is made that an operation in the movement amount determination area is performed, even in the midst of input to the action selection area. As a result, unintentional action is performed.

In the robot operation apparatus, when the operation in the action selection area is once detected, detection of a touch operation in the movement amount determination area is disabled over a period until the operation is completed. Therefore, when the range of the above-described area is set taking into consideration locations where the likelihood of an erroneous touch by an unintended finger is high, the occurrence of erroneous action, that is, another action that is unintended being performed, can be suppressed when a certain action is to be performed. Consequently, erroneous operation is suppressed and improvement in operability is achieved. As a result, improvement in safety is achieved, and time required for teaching can be reduced.

A robot operation apparatus according to another exemplary embodiment is capable of performing an operation determining process, a speed calculating process, and an action command generating process. The operation determining process is a process for determining, when a touch operation detected by the touch operation detecting unit is a drag operation, a movement amount of a finger in the drag operation. The speed calculating process is a process for calculating a movement speed of the robot based on the movement amount of the finger detected in the operation determining process. The action command generating process for generating an action command for moving the robot at the movement speed calculated in the speed calculating process.

As a result, a correlation is present between the movement amount of the finger in the drag operation by the user and the movement speed of the robot. Therefore, the user can adjust the movement speed of the robot by adjusting the movement amount of the finger in the drag operation. Consequently, the user can perform an intuitive operation, and improvement in operability is achieved. As a result, improvement in safety is achieved, and the time required for teaching can be reduced.

In a robot operation apparatus according to another exemplary embodiment, the action command generating unit is capable of performing a movement amount calculating process for calculating a movement distance of the robot based on the movement amount of the finger. As a result, the user can adjust the movement amount, that is, the movement distance of the robot by adjusting the movement amount of the finger in the drag operation. Furthermore, in the robot operation apparatus, the speed calculating process is a process for determining a movement speed of the robot based on a value obtained by the movement amount of the finger being divided by an amount of time required for input of the drag operation. As a result, the user can adjust the movement speed of the robot by adjusting the time required to input the drag operation.

Therefore, during input of the drag operation, the user can adjust both the movement speed and the movement amount of the robot by adjusting the movement amount and the input time of the drag operation. That is, the user can adjust both the movement speed and the movement amount of the robot by a single drag operation. As a result, the user can perform an intuitive operation. In addition, as a result, the user is not required to perform a plurality of operations, such as an operation for determining the movement speed of the robot and an operation for determining the movement amount of the robot, to determine the movement speed and the movement amount of the robot. Therefore, the operation is simplified and improvement in operability is achieved. As a result, improvement in safety is achieved, and the amount of time required for teaching can be reduced.

In a robot operation apparatus according to another exemplary embodiment, the action command generating unit is capable of performing the operation determining process, the speed calculating process, and the action command generating process at a certain cycle, while the drag operation is being performed. In this case, while a drag operation is being performed refers to a period from when the finger of the user touches the touch panel and the drag operation is started until the finger of the user separates from the touch panel. The completion of the drag operation is when the finger of the user separates from the touch panel. As a result, the action command generating unit can generate an action command without waiting for the completion of the drag operation. Therefore, the robot operation apparatus can operate the robot in substantially real-time in relation to the drag operation by the user. Therefore, the user can perform a more intuitive operation. As a result, improvement in safety and shortening of teaching time can be achieved.

In the above-described robot operation apparatus, a scaling factor may be set between operation input and output (movement of the robot). For example, when the scaling factor is set to 0.1 times, the user can move the robot by 0.1 mm by performing a drag operation of 1 mm. As a result, the robot can be made to perform precise action equal to or greater than the operation input. However, the following problem occurs when the scaling factor is simply set. That is, for example, there are cases in which a large action in several to several tens of millimeter units (coarse action) is to be performed while performing fine action (fine action) in 0.1 mm units. However, when the scaling factor is set to 0.1 times, for example, the robot can only be moved slightly, by 20 mm, even by a drag operation of 200 mm (corresponding to the length of a long side of a 10 inch screen). Therefore, when attempting to move the robot by 1000 mm, for example, the user has to repeat the drag operation of 200 mm, 50 times. The operation is cumbersome and operability is poor.

Therefore, in a robot operation apparatus according to another exemplary embodiment, the action command generating unit is capable of performing an operation determining process and a movement amount determining process. The operation determining process is a process for determining a movement amount of a finger in a drag operation detected by the touch operation detecting unit. The movement amount determining process is a process for setting, regarding a scaling factor for determining a movement amount of the robot by increasing or decreasing the movement amount of the finger determined in the operation determining process, the scaling factor from an operation start point until the drag operation passes a first segment to a first scaling factor that is a fixed value less than 1, sets the scaling factor after the drag operation passes the first segment to a value greater than the first scaling factor; and determining the movement amount of the robot.

As a result, the user can move the robot at the first scaling factor that is a fixed scaling factor less than 1, by performing the drag operation in the first segment. That is, the user can make the robot perform fine action (fine action) by repeatedly performing the drag operation in the first segment. In addition, by performing the drag operation beyond the first segment, the user can move the robot at a scaling factor greater than the first scaling factor for the portion beyond the first segment. That is, the user can make the robot perform a relatively large action (coarse action) by performing an operation beyond the first segment. In this way, the user can move the robot at differing scaling factors in a single drag operation. That is, as a result, for example, both actions, that is, fine action and coarse action of the robot can be actualized by a single drag operation. Therefore, the user can actualize both the fine action and the coarse action without performing a special operation for switching between the fine action and the coarse action of the robot. Consequently, the operation is simplified, and improvement in operability is achieved. As a result, improvement in safety is achieved, and time required for teaching can be reduced.

In a robot operation apparatus according to another exemplary embodiment, the movement amount determining process is a process for setting the scaling factor after the movement of the finger in the drag operation passes the first segment until the movement passes a second segment to a second scaling factor, setting the scaling factor after the movement of the finger in the drag operation passes the second segment to a third value that is a fixed value, and determining the movement amount of the robot. As a result, the user can operate the robot at the first scaling factor that is less than 1 (fine action) by repeatedly performing the drag operation in the first segment. In addition, the user can make the robot operate at the second scaling factor or the third scaling factor that is greater than the first scaling factor (coarse action) by performing the drag operation beyond the first segment.

Furthermore, the second scaling factor is a value within a range from the first scaling factor to the third scaling factor that continuously increases depending on the movement amount of the finger in the drag operation. As a result, the second scaling factor that is a scaling factor between the fine action at the first scaling factor and the coarse action at the third scaling factor can be continuously increased depending on the movement amount of the finger of the drag operation, within the range from the first scaling factor to the third scaling factor. That is, the first scaling factor and the third scaling factor, which are fixed values, are connected by the second scaling factor that continuously changes. Therefore, the scaling factor for determining the movement amount of the robot in relation to the operating amount of the drag operation by the user switches from the first scaling factor to the third scaling factor, through the second scaling factor that gradually changes. As a result, the scaling factor for determining the movement amount of the robot suddenly switching from the first scaling factor to the third scaling factor can be prevented. That is, the movement of the robot suddenly changing from fine action to coarse action can be prevented. Therefore, sudden changes in speed (sudden action) of the robot that occur as a result of sudden change in scaling factor that is unintended by the user can be prevented. As a result, further improvement in safety can be achieved.

In a robot operation apparatus according to another exemplary embodiment, the touch operation detecting unit detects a touch operation on a touch panel provided in a case that can be held by the user. In a configuration such as this, the user grips the case in one hand, and thereupon, performs each operation with the fingers of the other hand. At this time, the finger of the one hand gripping the case may come into contact with the touch panel. When the drag operation by a single finger is performed, for example, should an erroneous touch by the hand on the gripping side be detected, a determination is made that the drag operation by two fingers has been performed. As a result, unintentional vertical movement action or rotation action is performed.

Therefore, in the robot operation apparatus described herein, the touch operation detecting unit excludes, from a detection target, a touch operation in an area of a predetermined range adjacent to a gripping portion that is expected to be gripped when the user holds the case. As a result, when the drag operation by a single finger is performed such that the horizontal movement action is performed, even should an erroneous touch operation by a finger on the gripping side be performed, for example, the erroneous touch operation is not detected. Therefore, occurrence of an erroneous action, that is, another action that is unintended being performed can be suppressed with certainty.

A robot system according to another exemplary embodiment includes; a four-axis, horizontal, articulated-type robot; a controller that controls an action of the robot; and a robot operation apparatus described above. The four-axis, horizontal, articulated-type robot is capable of performing an action of a hand system or an action of an axis system. The action of a hand system includes an action for moving the hand of the robot in a planar direction horizontal to the action reference plane of the robot (horizontal movement action), an action for moving the hand of the robot in a vertical axis direction perpendicular to the action reference plane (vertical movement action), and an action for rotating the hand of the robot around the vertical axis. Meanwhile, as described above, the robot operation apparatus is capable of generating an action command for performing an action of the hand system (the horizontal movement action, the vertical movement action, and the rotation action) and an action command for performing an action of the axis system, based on manual operation by the user. Therefore, as a result of the present means, actions required of the robot to be operated can be actualized by manual operation.

A robot system according to another exemplary embodiment includes: a six-axis, vertical, articulated-type robot; a controller that controls an action of the robot; and a robot operation apparatus descried above. In addition to the actions (the horizontal movement action, the vertical movement action, and the rotation action) performed by the above-described four-axis, horizontal, articulated-type robot, the six-axis, vertical, articulated-type robot is capable of performing an operation for rotating the hand around two axes differing from the above-described vertical axis (Z-axis). The two axis are two axes (X-axis and Y-axis) that are perpendicular to each other and horizontal in relation to the action reference plane.

Therefore, in the robot system described herein, when action of the hand system is performed, not all of the actions that the robot to be operated is capable of performing can be actualized by manual operation. However, in the case of the six-axis, vertical, articulated-type robot as well, problems do not occur overall, as long as the above-described horizontal movement action, vertical movement action, and rotation action (around the Z-axis) can be performed. A reason for this is that, because the frequency of the three actions being performed is extremely high during manual operation, user convenience is not significantly compromised by the present means as well.

A robot operation program according to another exemplary embodiment actualizes robot operation apparatuses described above. As a result of these robot operation programs being run on, for example, a general-purpose tablet personal computer (PC) that is provided with a touch panel, the general-purpose tablet PC or the like can be provided functions as the above-described robot operation apparatus.

BRIEF DESCRIPTION OF DRAWINGS

FIG. 3 is a diagram of an example of correspondence between various touch operations and manual operation content of a robot according to the first embodiment;

FIG. 15 is a diagram of an example of a correspondence between operating directions of a drag operation and manual operation content of a robot according to the third embodiment;

FIG. 16 is a diagram of an example of rotation directions of a flange in relation to operating directions of a drag operation according to the third embodiment;

FIG. 19 is a diagram of an example of a correspondence between operating directions of a drag operation and manual operation of a robot according to a fourth embodiment;

FIG. 20 is a diagram of an example of movement directions of a six-axis type robot in relation to operating directions of a drag operation according to the fourth embodiment;

FIG. 22 is a diagram of an example of a correspondence between operating directions of a drag operation and manual operation of a robot according to a fifth embodiment;

FIG. 23 is a diagram of an example of movement directions of a six-axis type robot body knowing operating directions of a drag operation according to the fifth embodiment;

FIG. 26 is a diagram of a correspondence between operating directions of a drag operation and manual operation of a robot according to a sixth embodiment;

FIG. 27 is a diagram of a correspondence between operating directions of a drag operation and manual operation of a robot according to a seventh embodiment;

FIG. 28 is a diagram of a correspondence between operating directions of a drag operation and manual operation of a robot according to an eighth embodiment;

FIG. 30 is a diagram of a correspondence between operating directions of a drag operation and manual operation of a robot according to a ninth embodiment;

FIG. 31 is a diagram of a correspondence between operating directions of a drag operation and manual operation of a robot according to a tenth embodiment;

FIG. 32 is a diagram of a correspondence between operating directions of a drag operation and manual operation of a robot according to an eleventh embodiment;

FIG. 33 is a diagram of a correspondence between operating directions of a drag operation and manual operation of a robot according to a twelfth embodiment;

FIG. 34 is a diagram of a correspondence between operating directions of a drag operation and manual operation of a robot according to a thirteenth embodiment;

FIG. 35 is a diagram of a correspondence between operating directions of a drag operation and manual operation of a robot according to a fourteenth embodiment;

FIG. 36 is a diagram of an example of a first area and a second area according to the fourteenth embodiment;

FIG. 47 (1) is a diagram of a correlation between the movement amount of a finger in a drag operation and operation scaling factor and (2) is a diagram of a correlation between the movement amount of a finger in a drag operation and the movement amount of a robot according to the eighteenth embodiment;

FIG. 48 shows another example differing from that in FIG. 47, in which (1) is a diagram of a correlation between the movement amount of a finger in a drag operation and operation scaling factor and (2) is a diagram of a correlation between the movement amount of a finger in a drag operation and the movement amount of a robot according to the eighteenth embodiment.

DESCRIPTION OF EMBODIMENTS

A plurality of embodiments of the present invention will hereinafter be described. Configurations according to the embodiments that are essentially the same are given the same reference numbers. Descriptions thereof will be omitted.

First Embodiment

Figure 1:
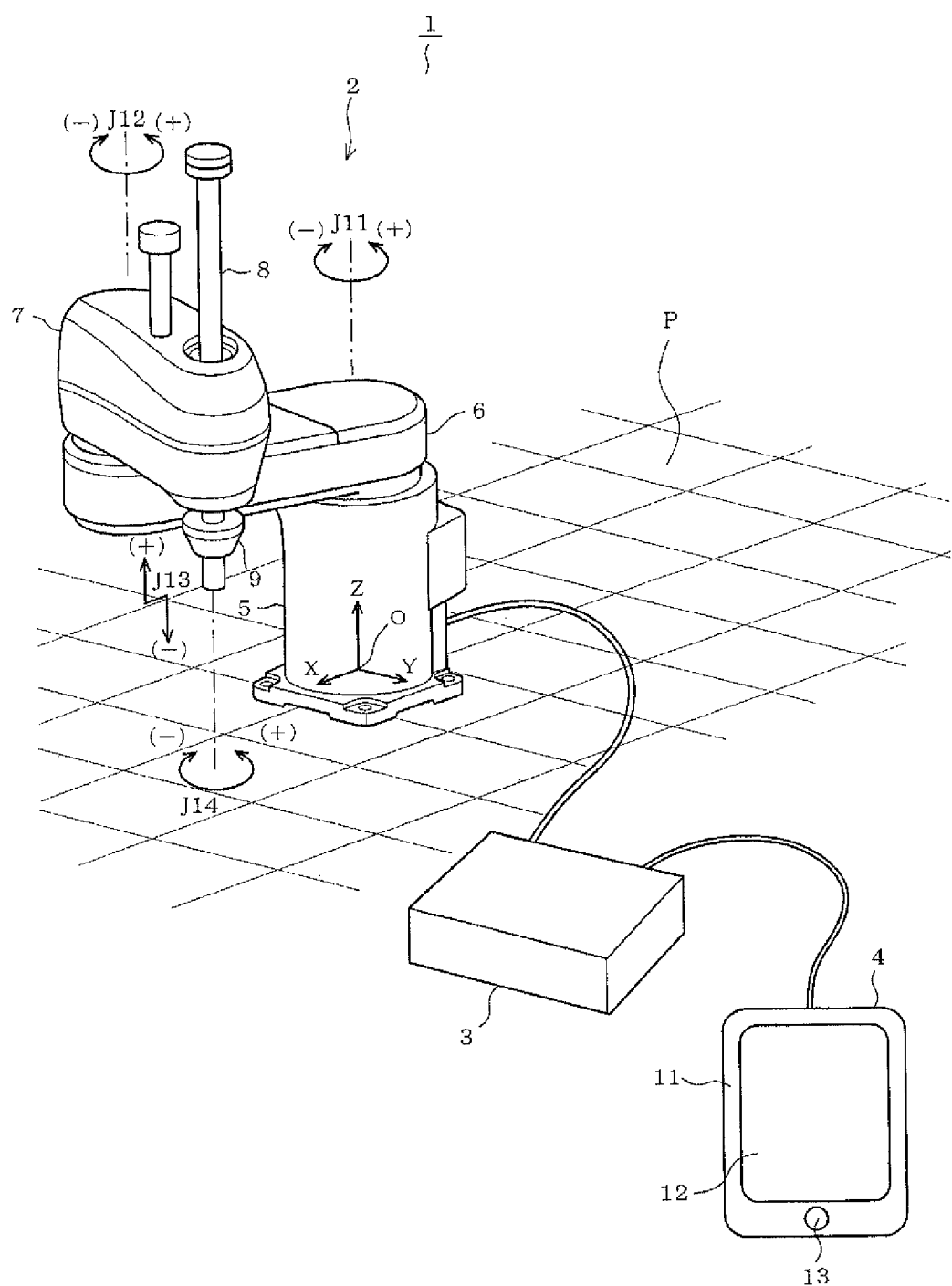
FIG. 1 is an overall configuration diagram of an example of a robot system according to a first embodiment.

A first embodiment of the present invention will be described below, with reference to FIG. 1 to FIG. 9, FIG. 1 shows a system configuration of a typical robot for industrial use. A robot system 1 shown in FIG. 1 is configured by a robot 2, a controller 3, and a teaching pendant 4 (corresponding to a robot operation apparatus). The robot 2 is configured as, for example, a four-axis horizontal articulated-type robot. The robot 2 operates based on a unique robot coordinate system (a three-dimensional orthogonal coordinate system composed of an X-axis, a Y-axis, and a Z-axis). According to the present embodiment, in the robot coordinate system, the center of a base 5 is defined as a point of origin O, a top surface of a work table P is defined as an X-Y plane, and a coordinate axis perpendicular to the X-Y plane is defined as the Z-axis. The top surface of the work table P is an installation surface for installing the robot 2. In this case, the installation surface corresponds to an action reference plane. The action reference plane is not limited to the installation surface and may be an arbitrary plane.

The robot 2 is configured by the base 5, a first arm 6, a second arm 7, and a shaft 8. The base 5 is fixed to the top surface of the work table P (also referred to, hereafter, as the installation surface). The so first arm 6 is connected to the base 5 such as to be capable of rotating around a first axis J11. The first axis J11 has an axial center in the Z-axis (vertical axis) direction. The second arm 7 is connected to a tip end portion of the first arm 6 such as to be capable of rotating around a second axis J12. The second axis J12 has an axial center in the Z-axis direction. The shaft 8 is provided in a tip end portion of the second arm 7 such as to be capable of moving up and down, and to be capable of rotating. An axis for when the shaft 8 is moved up and down is a third axis J13. An axis for when the shaft 8 is rotated is a fourth axis J14. A flange 9 is positioned and detachably attached to a tip end portion (lower end portion) of the shaft 8.

The base 5, the first arm 6, the second arm 7, the shaft 8, and the flange 9 function as an arm of the robot 2. An end effector (hand) (not shown) is attached to the flange 9 that is the arm tip. For example, when component inspection or the like is performed using the robot 2, a camera for imaging the component to be inspected or the like is used as the end effector. The plurality of axes (J11 to J14) provided in the robot 2 are driven by motors (not shown) respectively provided in correspondence thereto. A position detector (not shown) for detecting a rotation angle of a rotation shaft of the motor is provided near each motor.

The controller 3 that controls the robot 2 is connected to the robot 2 by a connection cable. The teaching pendant 4 is connected to the controller 3 by a connection cable. Data communication is performed between the controller 3 and the teaching pendant 4 by way of a communication interface (indicated with reference number 10 in FIG. 2). As a result, various pieces of operating information inputted based on user operation are transmitted from the teaching pendant 4 to the controller 3. In addition, the controller 3 transmits various control signals, signals for display, and the like, and also supplies power for driving, to the teaching pendant 4.

When a signal issuing a command for manual operation is provided by the teaching pendant 4, the controller 3 performs control such that the robot 2 is manually operated. In addition, when a signal issuing a command for automatic operation is provided by the teaching pendant 4, the controller 3 performs control such that the robot 2 is automatically operated by startup of an automatic program that is stored in advance.

For example, the size of the teaching pendant 4 is to an extent that allows the user to carry the teaching pendant 4 or to operate the teaching pendant 4 while holding the teaching pendant 4 in their hand. The teaching pendant 4 is provided with a case 11 that, for example, is shaped like a thin, substantially rectangular box. The teaching pendant 4 includes a display unit 12 in a center portion of the front surface side of the case 11. The display unit 12 is, for example, composed of a liquid crystal display. The display unit 12 is configured by a touch panel 17 and displays various types of screens. The touch panel 17 allows the robot to be taught movement by information that commands movement of the hand of the robot in space, that is, drag operations on the touch panel that imitate or suggest actions, such as horizontal movement action, vertical movement action, and rotation action, or in other words, gestures. Therefore, in the present invention and the like, a teaching method in which these drag operations are used is referred to as "gesture teaching".

The teaching pendant 4 has various key switches 13 that are physical switches, in the periphery of the display unit 12. In FIG. 1, a single key switch 13 is shown. The key switch 13 may be substituted with a button that is displayed in the display unit 12 of the touch panel 17. The user performs various input operations through the touch panel 17 of the display unit 12 and the key switches 13.

The user (operator) can perform various functions, such as operation and setting of the robot 2, using the teaching pendant 4. The user can call up a control program stored in advance and perform startup of the robot, setting of various parameters, and the like. In addition, the user can also perform various teaching operations by operating the robot 2 by manual operation, that is, operation by hand. In the display unit 12, a menu screen, a setting input screen, a status so display screen, and the like are displayed as required.

Figure 2:
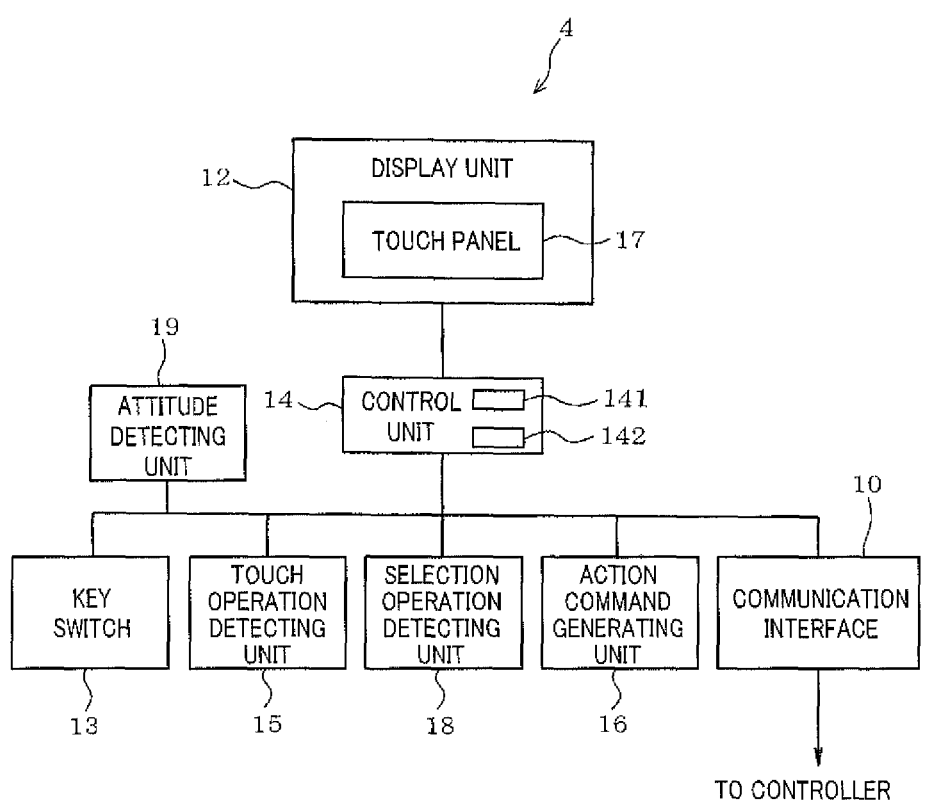
FIG. 2 is a block diagram of an example of an electrical configuration of a teaching pendant according to the first embodiment.

Next, an electrical configuration of the teaching pendant 4 will be described with reference to FIG. 2.

The teaching pendant 4 includes the above-described communication interface 10, display unit 12, and key switches 13. In addition, the teaching pendant 4 includes a control unit 14, a touch operation detecting unit 15, an action command generating unit 16, a selection operation detecting unit 18, and an attitude detecting unit 19. The control unit 14 is mainly configured by a microcomputer. The microcomputer includes, for example, a central processing unit (CPU) 141 and a storage area (or device) 142 which composes a non-transitory computer readable medium, such as a read-only memory (ROM), a random access memory (RAM), and a rewritable flash memory. The control unit 14 controls the overall teaching pendant 4. The storage area 142 stores therein a robot operation program. The control unit 14 runs the robot operation program in the CPU 141, thereby virtually actualizing the touch operation detecting unit 15, the action command generating unit 16, and the like through software. The touch operation detecting unit 15 and the action command generating unit 16 may also be actualized by hardware as an integrated circuit that is integrated with the control unit 14, for example.

The touch operation detecting unit 15 detects a touch operation performed on the touch panel 17. Specifically, the touch operation detecting unit 15 is capable of detecting whether or not a touch operation is performed, the position on the screen at which the touch operation is performed (touch position), the type of touch operation, and the like. That is, the touch operation detecting unit 15 is capable of detecting, in addition to whether or not the touch operation is a drag operation, the number of fingers, the movement direction of a finger, the movement amount of a finger, and the like in the touch operation. The present embodiment applies to a drag operation by a single finger or two fingers. Therefore, the touch operation detecting unit 15 is merely required to detect a touch operation by two fingers, at the most. A two-dimensional orthogonal coordinate system is set in the touch panel 17. The touch operation detecting unit 15 is capable of detecting the touch position and the type of touch operation, as well as the movement direction (drag direction), the movement amount (drag amount), and the like, based on the two-dimensional orthogonal coordinate system. The above-described drag operation refers to an operation in which a finger is moved while touching.

The selection operation detecting unit 18 is capable of detecting a selection operation by the user on the touch panel 17 or a button differing from the touch panel 17. The selection operation is an operation for selecting a drive axis of the robot 2 to be operated or an action mode. According to the present embodiment, the selection operation is performed on the touch panel 17. That is, the selection operation detecting unit 18 can detect the selection operation by the user on the touch panel 17. In this case, the touch operation detecting unit 15 and the selection operation detecting unit 18 both detect a touch operation by the user on the touch panel 17. The attitude detecting unit 19 is, for example, a gyro sensor or an acceleration sensor. The teaching pendant 4 can detect its own attitude in relation to the direction of gravitational force based on the detection result of the attitude detecting unit 19.

The action command generating unit 16 generates an action command for manually operating the robot based on the touch operation detected by the touch operation detecting unit 15. The action command generated by the action command generating unit 16 is provided to the controller 3 via the communication interface 10. Through use of the teaching pendant 4 configured in this way, the user can perform manual operation of the robot 2 by touch operation, As shown in FIG. 3, manual operation (gesture teaching) of the robot 2 that can be actualized through touch operation is the following three actions (1) to (3).

(1) Horizontal Movement Action

Horizontal movement action (also referred to as planar action in FIG. 3 and the like) is an action in which the hand of the robot 2 is moved in the X-Y plane direction that is horizontal to the installation surface. The horizontal movement action is performed based on a first operation. The first operation is a drag operation by a single finger. In this case, the direction of the planar movement is determined based on the drag direction of the drag operation by a single finger (first operation). The movement amount of the planar movement (movement distance) is determined based on the drag amount.

(2) Vertical Movement Action

Vertical movement action (also referred to as a Z-axis action in FIG. 3 and the like) is an action in which the hand of the robot 2 is moved in the Z-axis direction perpendicular to the installation surface P that serves as an action reference plane. The vertical movement action is performed based on a second operation. According to the present embodiment, the second operation is a linear drag operation in a predetermined direction by two fingers. In this case, the second operation is an operation in which two fingers are dragged in the same straight line. The operation for dragging two fingers in straight line (second operation) includes an operation in which the distance between the fingers gradually increases (a so-called spread operation or pinch-out operation) and an operation in which the distance between the fingers gradually decreases (a so-called pinch operation or pinch-in operation).

Of these operations, when the spread operation is performed, an action in which the hand of the robot 2 is moved in a direction that is the Z-axis direction and approaching the installation surface (referred to as an approaching direction or a downward direction) is performed. In addition, when the pinch operation is performed, an action in which the hand of the robot 2 is moved in a direction that is the Z-axis direction and away from the installation surface (referred to as a separating direction or an upward direction) is performed. In this case, the movement amount (movement distance) in the Z-axis direction is determined based on the distance between the fingers.

(3) Rotation Action

Rotation action (referred to as an RZ-axis action in FIG. 3 and the like) is an action in which the hand of the robot 2 is rotated around the Z-axis. In this case, the rotation direction of the rotation action is an Rz direction. The rotation action is performed based on a third as operation. The third operation is an operation that is a drag operation by two fingers in a direction differing from that of the second operation. According to the present embodiment, the third operation is a drag operation by two fingers in a circumferential direction. In other words, according to the present embodiment, the third operation is an operation in which at least either of the two fingers is dragged in a curved line, that is, such as to draw a circular arc (a so-called rotation operation). In this case, the direction of the rotation action (rotation direction) is determined based on the direction of the above-described rotation operation by the finger. The rotation amount is determined based on the drag amount.

To actualize actions such as those described above, the action command generating unit 16 performs an operation determining process and an action command generating process. The operation determining process includes a process for determining the drive axis of the robot 2 to be operated or an action mode (in this case, the action mode) based on the selection operation detected by the selection operation detecting unit 18. In addition, the operation determining process includes a process for determining, when the touch operation detected by the touch operation detecting unit 15 is a drag operation, the movement amount of the drag operation. Furthermore, the action command generating process includes a process for determining the movement amount of the robot 2 based on the movement amount of the drag operation determined in the operation determining process, and generating an action command for moving the robot 2 by the determined movement amount at the drive axis to be operated or in the action mode.

Figure 4:
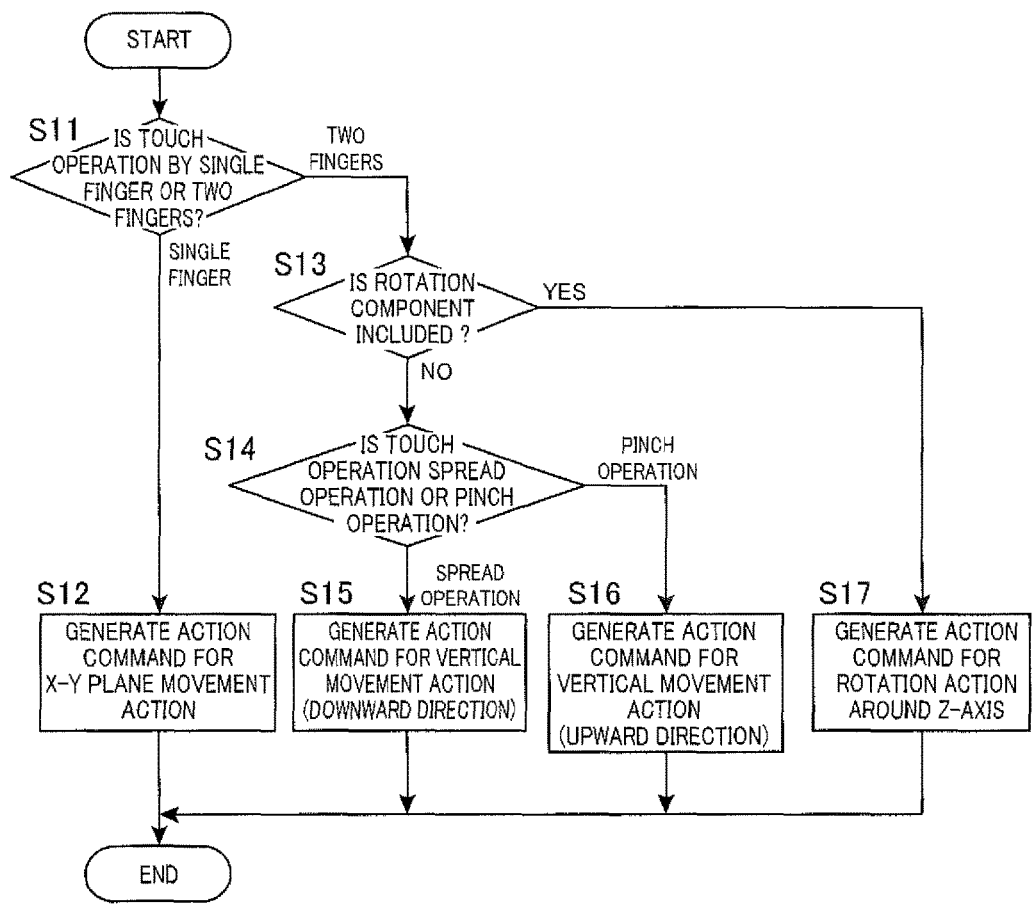
FIG. 4 is a flowchart of an example of the details of various processes performed by an action command generating unit according to the first embodiment.
Figure 5:
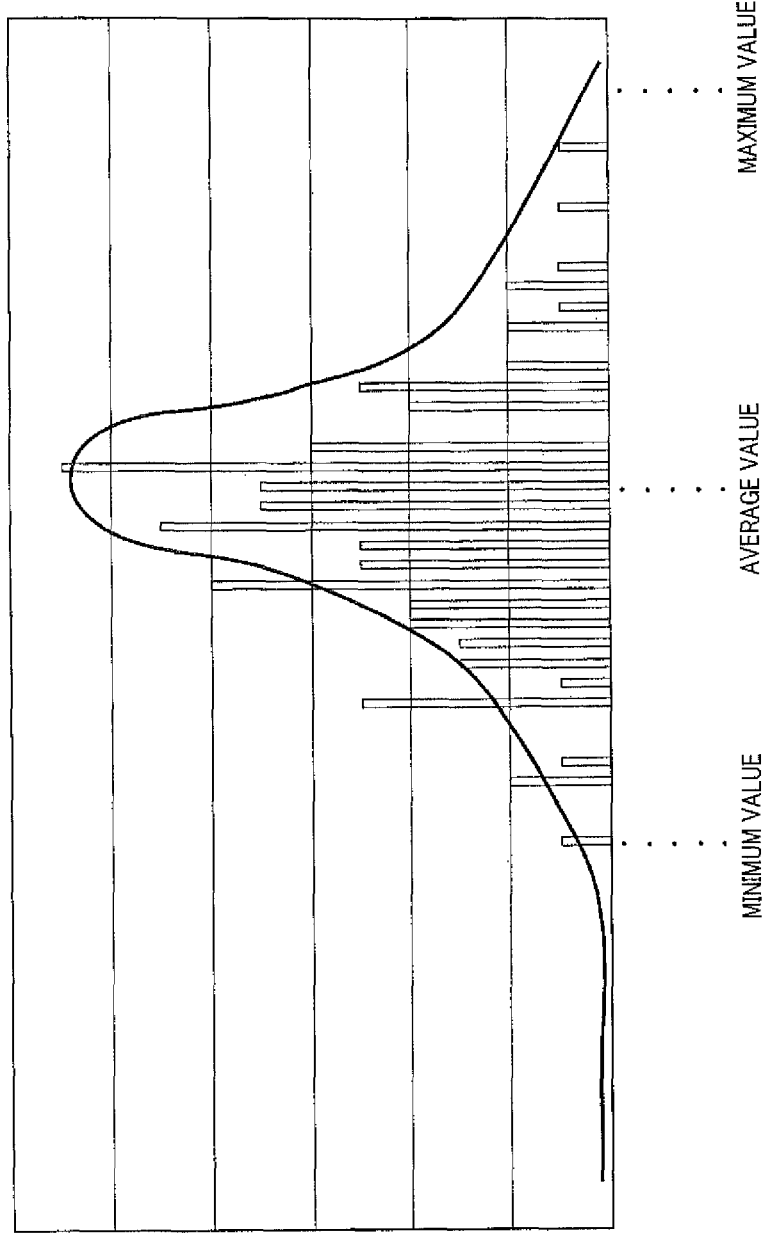
FIG. 5 is a diagram of a distribution of lag time in the timings of touch performed with two fingers according to the first embodiment.

That is, as shown in FIG. 4, the action command generating unit 16 performs the operation determining process at steps S11, S13, and S14. The operation determining process includes a process for determining the drive axis of the robot 2 to be operated or the action mode based on the selection operation detected by the selection operation detecting unit 18. In addition, the operation determining process includes a process for determining the number of fingers, the operating direction, and the movement amount of the touch operation detected by the touch operation detecting unit 15. The action command generating unit 16 performs the action command generating process at steps S12, S15, S16, and S17. The action command generating process is a process for determining the movement direction of the hand of the robot 2 based on the number of fingers and the operating direction determined in the above-described operation determining process, determining the movement amount of the hand of the robot 2 based on the movement amount determined in the above-described operation determining process, and generating an action command for moving the hand of the robot 2 based on the determined movement direction and movement amount.

Specifically, at step S11, the action command generating unit 16 determines the number of fingers and the direction of the touch operation detected by the touch operation determining unit 15, thereby determining whether or not the touch operation is the first operation. That is, the action command generating unit 16 determines whether the touch operation detected by the touch operation detecting unit 15 is a drag operation by a single finger or by two fingers (S11; first operation determining process). When determined, at step S11, that the touch operation is a drag operation by a single finger (first operation), at step S12, the action command generating unit 16 generates an action command for moving the hand of the robot 2 in the X-Y plane direction (S12; horizontal movement action command generating process).

In addition, when determined, at step S11, that the touch operation is a drag operation by two lingers, that is, when determined that the touch operation is the second operation or the third operation rather than the first operation, at step S13, the action command generating unit 16 determines whether or not the touch operation is a drag operation by two finders in the circumferential direction (third operation) (S13; second operation determining process). Whether or not the touch operation is the third operation is determined based on whether or not a rotation component is included in at least either of the drag operations by the two fingers. When determined, at step S13, that a rotation component is not included and the touch operation is not the third operation (NO), at step S14, the action command generating unit 16 determines whether or not the touch operation is the second operation (S14; third operation determining process). Whether or not the touch operation is the second operation is determined based on whether the distance between the two fingers becomes gradually shorter or gradually longer during the period over which the drag operation by the two fingers is performed.

When determined, at step S14, that the distance between the fingers becomes gradually longer (spread operation at step S14), the action command generating unit 16 generates an action command for moving the hand of the robot 2 in the Z-axis direction and the downward direction (S15; approach command generating process of the vertical movement action command generating process). In addition, when determined, at step S14, that the distance between the fingers becomes gradually shorter (pinch operation at step S14), the action command generating unit 16 generates an action command for moving the hand of the robot 2 in the Z-axis direction and the upward direction (S16; separate command generating process of the vertical movement action command generating process).

In addition, when determine, at step S13, that a rotation component is included (YES), the action command generating unit 16 generates an action command for rotating the hand of the robot 2 around the Z-axis (S17; rotation action command generating process). After performing steps S12 or S15 to S17, the processes are completed (end). Then, as a result of the controller 3 controlling the action of the robot 2 based on the above-described action command, the above-described horizontal movement action, vertical movement action, or rotation action is performed.

As described above, according to the present embodiment, when a predetermined operation is performed during manual operation of the action of a hand system of the robot 2, the robot 2 is made to perform an action of the hand system that is considered easily associated by the user from the operation. In this case, the reasoning for the association between each operation and the action corresponding to the operation is based on visual and tactile information, and the like of humans. For example, the reasoning lies in the following points. First, the reasoning for the horizontal movement action being associated with the drag operation by a single finger lies in the following point. That is, the touch panel 17 to be touch-operated is a plane and a two-dimensional coordinate system is formed thereon. When a drag operation by a single finger is performed, the mode is such that a single touch location moves along a plane such as this. That is, in this case, a close correlation (synchronism) is thought to be present between the touch location by the single finger moving over the plane and the robot moving in the X-Y plane direction.

In addition, the reasoning for vertical movement action in the downward direction being associated with the drag operation performed such that the distance between two fingers becomes gradually longer lies in the following two points. When such an operation is performed, the mode is such that the two fingers are spread apart. The spreading apart of the fingers is thought to suggests, to the user, movement in the downward direction. This is a first reasoning. In addition, the above-described operation is generally often used as an operation for enlarging an image or the like. When a camera is attached to the hand of the robot 2, an image captured by the camera is enlarged as a result of the hand moving in the downward direction. That is, when a camera is attached to the hand, an image being enlarged (the hand moving in the downward direction) is thought to be easily associated with the distance between the fingers becoming longer and the space between the two fingers widening. This is a second reasoning.

Furthermore, the reasoning for vertical movement action in the upward direction being associated with the drag operation preformed such that the distance between two fingers becomes gradually shorter lies in the following two points. When such an operation is performed, the mode is such that the two fingers are lifted upwards. The lifting up of the fingers is thought to suggest, to the user, movement in the upward direction. This is a first reasoning. In addition, the above-described operation is generally often used as an operation for reducing an image or the like. When a camera is attached to the hand of the robot 2, an image captured by the camera is reduced as a result of the hand moving in the upward direction. That is, when a camera is attached to the hand, an image being reduced (the hand moving in the upward direction) is thought to be easily associated with the distance between the fingers becoming shorter and the space between the two fingers narrowing. This is a second reasoning.

In addition, the reasoning for rotation action being associated with the rotation operation by either of the two fingers lies in the following point. That is, the rotation axis of the hand of the robot 2 is the cylindrical shaft 8. The cylindrical flange 9 is attached to the tip of the shaft 8. That is, the shape of the hand portion of the robot 2 is rounded. When the rotation operation is performed, the mode is such that the hand rotates while drawing a circular arc. That is, in this case, the hand rotating while drawing a circular arc is thought to suggest, to the user, a rotation action in which a rounded object is rotated, that is, the hand of the robot is rotated.

In this way, each operation according to the present embodiment enables the user to intuitively associate the operation with the action performed by the robot 2 in response to the operation. In addition, each operation is a simple operation. Therefore, the user can perform each operation without looking at their own hand (operating location). As a result, the user no longer looks away from the robot 2 during manual operation of the robot 2, and safety thereof can be favorably maintained. In this way, according to the present embodiment, an excellent effect is achieved in that manual operation of the robot 2 can be actualized by touch operation, without causing decrease in safety.

In addition, the four-axis horizontal articulated-type robot 2 is able to perform an action in which the hand thereof is moved in the X-Y plane direction that is horizontal in relation to the installation surface of the robot 2, an action in which the hand thereof is moved in the Z-axis direction perpendicular to the installation surface, and an action in which the hand thereof is rotated around the Z-axis. Meanwhile, the teaching pendant 4 is able to generate the action commands for performing the horizontal movement action, the vertical movement action, and the rotation action based on manual operation by the user, as described above. Therefore, according to the present embodiment, all actions that can be performed by the robot 2 to be operated can be actualized by manual operation.

To facilitate confirmation of whether or not the robot 2 is operating as intended during manual operation of the robot 2, the user often performs each action (horizontal movement action, vertical movement action, and rotation action) independently. For example, first, the horizontal movement action is performed. Next, the vertical movement action is performed. Finally, the rotation action is performed. In light of such circumstances, during manual operation of the robot 2, it is rare for a plurality of actions to be deliberately performed at the same time (mixed). Therefore, during manual operation of the robot 2, it is preferable that simultaneous execution of a plurality of actions is not permitted. To do so, it is necessary to clearly draw a line between (separate) the operations for performing the actions. When the line between actions is unclear, an action that is a mixture of a plurality of actions is performed. As a result, the likelihood of an action unintended by the user being performed (an erroneous action occurring) increases.

According to the present embodiment, to further reduce the likelihood of the occurrence of such erroneous actions, the following measure is taken to clarify the separation between operations. That is, when a single touch-operation location is detected, the action command generating unit 16 performs the process at step S11 after a predetermined allowable delay time has elapsed from the time of detection. When the user performs a touch operation with a plurality of fingers (in this case, two fingers), it is difficult for the touch timings of the plurality of fingers (in this case, two fingers) to perfectly match. Therefore, for example, even when a touch operation by a plurality of fingers (in this case, two fingers) is performed so as to perform the vertical movement action, an unintentional horizontal movement action is temporarily performed at the time the touch by one finger is performed. Subsequently, the originally intended vertical movement action is performed at the time the touch by the other finger is performed.

According to the present embodiment, when the lag in the timing of touch among the plurality of fingers (in this case, two fingers) is less than the allowable delay time, the touch operation is determined to be a drag operation by a plurality of fingers (in this case, two fingers). That is, a lag in the timing of touch among the plurality of fingers up to the allowable delay time is allowed. Therefore, when the allowable delay time is set based on, for example, the maximum value conceivable as the lag in timing by human operation, the occurrence of erroneous action, that is, the horizontal movement action being temporarily performed, can be prevented with certainty.

The present inventors conducted an operating test on a plurality of evaluators. In the operating test, two fingers were simultaneously placed on a touch panel. Based on an analysis of the results, the difference in detection time of touch by the two fingers has a distribution such as that shown in FIG. 5. The minimum value of the above-described detection time (the lag in the timing of touch between the two fingers) is "0.074 seconds", the average value is "0.126 seconds", and the maximum value is "0.178 seconds". According to the present embodiment, the allowable delay time is set to "0.178 seconds" based on such results of the operating test.

When the user performs the drag operation with a plurality of fingers (in this case, two fingers) to perform the vertical movement action, it is difficult for the user to move each finger in a perfectly straight line. Therefore, even when the user attempts to move the two fingers in a straight line to perform the vertical movement action, should either finger even slightly not move in a straight line, a determination is made that a rotation component is included. An unintentional rotation action is performed.

Figure 6:
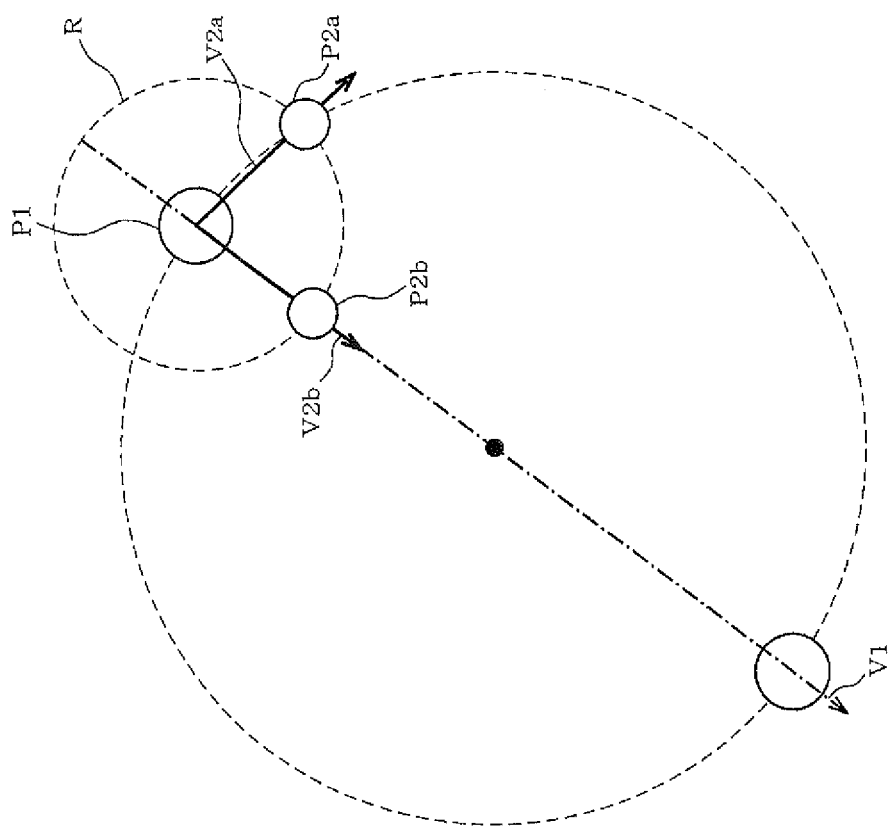
FIG. 6 is a diagram for explaining the criteria for determining whether or not a rotation component is included in a drag operation according to the first embodiment.

Therefore, at step S13, the action command generating unit 16 determines whether or not a rotation component is included in the following manner. That is, as shown in FIG. 6, the action command generating unit 16 determines whether or not the rotation component is included based on an angle formed by a vector V1 and a vector V2. The vector V1 is between the two fingers. The vector V2 relates to the movement of one of the two fingers. In this case, the vector V1 and the vector V2 are defined as follows.

That is, in FIG. 6, the start position of the drag operation of one finger is P1. A dead region R having a minute radius and the position P1 as the center is set. In addition, an escape position at which the one finger escapes the dead region R is P2. A vector from the start position P1 to the start position of the drag operation by the other finger is set to vector V1. A vector from the start position P1 to the escape position P2 is set to vector V2.

As a result, when the user performs a drag operation in which two fingers are rotated, the position at which the one finger escapes the dead region R is a position such as position P2a in FIG. 6. Therefore, in this case, the angle formed by the vector V1 and the vector V2 (indicated as V2a in FIG. 6) is a relatively large value (a value close to 90 degrees). Meanwhile, when the user performs a drag operation in which the two fingers are moved in a straight line, the position at which the one finger escapes the dead region R is a position such as position P2b in FIG. 6. Therefore, in this case, the angle formed by the vector V1 and the vector V2 (indicated as V2b in FIG. 6) is a relatively small value (a value close to 0 degrees).

Figure 7:
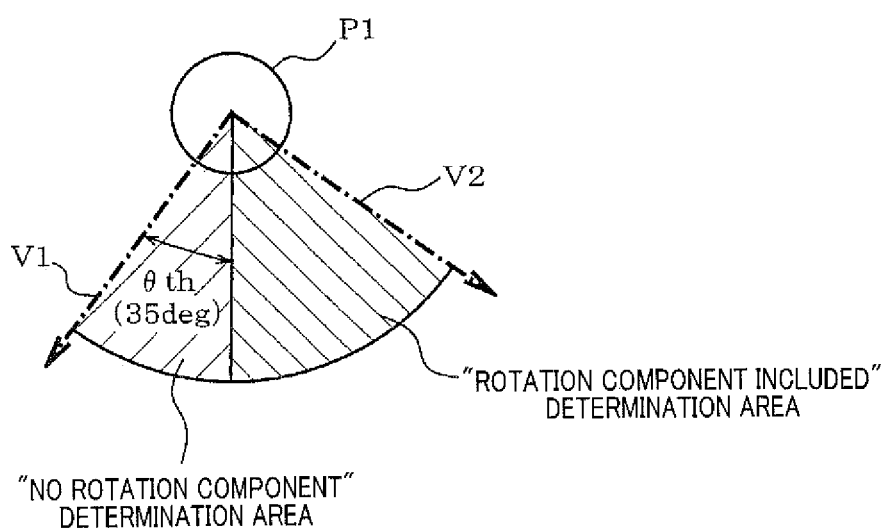
FIG. 7 is a diagram of an area in which a rotation component is determined to be included in a drag operation and an area in which a rotation component is determined not to be included according to the first embodiment.
Figure 8:
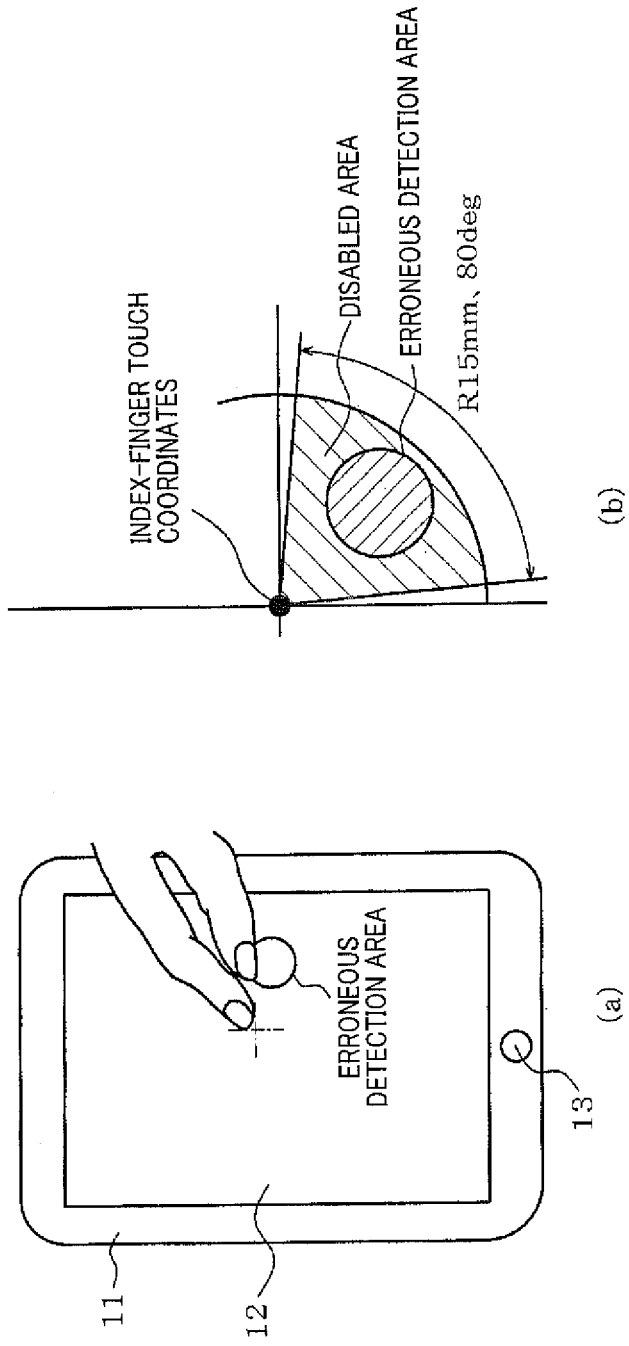
FIG. 8(a) is a diagram of an example of an erroneous touch when a drag operation by a single finger is performed, and (b) is a diagram of an example of a disabled area for preventing the erroneous touch, according to the first embodiment.
Figure 9:
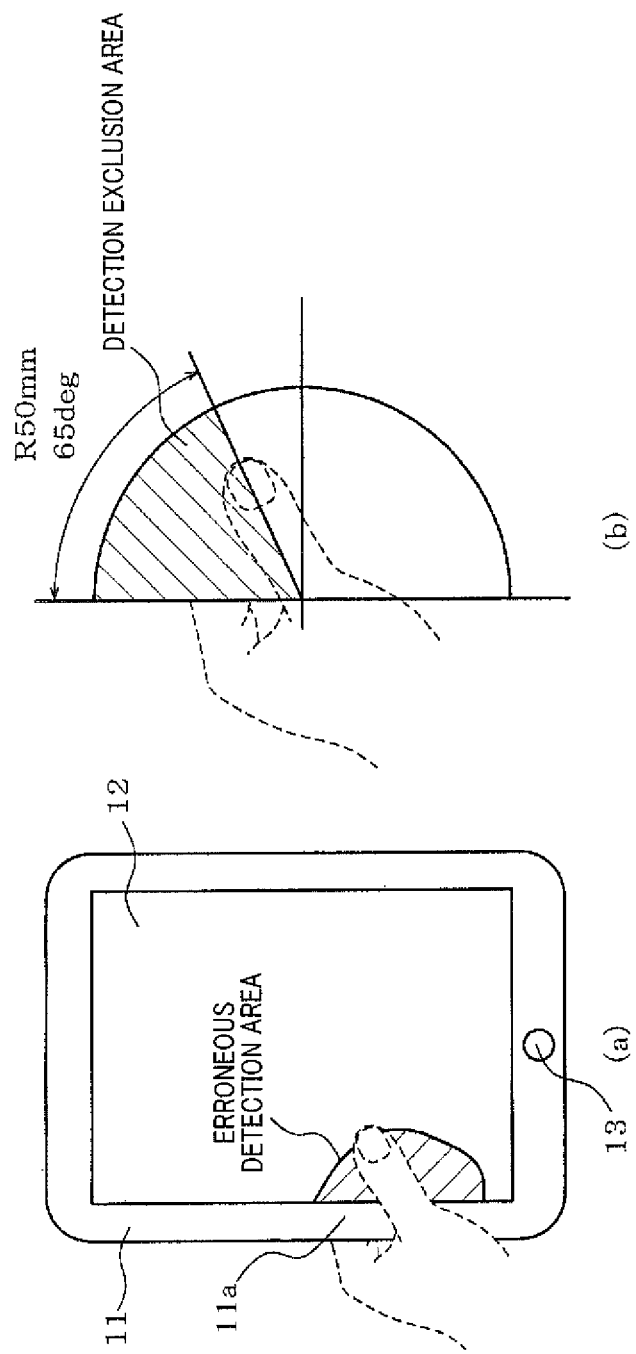
FIG. 9(a) is a diagram of an example of an erroneous touch by a hand that is gripping a case, and (b) is a diagram of an example of a detection exclusion area for preventing the erroneous touch, according to the first embodiment.

Taking the foregoing into consideration, as shown in FIG. 7, when the angle formed by the vectors V1 and V2 is less than a determination threshold θth, the action command generating unit 16 determines that a rotation component is not included in the drag operation by this finger. Meanwhile, when determined that the angle is the determination threshold θth or greater, the action command generating unit 16 determines that a rotation component is included in the drag operation by this finger. As a result, even when the two fingers are not moved in a perfectly straight line but moved such as to draw a slight curve (circular arc), the determination is made that the operation is for performing the vertical movement action. Therefore, as a result of the determination threshold θth being set based on, for example, the maximum value conceivable as a deviation (that is, the extent of curving in relation to a straight line) by human operation, the occurrence of an erroneous operation, that is, an unintentional rotation operation being performed when the vertical movement operation is performed, can be prevented with certainty.

According to the present embodiment, the determination threshold θth is set in the following manner. That is, the ideal value of the angle formed by the vectors V1 and V2 when the drag operation in which the two fingers are moved in a straight line is performed is "0 degrees". Meanwhile, the ideal value of the angle formed by the vectors V1 and V2 when the drag operation in which the two fingers are rotated is performed is "90 degrees". Therefore, "45 degrees", which is the intermediate value between the ideal values, is thought to be an optimal value as the determination threshold θth.

However, the present inventors conducted an operating test on a plurality of evaluators. In the operating test, both the drag operation in which the two fingers are moved in a straight line and the drag operation in which the two fingers are rotated were performed. Based on an analysis of the results, it became clear that "35 degrees", which is less than "45 degrees", is the optimal value as the determination threshold θth. A reason for this is thought to be dependent on the fact that the accuracy of an open/close movement by human fingers is higher than the accuracy of a rotating movement.

In addition, when determined that the touch operation is a drag operation by a single finger at step S11, the action command generating unit 16 disables detection of a touch operation in an area within a predetermined range near the touch location by the single finger, until the drag operation is completed. For example, the drag operation by a single finger is often performed with the index finger of the right hand or the left hand. Therefore, when the operation is performed, erroneous touch by the thumb on the same hand as the index finger performing the operation is likely to occur. When such erroneous touch by the thumb is detected, a determination is made that a drag operation by two fingers has been performed. As a result, unintentional vertical movement action or rotation action is performed.

According to the present embodiment, when the touch operation is once determined to be a drag operation by a single finger, detection of a touch operation in an area (referred to, hereafter, as a disabled area) within a predetermined range near the touch location of the single finger is disabled until the operation is completed. Therefore, when the above-described disabled area is set taking into consideration locations where the likelihood of an erroneous touch by the thumb, for example, is high, the occurrence of erroneous action, that is, unintentional vertical movement action or rotation action being performed, can be prevented when the horizontal movement action is performed.

The present inventors conducted an operating test on a plurality of evaluators. In the operating test, the drag operation by a single finger was performed. As a result, as shown in FIG. 8(a), although the touch operation was performed with the index finger of the right hand in the case of right-handed evaluators, during the touch operation, the thumb of the right hand often erroneously came into contact with (erroneously touched) the touch panel. Therefore, according to the present embodiment, when the user is right-handed, as shown in FIG. 8(b), with the touch location (coordinates) of the index finger as the point of origin, an area within the range of an 80-degree lower right quadrant and within a radius of 15 mm is set as the disabled area. When the user is left-handed, the erroneous touch is highly likely to occur in a location that is reversed, left and right, from that when the user is right-handed. Therefore, the disabled area is also reversed, left and right.

In addition, the touch operation detecting unit 15 detects the touch operation on the touch panel 17 that is provided in the case 11, which can be held in the hand by the user. In a configuration such as this, the user grips the case 11 in one hand, and thereupon, performs each operation with the fingers of the other hand. At this time, the finger of the one hand gripping the case 11 may come into contact with the touch panel 17. When the drag operation by a single finger (horizontal movement action) is performed, should an erroneous touch by the hand on the gripping side be detected, a determination is made that the drag operation by two fingers has been performed. As a result, unintentional vertical movement action or rotation action is performed.

Therefore, the touch operation detecting unit 15 excludes, from the detection target, touch operations in an area (referred to, hereafter, as a detection exclusion area) of a predetermined range adjacent to a gripping portion, within the touch panel 17. The gripping portion is a portion that is expected to be gripped when the user holds the case 11 in their hand (indicated with reference number 11a in FIG. 9(a)). As a result, when the drag operation by a single finger is performed such that the horizontal movement action is performed, even should an erroneous touch operation by a finger on the gripping side be performed, for example, the erroneous touch operation is not detected. Therefore, occurrence of an erroneous action, that is, unintentional vertical movement action or rotation action being performed can be prevented with certainty.

The present inventors conducted an operating test on a plurality of evaluators. In the operating test, the case 11 was gripped by one hand and a drag operation was performed with a single finger using the other hand. In this operating test, two types of apparatuses, that is, an apparatus having the display unit 12 that is about 7 inches and an apparatus having the display unit 12 that is about 4 inches were used as the teaching pendant 4. Based on an analysis of the results, when the apparatus having the display unit 12 that is about 7 inches was used, the evaluators often gripped the case 11 in a manner shown in FIG. 9(a). That is, in the case of right-handed evaluators, the lower left portion (gripping portion 11a) of the case 11 is gripped by the left hand. At this time, of the finders on the left hand, the thumb comes into contact with the front surface of the case 11 (the surface on which the touch panel 17 is provided). At this time, the thumb sometimes erroneously came into contact with an area adjacent to the gripping portion 11a in the touch panel 17.

Here, when the size of the display unit 12 is about 7 inches, as shown in FIG. 9(b), an area within a radius of 50 mm and centered on a position at which the base of the thumb is very likely to be positioned when the user grips the case 11 is set as a detection exclusion area. The reason for the area being within a radius of 50 mm is that the average length of a thumb on a Japanese person is about 60 mm. When an erroneous touch occurs, the pad of the thumb (finger pad) is thought to come into contact. In this case as well, when the user is left-handed, the likelihood of an erroneous touch occurring in a location that is reversed, left and right, from that when the user is right-handed is high. Therefore, the detection exclusion area is also reversed, left and right. Furthermore, based on an analysis of the results of the above-described operating test, it became clear that the angle of the thumb (the angle with reference to a side surface of the case 11) when the evaluator grips the case 11 is often about 65 degrees. Therefore, the above-described detection exclusion area may be changed so as to have a 65-degree fan shape (shaded area in FIG. 9(b)), rather than being a semicircle having a radius of 50 mm.

In addition, as a result of the above-described operating test, when the apparatus having the display unit 12 that is about 4 inches is used, the thumb of the hand gripping the case 11 does not come into contact with the touch panel 17. This is thought to be attributed to the fact that the overall case 11 is about a size that fits in one hand. Therefore, when the size of the display unit 12 is about 4 inches, that is, when the case 11 is about a size that fits in one hand, setting of the detection exclusion area is thought to be unnecessary. On the other hand, when the size of the display unit 12 is about 7 inches, that is, when the case 11 is about a size that does not fit in one hand, setting of the detection exclusion area is necessary. Therefore, the setting of the above-described detection exclusion area may be enabled or disabled depending on the size of the case 11, In the robot system 1, erroneous action by the robot 2 is particularly a problem. Therefore, the occurrence thereof is required to be prevented with certainty. Meanwhile, due to the nature of touch operations, the likelihood of erroneous touch determination and the like occurring is relatively high. However, according to the present embodiment, the above-described measures are taken. Therefore, the occurrence of erroneous action by the robot 2 can be prevented with certainty, while actualizing manual operation of the robot 2 by touch operation.

The selection operation detecting unit 18 can be made to be capable of detecting operation of a button displayed on the touch panel 17 or a physical button, such as the key switch 13, provided on the teaching pendant 4. The operation determining process includes a process for determining the drive axis to be operated or the action mode, based on the operation detected by the selection operation detecting unit 18. In this case, the operation determining process may or may not detect the number of fingers and the direction of the drag operation.

As a result, the user can change the drive axis to be operated or the action mode by operating the key switch 13 and the like (selection operation). Therefore, the user holds the intention to operate the key switch 13 or the like to switch the drive axis or the action mode. Therefore, the user becomes more easily aware that the operation of the key switch 13 and the like is an operation for selecting the drive axis to be operated or the action mode. Consequently, as a result, the risk of an erroneous operating target being selected by the user performing an erroneous operation, and thereby causing erroneous action by the robot 2 can be reduced. Therefore, improvement in operability is achieved, and manual operation of the robot 2 can be actualized by touch operation without causing decrease in safety. In addition, as a result of improved operability, the time required for teaching can be shortened.

Second Embodiment

A second embodiment in which the type of subject robot is changed from that according to the first embodiment will hereafter be described with reference to FIG. 10.

Figure 10:
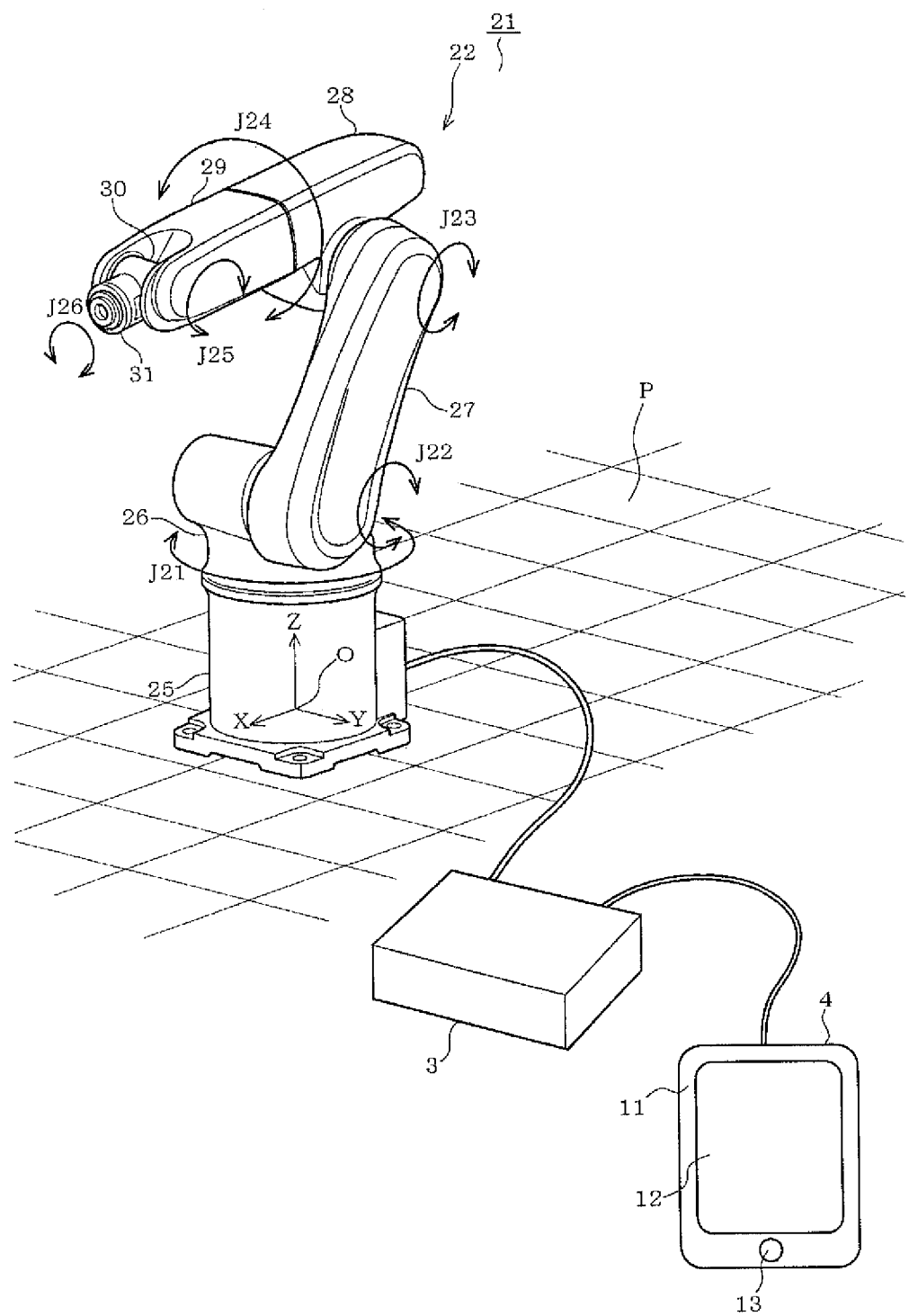
FIG. 10 is an overall configuration diagram of an example of a robot system according to a second embodiment.

A robot system 21 according to the present embodiment, shown in FIG. 10, differs from the robot system 1 according to the first embodiment, shown in FIG. 1, in that a robot 22 is provided instead of the robot 2.

The robot 22 is configured as, for example, a six-axis vertical articulated-type robot. That is, a shoulder portion 26 is connected to a base 25 such as to be capable of rotating in the horizontal direction, via a first axis J21. The first axis J21 has an axial center in the Z-axis direction. A lower end portion of a lower arm 27 is connected to the shoulder portion 26 such as to be capable of rotating in the vertical direction, via a second axis J22. The lower arm 27 extends in the upward direction. The second axis J22 has an axial center in the Y-axis direction. A first upper arm 28 is connected to a tip end portion of the lower arm 27 such as to be capable of rotating in the vertical direction, via a third axis J23. The third axis J23 has an axial center in the Y-axis direction. A second upper arm 29 is connected to a tip end portion of the first upper arm 28 such as to be capable of rotating in a twisting manner, via a fourth axis J24. The fourth axis J24 has an axial center in the X-axis direction. A wrist 30 is connected to a tip end portion of the second upper arm 29 such as to be capable of rotating in the vertical direction, via a fifth axis J25. The fifth axis J25 has an axial center in the Y-axis direction. A flange 31 is connected to the wrist 30 such as to be capable of rotating in a twisting manner, via a sixth axis J26. The sixth axis J26 has an axial center in the X-axis direction.

The base 25, the shoulder portion 26, the lower arm 27, the first upper arm 28, the second upper arm 29, the wrist 30, and the flange 31 function as an arm of the robot 22. A tool, such as an air chuck (not shown), is attached to the flange 31 (corresponding to a hand) that is the arm tip. In a manner similar to the robot 2 according to the first embodiment, the plurality of axes (J21 to J26) provided in the robot 22 are driven by motors (not shown) respectively provided in correspondence thereto. In addition, a position detector (not shown) for detecting a rotation angle of a rotation shaft of the motor is provided near each motor.

In addition to the actions performed by the four-axis horizontal articulated-type robot 2 according to the first embodiment, the six-axis vertical articulated-type robot 22 is capable of performing an action in which the hand is rotated around two axes differing from the Z-axis. The two axes are two axes (X-axis and Y-axis) that are perpendicular to each other and horizontal in relation to the installation surface. In this case, the rotation direction around the X-axis is an Rx direction and the rotation direction around the Y-axis is an Ry direction.

Therefore, according to the present embodiment, not all of the actions that the robot 22 to be operated is capable of performing can be actualized by manual operation. However, in the case of the six-axis vertical articulated-type robot 22 as well, problems do not occur overall, as long as the above-described horizontal movement action, vertical movement action, and rotation action around the Z-axis can be performed. A reason for this is that, because the frequency of the three actions being performed is extremely high during manual operation, user convenience is not significantly compromised according to the present embodiment as well.

However, if a switch is provided for selectively switching the action performed by the rotation operation by two fingers among the rotation action around the X-axis, the rotation action around the Y-axis, and the rotation action around the Z-axis, all of the actions that the six-axis vertical articulated-type robot 22 may perform can be actualized by manual operation. In this case, the switch may be an operating key provided near the display unit 12 or a touch switch formed on the touch panel of the display unit 12.

Third Embodiment

Figure 11:
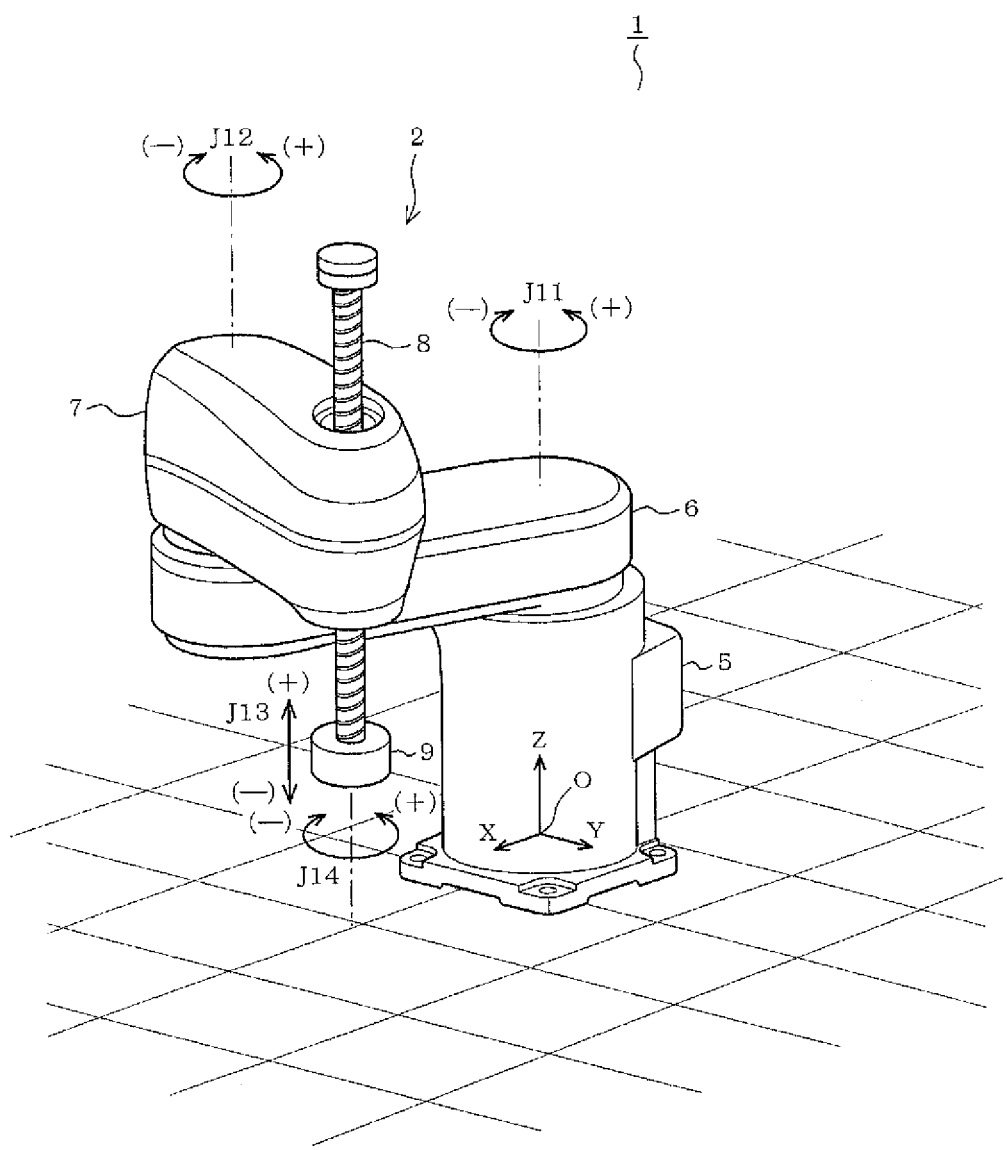
FIG. 11 is a diagram of an example of a four-axis type robot according to a third embodiment.
Figure 12:
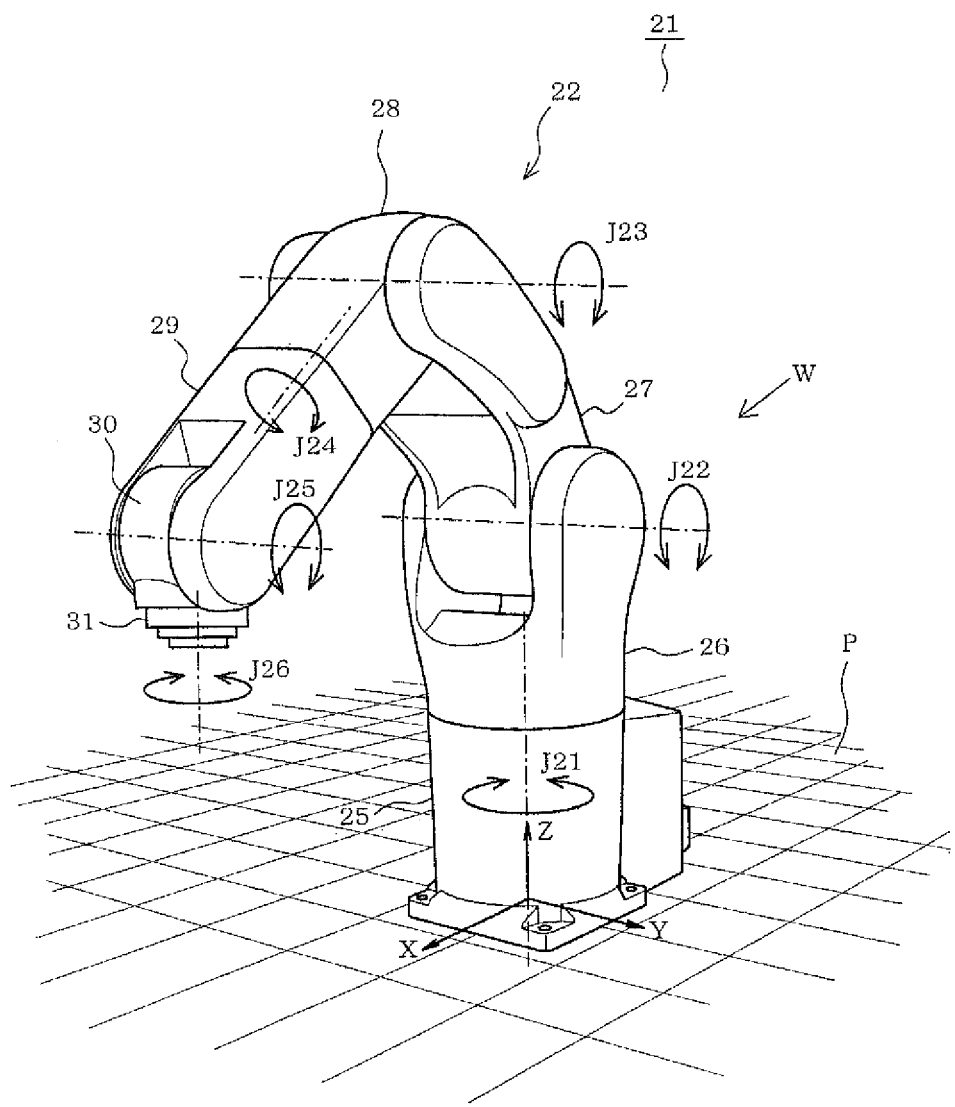
FIG. 12 is a diagram of an example of a six-axis type robot according to the third embodiment.

Next, a third embodiment will be described with reference to FIG. 11 to FIG. 18. The present embodiment can be applied to either of the above-described robot system 1 including the four-axis horizontal articulated-type robot 2 and robot system 21 including the six-axis vertical articulated-type robot 22. In this case, as shown in FIG. 11, a basic attitude of the four-axis horizontal articulated-type robot 2 is an attitude in which the flange 9 is facing the installation surface P side (in this case, downward). In addition, as shown in FIG. 12, the basic attitude of the six-axis vertical articulated-type robot 22 is an attitude in which the flange 31 is facing the installation surface P side (in this case, downward). The robots 2 and 22 perform the horizontal movement action, vertical movement action, and rotation action while maintaining the basic attitude or an attitude similar to the basic attitude. In addition, in FIG. 13 and FIG. 14, a white circle indicates the position of a touch operation, that is, the start position of a drag operation. A white arrow indicates the direction of the drag operation.

According to each of the above-described embodiments, regarding the determination of the type of drag operation, whether or not the direction in relation to the touch panel 17 is vertical or lateral is not taken into consideration. Meanwhile, according to the third embodiment, regarding the determination of the type of drag operation, whether or not the direction in relation to the touch panel 17 is vertical or lateral is taken into consideration. The third embodiment differs from the above-described first and second embodiments in this regard.

Here, the vertical direction and the lateral direction in relation to the touch panel 17 are defined as follows. That is, as indicated by arrow A in FIG. 13, the vertical direction in relation to the touch panel 17 refers to the direction moving away from or closer to, that is, separating from or approaching the body of the user in a state in which the user is operating the teaching pendant 4 while holding the teaching pendant 4. In addition, the lateral direction in relation to the touch panel 17 refers to a direction perpendicular to the above-described vertical direction. In other words, as indicated by arrow B in FIG. 13, the lateral direction in relation to the touch panel 17 refers to a direction parallel to the front surface of the body of the user in a state in which the user is operating the teaching pendant 4 while holding the teaching pendant 4.

Figure 14:
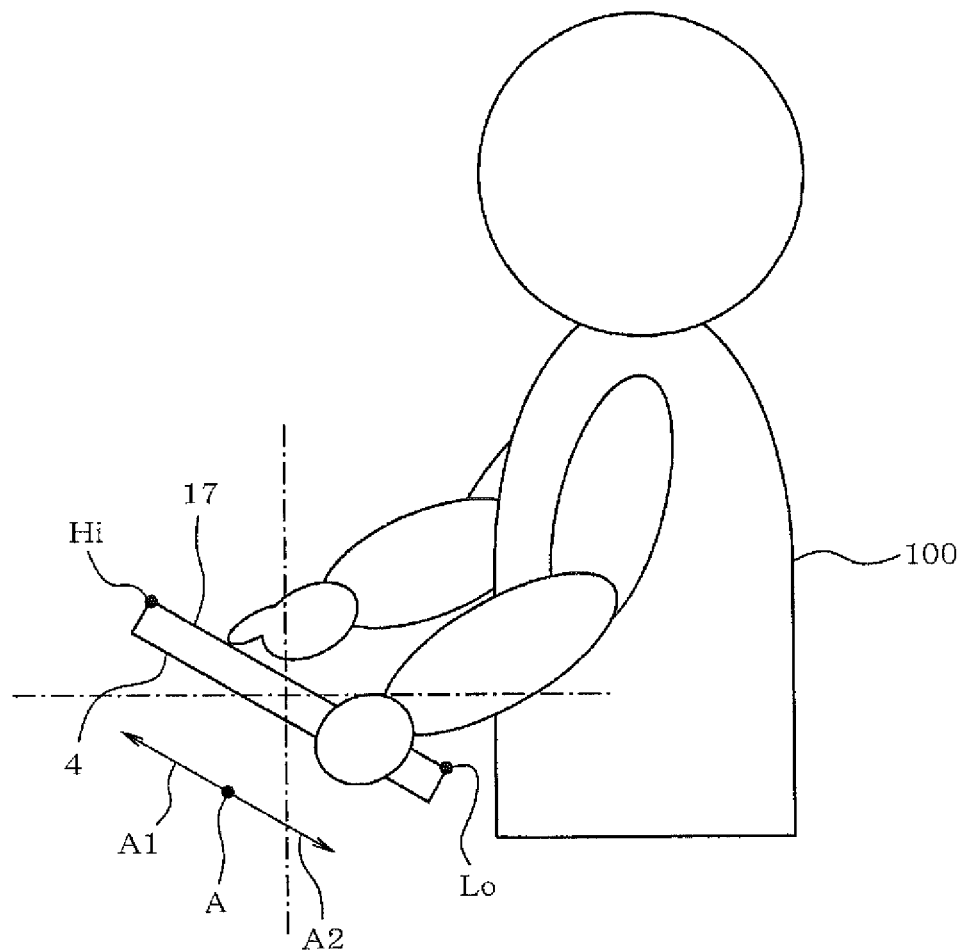
FIG. 14 is a diagram of an example of an attitude when a user holds the teaching pendant according to the third embodiment.
Figure 17:
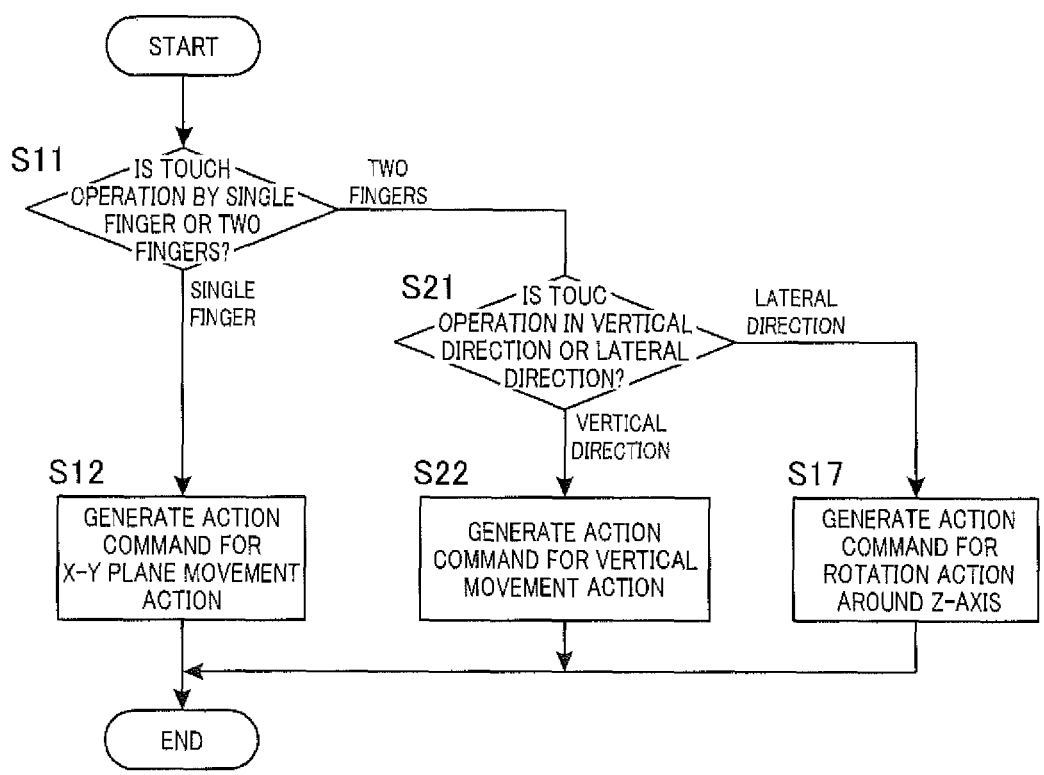
FIG. 17 is a flowchart of an example of the details of various processes performed by an action command generating unit according in to the third embodiment.

In this case, the vertical direction and the lateral direction of the touch panel 17 indicate relative directions in relation to the touch panel 17 from the perspective of the user. That is, the teaching pendant 4 is provided with an acceleration sensor. The attitude of the teaching pendant 4 itself can be detected by the acceleration sensor. In a state in which the user is holding the teaching pendant 4, the surface of the touch panel 17 is rarely oriented in a completely horizontal direction. That is, as shown in FIG. 14, when a user 100 holds the teaching pendant 4, it is natural for the user 100 to orient the surface of the touch panel 17 towards the user 100 side. In this case, a difference in height occurs within the surface of the touch panel 17. A straight line direction connecting a highest point Hi and a lowest point Lo of the touch panel 17 is the vertical direction. The direction perpendicular to this vertical direction is the lateral direction. In this case, even when the attitude of the touch panel 17 changes as a result of the teaching pendant 4 being rotated or the like, the correspondence between the vertical direction and the lateral direction in relation to the user 100 does not change.

Figure 13:
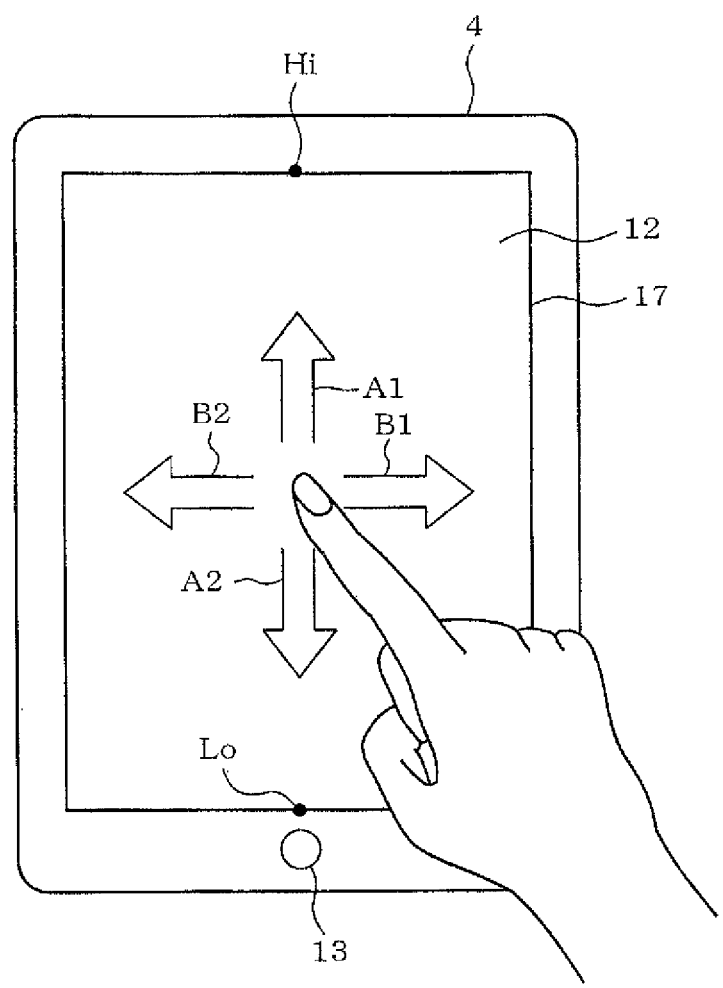
FIG. 13 is a diagram of an example of modes for operating a teaching pendant according to the third embodiment.

According to the third embodiment, the mode of the first operation is similar to that according to each of the above-described embodiments (see FIG. 15(1)). However, the forms of the second operation and the third operation differ. That is, the second operation is defined as being an operation that is a drag operation by two fingers and in a predetermined direction. According to the above-described first and second embodiments, as shown in FIG. 3(2), the second operation is an operation in which two fingers are dragged in the same straight line. Specifically, the second operation is a spread operation and a pinch operation. Meanwhile, according to the third embodiment, as shown in FIG. 13(2), the second operation is an operation that is a drag operation by two fingers in a straight line and in the vertical direction on the touch panel 17.

As shown in FIG. 15(2), when the operation that is a drag operation by two fingers in a straight line and in the vertical direction on the touch panel 17 (second operation) is performed, the hand of the robot 2 or robot 22 performs the vertical movement action. In this case, as indicated by arrow A1 in FIG. 15(2), when the second operation is an operation in the direction away from the user, that is, towards the upper side (towards the highest point Ni) of the touch panel 17, the action command generating unit 16 generates an action command for moving the hand of the robot 2 or robot 22 upwards along the Z-axis direction. In addition, as indicated by arrow A2 in FIG. 15(2), when the second operation is an operation in the direction approaching the user, that is, towards the lower side (towards the lowest point Lo) of the touch panel 17, the action command generating unit 16 generates an action command for moving the hand of the robot 2 or robot 22 downwards along the Z-axis direction. In other words, in this case, the operating direction of the second operation, that is, the up/down direction and the movement direction of the hand of the robot 2 or 22 match, or in other words, are correlated. Therefore, the user can easily associate the movement direction of the hand of the robot 2 or 22 with the operating direction of the second operation performed by the user themselves.

As shown in FIG. 15(3), when the operation that is a drag operation by two fingers in a straight line and in the lateral direction on the touch panel 17 (third operation), the hand of the robot 2 or robot 22 performs the rotation action. In this case, as indicated by arrow B1 in FIG. 15(3) and FIG. 16, when the third operation is an operation in the rightward direction in relation to the touch panel 17, as indicated by arrow J14R in FIG. 16, the action command generating unit 16 generates an action command for rotating the hand of the robot 2 or robot 22 such that the near-side portion of the hand in relation to the Z-axis (in this case, the portion on the user side indicated by point T in FIG. 16) moves towards the right side, that is, rotates in a counter-clockwise direction from a planar view.

In addition, as indicated by arrow B2 in FIG. 15(3) and FIG. 16, when the third operation is an operation in the leftward direction in relation to the touch panel 17, as indicated by arrow J14L in FIG. 16, the action command generating unit 16 generates an action command for rotating the hand of the robot 2 or robot 22 such that the near-side portion of the hand in relation to the Z-axis (in this case, the portion on the user side indicated by point T in FIG. 16) moves in the leftward direction, that is, rotates in a clockwise direction from a planar view. In this case, the operating direction of the third operation by the user and the rotation direction of the hand of the robot 2 or robot 22, that is, the movement direction of the near-side portion of the hand in relation to the Z-axis match, or in other words, are correlated. Therefore, the user can easily associate the rotation direction of the hand of the robot 2 or 22 with the operating direction of the third operation performed by the user themselves.

To actualize actions such as those described above, the action command generating unit 16 performs processes of which the details are as shown in FIG. 4. That is, at steps S11 and S12, the action command generating unit 16 performs the operation determining process. In addition, at steps S12, S22, and S17, the action command generating unit 16 preforms the action command generating process. Processes in FIG. 17 that are the same as those in FIG. 4 are given the same step numbers. Detailed descriptions thereof are omitted.

At step S11, the action command generating unit 16 determines whether the touch operation detected by the touch operation detecting unit 15 is a drag operation by a single finger or by two fingers (S11; first operation determining process). When determined, at step S11, that the touch operation is a drag operation by a single finger (first operation), at step S12, the action command generating unit 16 generates an action command for moving the hand of the robot 2 in the X-Y plane direction (S12; horizontal movement action command generating process).

When determined, at step S11, that the touch operation is a drag operation by two fingers, that is, when determined that the touch operation is the second operation or the third operation rather than the first operation, at step S21, the action command generating unit 16 determines whether the touch operation is an operation by two fingers in the vertical direction (second operation) or a drag operation in the lateral direction (third operation) (S21; second operation determining process, third operation determining process).

When determined, at the step S21, that the touch operation is a drag operation in the vertical direction (second operation) (S21; vertical direction), the action command generating unit 16 generates an action command for moving the hand of the robot 2 or robot 22 in the Z-axis direction (S22; vertical movement action command generating process). In addition, when determined, at step S21, that the touch operation is a drag operation in the lateral direction (third operation) (S21; lateral direction), the action command generating unit 16 generates an action command for rotating the hand of the robot 2 or robot 22 around the Z-axis (S17: rotation action command generating process). After steps S12, S22, and S17 are performed, the processes are completed (end). Then, as a result of the controller 3 controlling the action of the robot 2 or robot 22 based on the above-described action command, the above-described horizontal movement action, vertical movement action, or rotation action is performed.

As described above, according to the present embodiment was well, when a predetermined operation is performed during manual operation of the action of a hand system of the robot 2 or robot 22, the robot is made to perform an action that is considered easily associated by the user from the operation. In this case, the reasoning for the association between each operation and the action corresponding to the operation is based on visual and tactile information, and the like of humans. For example, the reasoning lies in the following points. The reasoning for the horizontal movement action being associated with the drag operation by a single finger (first operation) is as described according to the above-described first embodiment.

The reasoning for vertical movement action in which the hand of the robot 2 or robot 22 is moved in the vertical direction being associated with the operation that is a drag operation by two fingers and in the vertical direction (second operation) lies, for example, in the following point. That is, as shown in FIG. 14, ordinarily, the user 100 often holds the teaching pendant 4 between the hip and chest of the user 100. In this case, taking into consideration the visibility and operability of the touch panel 17, it is natural for the user 100 to hold the teaching pendant 4 at an attitude in which the screen of the touch panel 17 is tilted downward towards the user 100 side. When the user 100 holds the teaching pendant 4 at such an attitude, the vertical direction, that is, the up/down direction of the teaching pendant 4 matches the vertical direction, that is, the up/down direction of the hand of the robot 2 or 22. Therefore, the user can easily recognize the operation in the vertical direction on the screen of the touch panel 17 and the vertical movement action of the hand of the robot 2 or 22, in association.

In addition, the reasoning for rotation action in which the hand the robot 2 or 22 is rotated being associated with the operation that is a drag operation by two fingers and in the lateral direction (third operation) lies, for example, in the following point. That is, manual operation of the robot 2 or 12 is often performed for fine adjustment of the robot. Therefore, during manual operation, the hand of the robot is often facing the installation surface P side (in this case, downward). In this case, the rotation axis of the hand is at a right angle to the horizontal plane, or in other words, oriented in the vertical direction. When the hand of the robot is viewed in the horizontal direction in this state, a certain point on the hand of the robot appears to be moving in a linear manner in the horizontal direction, as a result of the hand of the robot being rotated. Therefore, the user is thought to associate the rotation action of the hand of the robot with the operation in the lateral direction in relation to the touch panel. As a result, the user recognizes the operation in the lateral direction in relation to the touch panel and the rotation action of the hand of the robot, in association.

In this way, each operation related to the hand system according to the present embodiment enables the user to intuitively associate the operation with the action performed by the robot 2 or 22 in response to the operation. In addition, each operation is a simple operation. In other words, the user can manipulate the action of the hand system of the robot 2 or 22 by a gesture operation (an operation composed of a combination of the number of fingers, direction, and movement amount) that is simple and allows intuitive association with the action of the robot 2 or 22. Therefore, the user can perform each operation of the hand system without looking at their own hand (operating location). As a result, the user no longer looks away from the robot 2 during manual operation of the hand system of the robot 2 or 22, and safety can be favorably maintained. In this way, according to the present embodiment, an excellent effect is achieved in that manual operation of the hand system of the robot 2 or 22 can be actualized by touch operation, without causing decrease in safety.

The mode of the vertical movement action by the second operation may be opposite that described above. That is, as indicated by arrow A1 in FIG. 15(2), when the second operation is an operation in the direction away from the user, that is, towards the upper side of the touch panel 17 (towards the highest point Hi), the action command generating unit 16 generates a command for moving the hand of the robot 2 or robot 22 downward along the Z-axis. In addition, as indicated by arrow A2 in FIG. 15(2), when the second operation is an operation in the direction approaching the user, that is towards the lower side of the touch panel 17 (towards the lowest point Lo), the action command generating unit 16 generates a command for moving the hand of the robot 2 or robot 22 upward along the Z-axis. In this case, the operating direction of the second operation, that is, the up/down direction and the movement direction of the hand of the robot 2 or 22 are opposite directions.

Figure 18:
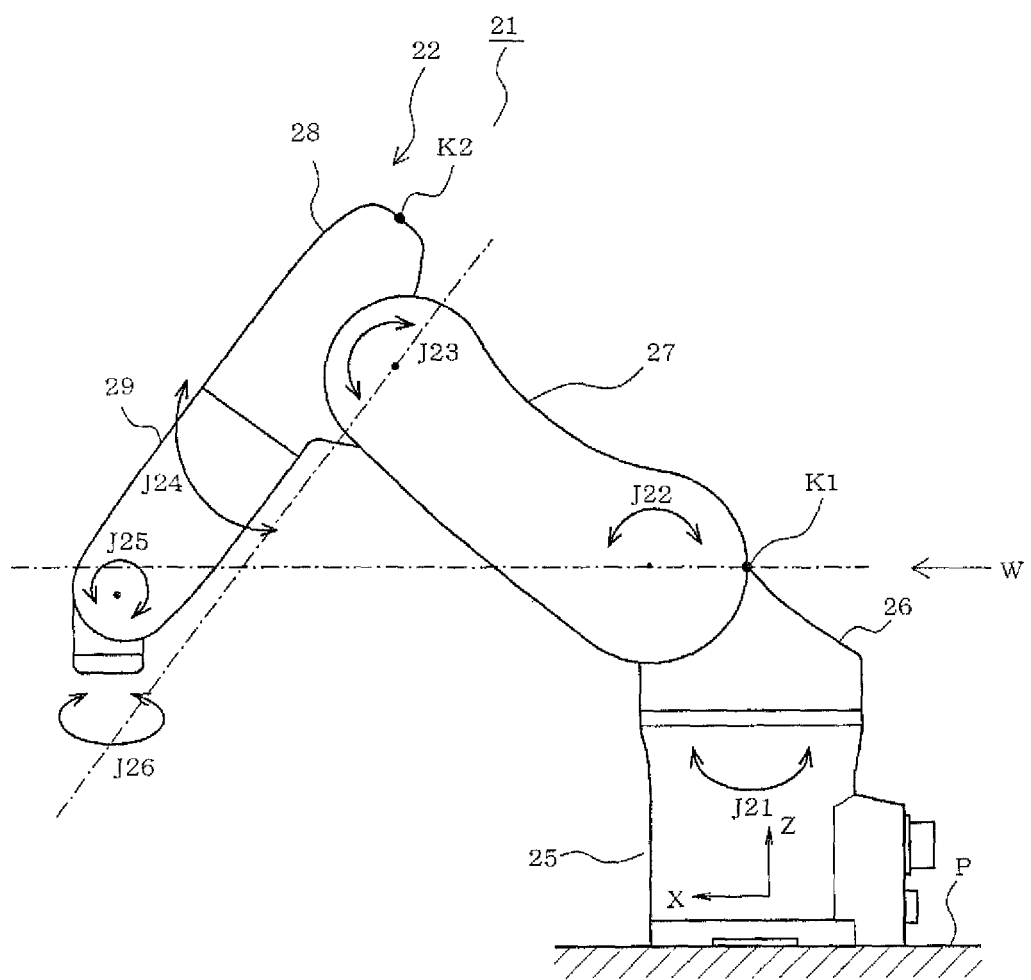
FIG. 18 is a diagram of a side view of a six-axis type robot according to the third embodiment.

An operating mode such as this is thought to be more effective when the six-axis vertical articulated robot 22 is operated from behind (the side of arrow W in FIG. 12 and FIG. 18). The reasoning thereof lies, for example, in the following point. That is, in the six-axis vertical articulated robot 22, movement of the hand (flange 31) in the vertical direction along the Z-axis is performed by the second axis J22 and the third axis J23 being driven. When the second axis J22 is driven, the arms 27, 28, and 29 move in an integrated manner. In this case, the user tends to get the impression that the arms 27, 28, and 29 are a lever of which the second axis J22 is a fulcrum, the hand (flange 31) is a point of action, and a point K1 portion shown in FIG. 18 is a point of effort. In a similar manner, when the third axis J23 is driven, the arms 28 and 29 move in an integrated manner. At this time, the user tends to get the impression that the arms 28 and 29 are a lever of which the third axis J23 is a fulcrum, the hand (flange 31) is a point of action, and a point K2 portion shown in FIG. 18 is a point of effort.

In either case, when the second axis J22 or the third axis J23 that serves as the fulcrum is driven, the point K1 or K2 moves in the direction opposite the hand (flange 31). The manner of the drag operation in the vertical direction in relation to the touch panel 17 performed while the user is looking at the robot 22 suggests, to the user, virtual force in the vertical direction (in this case, the vertical direction) being applied to the point of effort K1 or K2. Furthermore, when the user views the robot 22 from behind, the point of effort K1 or K2 is closer to the user than the hand (flange 31). Therefore, the user tends so to get the impression that, by performing the drag operation in the vertical direction on the touch panel 17, virtual force works on the point of effort K1 or K2, and the hand (flange 31) serving as the point of action moves in the direction opposite the point of effort K1 or K2. Therefore, based on an operating mode such as this, the user more easily associate's the movement direction of the hand of the robot 2 or 22 from the operating direction of the second operation performed by the user themselves. As a result, improvement in operability is achieved and decrease in safety can be suppressed.

In the above-described drag operation by two fingers, in the case of the vertical movement action and the rotation action in FIGS. 15(2) and (3), the two fingers may be made to draw substantially the same trajectory. That is, the two fingers may be dragged such that the two arrows in the lateral direction in FIGS. 15(2) and (3) are drawn such as to substantially overlap (see column (B) in FIG. 15(3)). Even in this case, the touch points on the panel of the fingertips of the two fingers always differ. Therefore, an action command based on the above-described drag operation by two fingers is possible.

Fourth Embodiment

Next, a fourth embodiment will be described with reference to FIG. 19 to FIG. 22. According to the above-described embodiments, an example in which a so-called gesture operation (an operation composed of a combination of the number of fingers, direction, and movement amount) is applied to an action of the hand system is described. Meanwhile, according to the present embodiment, an example in which the so-called gesture operation is applied to an action of an axis system will be described.

FIG. 19 is an example in which a gesture operation is applied to an action of an axis system of the four-axis horizontal articulated robot 2. In this case, as shown in FIG. 19(1), the first axis J11 is driven based on a drag operation by a single finger in the lateral direction. As indicated by arrow B1 in FIG. 19(1) and FIG. 20, when the drag operation by a single finger in the lateral direction is an operation in the rightward direction in relation to the touch panel 17, as indicated by arrow J11R in FIG. 20, the action command generating unit 16 generates an action command for rotating the first axis J11 in the counter-clockwise direction from a planar view. In addition, as indicated by arrow B2 in FIG. 19(1) and FIG. 20, when the drag operation by a single finger in the lateral direction is an operation in the leftward direction in relation to the touch panel 17, as indicated by arrow J12L in FIG. 20, the action command generating unit 16 generates an action command for rotating the first axis J11 in the clockwise direction from a planar view.

As shown in FIG. 19(2), the second axis J12 is driven based on a drag operation by two fingers in the lateral direction. As indicated by arrow B1 in FIG. 19(2) and FIG. 20, when the drag operation by two fingers in the lateral direction is an operation in the rightward direction in relation to the touch panel 17, as indicated by arrow J12R in FIG. 20, the action command generating unit 16 generates an action command for rotating the second axis J12 in the counter-clockwise direction from a planar view. In addition, as indicated by arrow B2 in FIG. 19(2) and FIG. 20, when the drag operation by two fingers in the lateral direction is an operation in the leftward direction in relation to the touch panel 17, as indicated by arrow J12L in FIG. 20, the action command generating unit 16 generates an action command for rotating the second axis J12 in the clockwise direction from a planar view.

As shown in FIG. 19(3), the third axis J13 is driven based on a drag operation by a single finger in the vertical direction. As indicated by arrow A1 in FIG. 19(3), when the drag operation by a single finger in the vertical direction is an operation in the upward direction in relation to the touch panel 17, that is, towards the highest point Hi, the action command generating unit 16 generates an action command for moving the hand of the robot 2 upwards. As indicated by arrow A2 in FIG. 19(3), when the drag operation by a single finger in the vertical direction is an operation in the downward direction in relation to the touch panel 17, that is, towards the lowest point Lo, the action command generating unit 16 generates an action command for moving the hand of the robot 2 downwards.

As shown in FIG. 19(4), the fourth axis J14 is driven based on a drag operation by three fingers in the lateral direction. As indicated by arrow B1 in FIG. 19(4) and FIG. 20, when the drag operation by three fingers in the lateral direction is an operation in the rightward direction in relation to the touch panel 17, as indicated by arrow J14R in FIG. 20, the action command generating unit 16 generates an action command for rotating the fourth axis J14R in the counter-clockwise direction from a planar view. In addition, as indicated by arrow B2 in FIG. 19(4) and FIG. 20, when the drag operation by three fingers in the lateral direction is an operation in the leftward direction in relation to the touch panel 17, as indicated by arrow J14L in FIG. 20, the action command generating unit 16 generates an action command for rotating the fourth axis J14L in the clockwise direction from a planar view. In these cases, the drive amount of each drive axis is determined based on the operating amount, that is, the drag amount of the drag operation in the direction corresponding to each drive axis.

According to the present embodiment, the third axis J13 is classified as a drive axis of a first group. The drive axis J13 of the first group tends to make the user aware of action in the vertical direction. The drive axis J13 of the first group is driven based on a drag operation in the vertical direction. In addition, among the drive axes, the drive axes other than the drive axis of the first group, that is, the first axis J11, the second axis J12, and the fourth axis J14 are classified as drive axes of a second group. The drive axes J11, J12, and J14 of the second group tends to make the user aware of action in the horizontal direction. The drive axes J11, J12, and J14 of the second group are driven based on a drag operation in the lateral direction.

Figure 21:
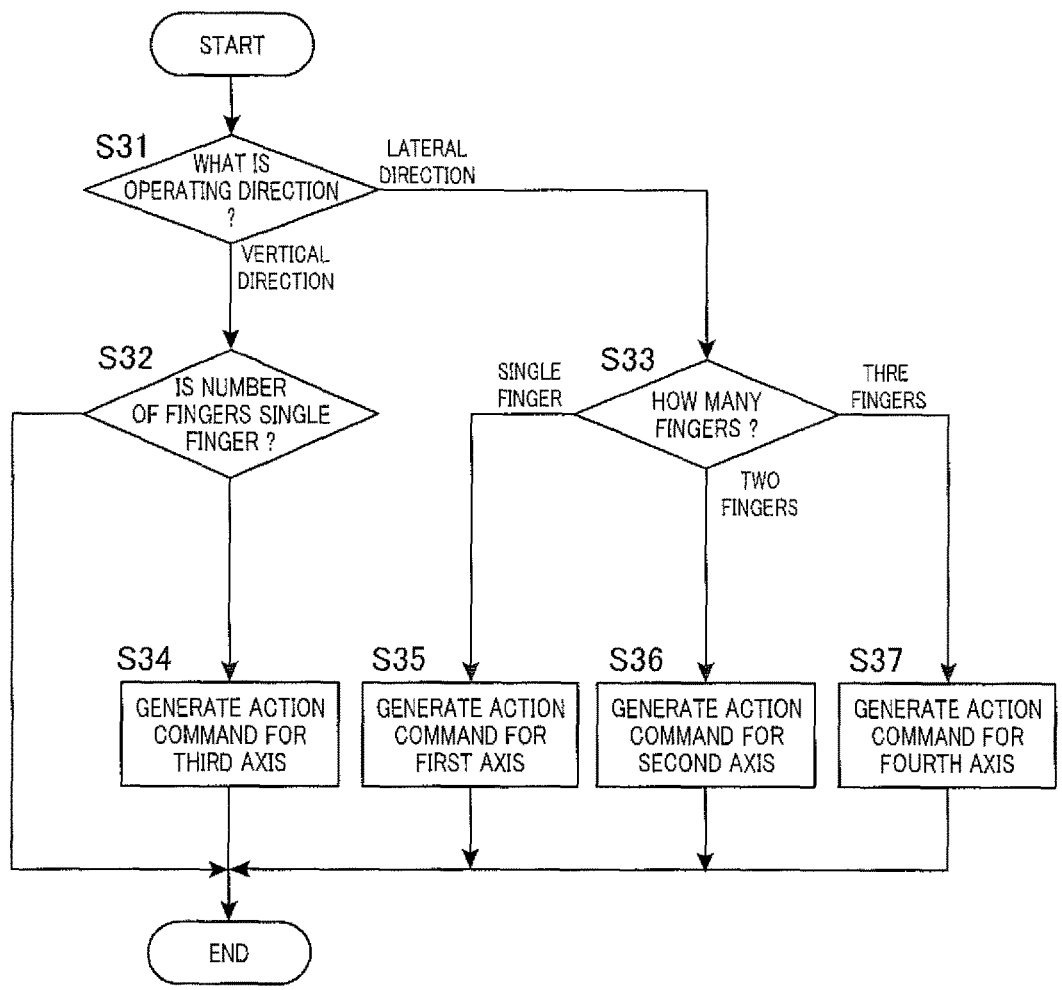
FIG. 21 is a flowchart of an example of the details of various processes performed by an action command generating unit according to the fourth embodiment.
Figure 24:
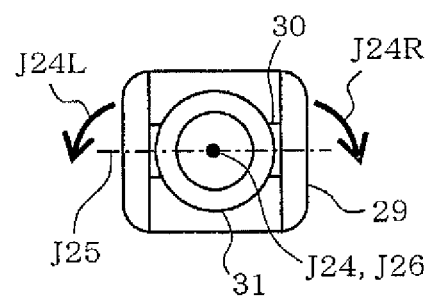
FIG. 24 is a diagram of the hand of a robot viewed from a flange-side of the robot towards a second upper arm-side according to the fifth embodiment.

To actualize each of the actions described above, the action command generating unit 16 performs a process of which the details are as shown in FIG. 21. In this case, the action command generating unit 16 performs a drive axis selecting process at steps S31, S32, and S33. The drive axis selecting process is a process for selecting a single drive axis to be driven, among drive axes J11 to J14, based on the combination of the number of fingers and operating direction of a drag operation, when a detected touch operation is a drag operation by a finger. Of steps S31 to S33, steps S31 and S32 are a first drive axis selecting process. The first drive axis selecting process is a process for selecting a single drive axis to be driven, among the drive axes of the first group, when the direction of the drag operation is the vertical direction. According to the present embodiment, the drive axis of the first group is only the third axis J13. Therefore, the third axis J13 is inevitably selected. Of steps S31 to S33, steps S31 and S33 are a second drive axis selecting process. The second drive axis selecting process is a process for selecting a single drive axis to be driven, among the drive axes other than the drive axes of the first group (in this case, the drive axes J11, J12, and J14 of the second group), when the direction of the drag operation is the lateral direction or the circumferential direction (the lateral direction, according to the present embodiment).

Specifically, at step S31, the action command generating unit 16 determines whether the direction of the drag operation detected by the touch operation detecting unit 15 is the lateral direction or the vertical direction. When determined that the direction of the drag operation detected by the touch operation detecting unit 15 is the vertical direction (vertical direction at step S31), at step S32, the action command generating unit 16 determines whether or not the number of fingers is a single finger. When determined that the number of fingers of the touch operation is a single finger (YES at step S32), at step S34, the action command generating unit 16 generates an action command for driving the third axis J13.

Meanwhile, when determined that the direction of the drag operation is the lateral direction (lateral direction at step S31), at step S33, the action command generating unit 16 determines the number of fingers. When determined that the number of fingers of the touch operation is a single finger (single finger at step S33), at step S35, the action command generating unit 16 generates an action command for driving the first axis J11. When determined that the number of fingers of the touch operation is two fingers (two fingers at step S35), at step S36, the action command generating unit 16 generates an action command for driving the second axis J12. When determined that the number of fingers of the touch operation is three fingers (three fingers at step S35), at step S37, the action command generating unit 16 generates an action command for driving the fourth axis J14.

After generating any of the action commands at steps S34 to S37, the action command generating unit 16 completes the processes (end). Then, as a result of the controller 3 driving an axis of the robot 2 based on the above-described action command, an action of an axis system is performed. Meanwhile, when the number of fingers of the touch operation is two fingers or more (NO at step S32), the action command generating unit 16 ends the process without generating an action command (end).

As described above, according to the present embodiment, when a predetermined operation is performed during manual operation of the action of an axis system of the robot 2, the robot 2 is made to perform an action of the axis system that is considered easily associated by the user from the operation. In this case, the reasoning for the association between each operation and the action corresponding to the operation is based on visual and tactile information, and the like of humans. For example, the reasoning lies in the following points.

First, the reasoning for the driving of the drive axes of the second group, that is, the first axis J11, the second axis J12, and the fourth axis J14 being associated with the drag operation in the lateral direction lies in the following point. That is, in the four-axis horizontal articulated robot 2, the drive axes J11, J12, and J14 of the second group are all rotation axes that extend in the vertical direction. Therefore, when the drive axes J11, J12, and J14 of the second group are driven, the hand of the robot 2 moves in the horizontal direction with each axis as the center. Here, the user often looks at the robot 2 from slightly above the horizontal direction when manually operating the robot 2. In this case, the hand of the robot 2 appears to the user to be moving in a horizontal lateral direction. Therefore, the operating direction by the user and the movement direction of the hand of the robot 2 match. As a result, the user can easily recognize the operation in the vertical direction in relation to the touch panel 17 and the movement action of the hand by the driving of the drive axes J11, J12, and J14 of the second group in association. Consequently, when operating an axis system, the user can easily recognize the movement direction of the hand of the robot 2 and the operating direction of the user themselves in association. The reasoning for the association between the operation in the vertical direction in relation to the touch panel 17 and the vertical movement action by the driving of the drive axes of the second group (in this case, the third axis J13) is similar to the reason given according to the third embodiment.

In addition, according to the present embodiment, in the drag operation in the lateral direction, when the operation is by a single finger, the first axis J11 is driven. When the operation is by two fingers, the second axis J12 is driven. When the operation is by three fingers, the fourth axis J14 is driven. In this way, according to the present embodiment, the number of the drive axis of the second group to be s driven increases as the number of fingers used for the drag operation increases. Therefore, the user can easily recognize the number of fingers used in the drag operation and the axis to be driven in association. As a result, operability is further improved.

Furthermore, in the above-described drive axis selecting process, the action command generating unit 16 determines the drive axis to be driven such that the selection transitions from the drive axis on the base 5 side of the robot 2 towards the drive axis on the hand (flange 9) side, that is, such that the selection transitions from the first axis J11 to the second axis J12 to the fourth axis J14, in accompaniment with the increase in the number of fingers of the drag operation. Ordinarily, the user is thought to be able to better concentrate on the operation when the number of fingers used in the drag operation decreases. Therefore, the user is thought to be capable of a more precise operation as the number of fingers used in the drag operation decreases. Here, as the drive axis to be driven becomes closer to the base 5 side, that is, as the number of the axis becomes smaller, the effect that the driving of the drive axis has on the movement amount of the hand of the robot 2 increases. According to the present embodiment, the user is able to perform a precise operation with fewer fingers for drive axes that have a greater influence on the movement amount of the hand of the robot 2. Therefore, operability is further improved.

In the drive axis selecting process, the action command generating unit 16 may determine the drive axis to be driven such that the selection transitions from the drive axis on the hand (flange 9) side of the robot 2 towards the drive axis on the base 5 side, that is, such that the selection transitions from the fourth axis J14 to the second axis J12 to the first axis J11, in accompaniment with the increase in the number of fingers of the drag operation. Ordinarily, action near the hand is frequently used in manual operation. That is, in manual operation, an axis having a greater axis number, among the drive axes of the second group, is more frequently used in manual operation. In this case, the user can perform a precise operation with fewer fingers for a drive axis that is frequently used during manual operation. Therefore, as a result of this configuration as well, operability can be further improved.

Fifth Embodiment

Next, a fifth embodiment will be described with reference to FIG. 18 and FIG. 22 to FIG. 25. According to the present embodiment, a so-called gesture operation is applied to an action of an axis system of the six-axis vertical articulated robot 22. According to the present embodiment, each axis is driven as follows. Driving of the first axis J21 of the six-axis robot 22 is performed in a manner similar to the driving of the first axis J11 of the four-axis robot 2. That is, as shown in FIG. 22(1), the first axis J21 is performed based on a drag operation by a single finger in the lateral direction. As indicated by arrow B1 in FIG. 22(1) and FIG. 23, when the drag operation by a single finger in the lateral direction is an operation in the rightward direction in relation to the touch panel 17, as indicated by arrow J21R in FIG. 23, the action command generating unit 16 generates an action command for rotating the first axis J21 in a counter-clockwise direction from a planar view. In addition, as indicated by arrow B2 in FIG. 22(1) and FIG. 23, when the drag operation by a single finger in the lateral direction is an operation in the leftward direction in relation to the touch panel 17, as indicated by arrow J21L in Hg. 23, the action command generating unit 16 generates an action command for rotating the first axis J21 in the clockwise direction from a planar view.

Driving of the second axis J22 is performed in a manner similar to the driving of the third axis J13 of the four-axis robot 2. That is, as shown in FIG. 22(2), the driving of the second axis J22 is performed based on a drag operation by a single finger in the vertical direction. As indicated by arrow A1 in FIG. 22(2), when the drag operation by a single finger in the vertical direction is an operation in the upward direction in relation to the touch panel 17, that is, towards the highest point Hi side, the action command generating unit 16 generates an action command for rotating the second axis J22 such that the hand of the robot 22 moves upwards. As indicated by arrow A2 in FIG. 22(2), when the drag operation by the present finger in the vertical direction is an operation in the downward direction in relation to the touch panel 17, that is, towards the lowest point Lo, the action command generating unit 16 generates an action command for rotating the second axis J22 such that the hand of the robot 22 moves downwards.

As shown in FIG. 22(3), the third axis J23 is driven based on a drag operation by two fingers in the vertical direction. As indicated by arrow A1 in FIG. 22(3), when the drag operation by two fingers in the vertical direction is an operation in the upward direction in relation to the touch panel 17, that is, towards the highest point Hi, the action command generating unit 16 generates an action command for rotating the third axis J23 such that the hand of the robot 22 moves upwards. As indicated by arrow A2 in FIG. 22(3), when the drag operation by two fingers in the vertical direction is an operation in the downward direction in relation to the touch panel 17, that is, towards the lowest point Lo, the action command generating unit 16 generates an action command for rotating the third axis J23 such that the hand of the robot 22 moves downwards.

As shown in FIG. 22(4), the fourth axis J24 is driven based on a drag operation by two fingers in the lateral direction. As indicated by arrow B1 in FIG. 22(4) and FIG. 23, when the drag operation by two fingers in the lateral direction is an operation in the rightward direction in relation to the touch panel 17, as indicated by arrow J24R in FIG. 24, the action command generating unit 16 generates an action command for rotating the fourth axis J24 in the clockwise direction when viewed from the second upper arm 29 side towards the first upper arm 28 side. In addition, as indicated by arrow B2 in FIG. 22(4) and FIG. 23, when the drag operation by two fingers in the lateral direction is an operation in the leftward direction in relation to the touch panel 17, as indicated by arrow J24L in FIG. 24, the action command generating unit 16 generates an action command for rotating the fourth axis J24 in the counter-clockwise direction when viewed from the second upper arm 29 side towards the first upper arm 28 side, As shown in FIG. 22(5), the fifth axis J25 is driven based on a drag operation by three fingers in the vertical direction. As indicated by arrow A1 in FIG. 22(5), when the drag operation by three fingers in the vertical direction is an operation in the upward direction in relation to the touch panel 17, that is, towards the highest point Hi, the action command generating unit 16 generates an action command for rotating the fifth axis J25 such that the hand of the robot 22 moves upwards. As indicated by arrow A2 in FIG. 22(5), when the drag operation by three fingers in the vertical direction is an operation in the downward direction in relation to the touch panel 17, that is, towards the lowest point Lo, the action command generating unit 16 generates an action command for rotating the fifth axis 25 such that the hand of the robot 22 moves downwards.

As shown in FIG. 22(6), the sixth axis J26 is driven based on a drag operation by three fingers in the lateral direction. As indicated by arrow B1 in FIG. 22(6) and FIG. 23, when the drag operation by three fingers in the lateral direction is an operation in the rightward direction in relation to the touch panel 17, as indicated by arrow J26R in FIG. 23, the action command generating unit 16 generates an action command for rotating the fourth axis J24 in the counter-clockwise direction from a planar view. In addition, as indicated by arrow B2 in FIG. 22(6) and FIG. 23, when the drag operation by three fingers in the lateral direction is an operation in the leftward direction in relation to the touch panel 17, as indicated by arrow J26L in FIG. 23, the action command generating unit 16 generates an action command for rotating the fourth axis J24 in the clockwise direction from a planar view.

According to the present embodiment, among the drive axes, the second axis J22, the third axis J23, and the fifth axis J25 are classified as drive axes of a first group. The drive axes J22, J23, and J25 of the second group are driven based on a drag operation in the vertical direction. In addition, among the drive axes, the drive axes other than the drive axes of the first group, that is, the first axis J21, the fourth axis J24, and the sixth axis J26 are classified as drive axes of a second group. The drive axes J21, J24, and J26 of the second group are driven based on a drag operation in the lateral direction.

Figure 25:
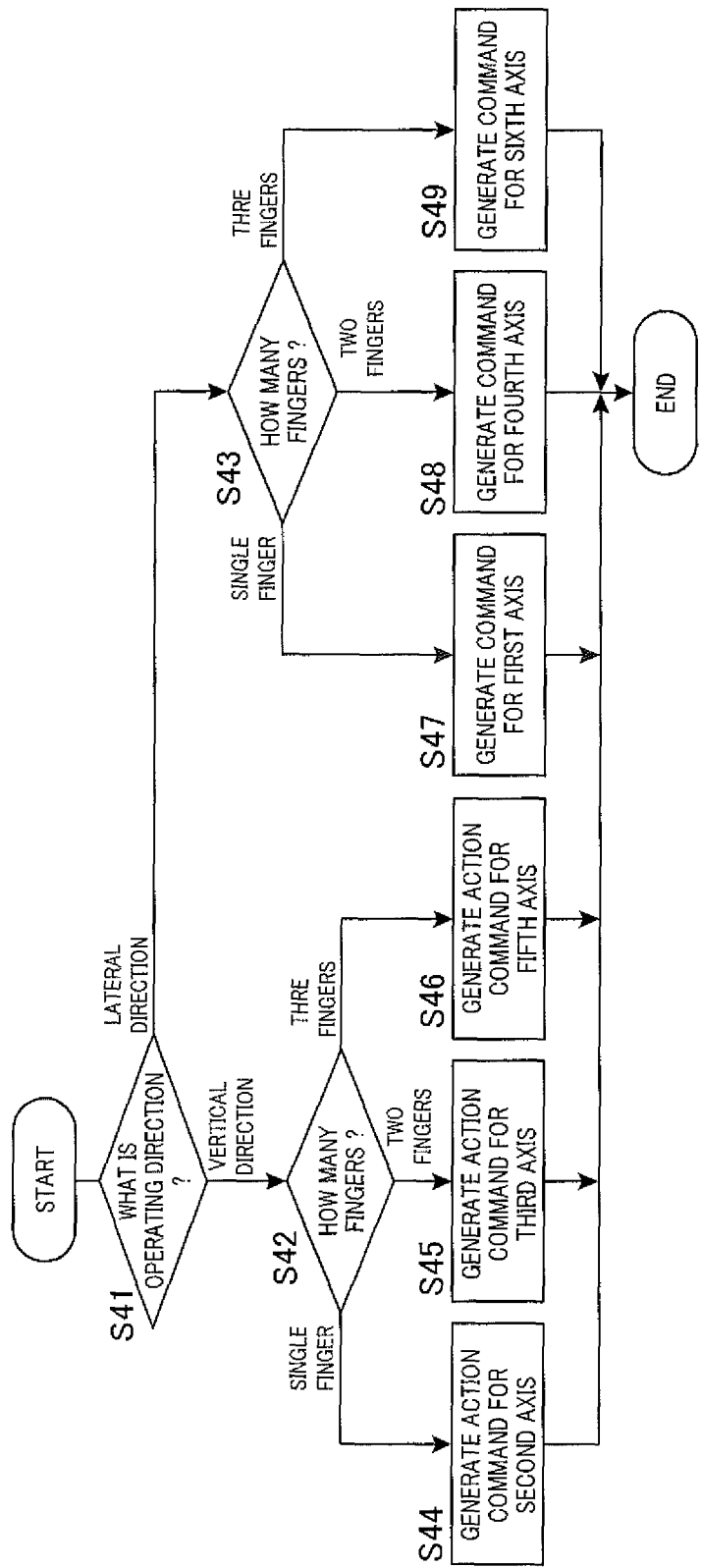
FIG. 25 is a flowchart of an example of the details of various processes performed by an action command generating unit according to the fifth embodiment.

To actualize each of the actions described above, the action command generating unit 16 performs a process of which the details are as shown in FIG. 25. In this case, the action command generating unit 16 performs a drive axis selecting process at steps S41, S42, and S43. The drive axis selecting process is a process similar to those at steps S31, S32, and S33 in FIG. 21, described above. That is, the drive axis selecting process is a process for selecting a single drive axis to be driven, among drive axes J21 to J26, based on the combination of the number of fingers and operating direction of a drag operation, when a detected touch operation is a drag operation by a finger.

Of steps S41 to S43, steps S41 and S42 are a first drive axis selecting process. The first drive axis selecting process is a process for selecting a single drive axis to be driven, among the drive axes J22, J23, and J25 of the first group, when the direction of the drag operation is the vertical direction. Of steps S41 to S43, steps S41 and S43 are a second drive axis selecting process. The second drive axis selecting process is a process for selecting a single drive axis to be driven, among the drive axes other than the drive axes of the first group (in this case, the drive axes J21, J24, and J26 of the second group), when the direction of the drag operation is the lateral direction or the circumferential direction (the lateral direction, according to the present embodiment).

Specifically, at step S41, the action command generating unit 16 determines whether the direction of the drag operation detected by the touch operation detecting unit 15 is the lateral direction or the vertical direction. When determined that the direction of the drag operation detected by the touch operation detecting unit 15 is the vertical direction (vertical direction at step S41), at step S42, the action command generating unit 16 determines the number of fingers. When determined that the number of fingers of the touch operation is a single finger (single finger at step S42), at step S44, the action command generating unit 16 generates an action command for driving the second axis J22. When determined that the number of fingers of the touch operation is two fingers (two fingers at step S42), at step S45, the action command generating unit 16 generates an action command for driving the third axis J23. When determined that the number of fingers of the touch operation is three fingers (three fingers at step S42), at step S46, the action command generating unit 16 generates an action command for driving the fifth axis J25.

Meanwhile, when determined that the direction of the drag operation detected by the touch operation detecting unit 15 is the lateral direction (lateral direction at step S41), at step S43, the action command generating unit 16 determines the number of fingers. When determined that the number of fingers of the touch operation is a single finger (single finger at step S43), at step S47, the action command generating unit 16 generates an action command for driving the first axis J21. When determined that the number of fingers of the touch operation is two fingers (two fingers at step S43), at step S48, the action command generating unit 16 generates an action command for driving the fourth axis J24. When determined that the number of fingers of the touch operation is three fingers (three fingers at step S43), at step S49, the action command generating unit 16 generates an action command for driving the sixth axis J26. After generating any of the action commands at steps S44 to S49, the action command generating unit 16 completes the processes (end). Then, as a result of the controller 3 driving an axis of the robot 2 based on the above-described action command, an action of an axis system is performed.

As described above, according to the present embodiment, when a predetermined operation is performed during manual operation of the action of an axis system of the robot 22, the robot 22 is made to perform an action of the axis system that is considered easily associated by the user from the operation. In this case, the reasoning for the association between each operation and the action corresponding to the operation is based on visual and tactile information, and the like of humans. For example, the reasoning lies in the following points.

First, the reasoning for the driving of the drive axes of the second group, that is, the first axis J21, the fourth axis J24, and the sixth axis J26 being associated with the drag operation in the lateral direction is substantially similar to that according to the above-described fourth embodiment. That is, during manual operation, an axis is often driven while the six-axis articulated robot 22 maintains the basic attitude shown in FIG. 12, or an attitude similar to the basic attitude. In the six-axis vertical articulated robot 22, in the drive axes J21, J24, and J26 of the second group, a stationary-side member that does not rotate when the drive axis is driven and a rotating-side member that rotates when the drive axis is driven are linearly arranged.

Specifically, regarding the first axis J21, the base 25 is the stationary-side member and the shoulder portion 26 is the rotating-side member. In this case, when the first axis J21 is driven and the shoulder portion 26 rotates from a state in which the robot 22 is at the basic attitude, the hand (flange 31) moves in a circular arc on a horizontal plane. Here, the user often looks at the robot 22 from slightly above the horizontal direction when manually operating the robot 2. In this case, the hand (flange 31) of the robot 22 appears to the user to be moving in a horizontal lateral direction. Therefore, the operating direction by the user and the movement direction of the hand of the robot 22 match.

Regarding the fourth axis J24, the first upper arm 28 is the stationary-side member and the second upper arm 29 is the rotating-side member. In this case, when the fourth axis J24 is driven and the second upper arm 29 rotates from a state in which the robot 22 is at the basic attitude, the tip end portion of the hand (flange 31) moves in a circular arc on a plane that is tilted in relation to the horizontal plane (a plane perpendicular to the fourth axis J24). As described above, when the user looks at the robot 22 from slightly above the horizontal direction, the hand (flange 31) of the robot 22 appears to the user to be moving in a horizontal lateral direction. Therefore, the operating direction by the user and the movement direction of the hand of the robot 22 match.

Regarding the sixth axis J26, the wrist 30 is the stationary-side member and the flange 31 is the rotating-side member. In this case, when the sixth axis J26 is driven and the hand (flange 31) rotates from a state in which the robot 22 is at the basic attitude, the portion that is a certain point on the circumference of the hand (flange 31) moves in a circular arc on a plane perpendicular to the sixth axis J26 (in this case, a horizontal plane). As described above, when the user looks at the robot 22 from slightly above the horizontal direction, the certain point on the hand (flange 31) of the robot 22 appears to the user to be moving in a horizontal lateral direction. Therefore, the operating direction by the user and the movement direction of the hand of the robot 22 match.

In this way, according to the present embodiment, the operating direction of the user and the movement direction of the hand of the robot 22 match. Therefore, the user can easily recognize the operation in the vertical direction in relation to the touch panel 17 and the movement action of the hand by the driving of the drive axes J21, J24, and J26 of the second group in association. The reasoning for the association between the operation in the vertical direction in relation to the touch panel 17 and the vertical movement action by the driving of the drive axes of the second group (in this case, the third axis J13) is similar to the reason given according to the third embodiment. According to an embodiment such as this, when an axis system is driven, the user can easily associate the movement direction of the hand of the robot 22 from the operating mode by the user themselves. That is, the user can easily know the drive axis that corresponds to the operation. As a result, improvement in operability is achieved and decrease in safety can be suppressed.

In addition, according to the present embodiment, in the drag operation in the lateral direction, when the operation is by a single finger, the first axis J21 is driven. When the operation is by two fingers, the fourth axis J24 is driven. When the operation is by three fingers, the fourth axis J24, is driven. In this way, according to the present embodiment, the number of the drive axis of the second group to be driven increases as the number of fingers used for the drag operation increases. Therefore, the user can easily recognize the number of fingers used in the drag operation and the axis to be driven in association. As a result, operability is further improved.

Furthermore, in the above-described drive axis selecting process, the action command generating unit 16 determines the drive axis to be driven such that the selection transitions from the drive axis on the base 5 side of the robot 22 towards the drive axis on the hand (flange 31) side, that is, such that the selection transitions from the first axis J21 to the fourth axis J24 to the sixth axis J26, in accompaniment with the increase in the number of fingers of the drag operation. As a result, in a manner similar to that according to the above-described fourth embodiment, the user is able to perform a precise operation with fewer fingers for drive axes that have a greater influence on the movement amount of the hand of the robot 22. Therefore, operability is further improved.

In the drive axis selecting process, the action command generating unit 16 may determine the drive axis to be driven such that the selection transitions from the drive axis on the hand (flange 31) side of the robot 22 towards the drive axis on the base 5 side, that is, such that the selection transitions from the sixth axis J26 to the fourth axis J24 to the first axis J21, in accompaniment with the increase in the number of fingers of the drag operation. As a result, in a manner similar to that according to the above-described fourth embodiment, the user can perform a precise operation with fewer fingers for a drive axis that is frequently used during manual operation. Therefore, as a result of this configuration as well, operability can be further improved.

Sixth Embodiment

Next, a sixth embodiment will be described with reference to FIG. 26. The sixth embodiment is an example in which a so-called gesture operation is applied to an action of an axis system of the four-axis horizontal articulated robot 2. According to the sixth embodiment, an operation for driving the fourth axis J14 differs from that according to the above-described fourth embodiment. That is, as shown in FIG. 26(4), among the drive axes J11, J21, and J14 of the first group, the fourth axis J14 is performed by a drag operation by two fingers in a circumferential direction, that is, a rotation operation by either of two fingers.

In this case, as indicated by arrow C1 in FIG. 26(4), when the drag operation by two fingers in the circumferential direction is an operation towards the clockwise side in relation to the touch panel 17, the action command generating unit 16 generates an action command for driving the fourth axis J14 such as to rotate the hand of the robot 2 towards the clockwise side from a planar view. Meanwhile, as indicated by arrow C2 in FIG. 26(4), when the drag operation by two fingers in the circumferential direction is an operation towards the counter-clockwise side in relation to the touch panel 17, the action command generating unit 16 generates an action command for driving the fourth axis J14 such as to rotate the hand of the robot 2 towards the counter-clockwise side from a planar view.

The reasoning for the association between the driving of the fourth axis J14, that is, the rotation action of the hand (flange 9) with the drag operation by two fingers in the circumferential direction is as described in the description regarding the rotation operation of the hand according to the above-described first embodiment. That is, the operating direction of the drag operation by the user and the rotation direction of the hand of the robot 2 from a planar view match. Therefore, according to an embodiment such as this as well, when an axis system is driven, the user can easily associate the movement direction of the hand of the robot 2 from the operating mode by the user themselves. That is, the user can easily know the drive axis that corresponds to the operation. As a result, improvement in operability is achieved and decrease in safety can be suppressed.

Seventh Embodiment

Next, a seventh embodiment will be described with reference to FIG. 27. The seventh embodiment is an example in which a so-called gesture operation is applied to an action of an axis system of the six-axis horizontal articulated robot 22. According to the seventh embodiment, an operation for driving the fourth axis J24 differs from that according to the above-described fifth embodiment. That is, as shown in FIG. 27(4), among the drive axes J21, J24, and J26 of the second group, the fourth axis J24 is performed by a drag operation by two fingers in a circumferential direction, that is, a rotation operation by either of two fingers.

In this case, as indicated by arrow C1 in FIG. 27(6), when the so drag operation by two fingers in the circumferential direction is an operation towards the clockwise side in relation to the touch panel 17, the action command generating unit 16 generates an action command for driving the sixth axis J26 such as to rotate the hand of the robot 22 towards the clockwise side from a planar view. Meanwhile, as indicated by arrow C2 in FIG. 27(6), when the drag operation by two fingers in the circumferential direction is an operation towards the counter-clockwise side in relation to the touch panel 17, the action command generating unit 16 generates an action command for driving the sixth axis J26 such as to rotate the hand of the robot 2 towards the counter-clockwise side from a planar view.

The reasoning for the association between the driving of the sixth axis J26, that is, the rotation action of the hand (flange 31) with the drag operation by two fingers in the circumferential direction is as described in the description regarding the rotation operation of the hand according to the above-described first embodiment. That is, the operating direction of the drag operation by the user and the rotation direction of the hand of the robot 22 from a planar view match. Therefore, according to an embodiment such as this as well, when an axis system is driven, the user can easily associate the movement direction of the hand of the robot 22 from the operating mode by the user themselves. That is, the user can easily know the drive axis that corresponds to the operation. As a result, improvement in operability is achieved and decrease in safety can be suppressed.

Eighth Embodiment

Next, an eighth embodiment will be described with reference to FIG. 28 and FIG. 29. The eighth embodiment is an example in which a so-called gesture operation is applied to an action of an axis system of the four-axis horizontal articulated robot 2. According to the eighth embodiment, an operation for driving the fourth axis J14 differs from that according to the above-described fourth embodiment and sixth embodiment. That is, as shown in FIG. 28(4), among the drive axes J11, J12, and J14 of the first group, the fourth axis J14 is performed by a drag operation by three fingers in a circumferential direction.

Whether or not a drag operation is a drag operation by three fingers in the circumferential direction is determined, for example, in the following manner. That is, in a touch operation by a plurality of fingers (in this case, three fingers), the action command generating unit 16 extracts two fingers of which the distance between touch positions of the fingers is the farthest, among the plurality of fingers (in this case, three fingers). The action command generating unit 16 detects the distances between the contact positions, that is, movement start positions of the fingers and compares the distances. Regarding two positions, that is, two fingers of which the distance between the contact positions of the fingers is the farthest, the action command generating unit 16 determines whether or not a rotation component is included in either of the two fingers, as described in above-described first embodiment. When determined that a rotation component is in included in either of the two fingers, the action command generating unit 16 determines that the operation by the plurality of fingers (in this case, three fingers) is an operation in the circumferential direction. Meanwhile, when determined that a rotation component is not included both of the two fingers, the action command generating unit 16 determines that the operation by the plurality of fingers (in this case, three fingers) is not an operation in the circumferential direction.

For example, a case in which the user performs the drag operation in the circumferential direction with three fingers, that is, the thumb, the index finger, and the middle finger, will be described. Each finger of the user comes into contact with the touch panel 17 at, for example, positions P1, P2, and P3 in FIG. 29. In this case, of the positions P1 to P3, the position P1 indicates the contact position by the thumb. The position P2 indicates the contact position by the index finger. The position P3 indicates the contact position by the middle finger. In a human hand, in a state in which the hand is open, the direction in which four fingers, that is, the index finger, the middle finger, the ring finger, and the pinky extend differs from the direction in which the thumb extends. Based on such a structure of the human hand, when the user performs the drag operation with three fingers in the circumferential direction, for example, rotation is performed such that the thumb opposes the fingers other than the thumb (in this case, the index finger and the middle finger), with the center portion of the human palm (point O portion in FIG. 29) as the rotational center.

In this case, the movement direction of the thumb (point P2) and the movement directions of the other fingers, that is, the index finger (point P1) and the middle finger (point P3) face substantially opposite directions on the plane of the touch panel 17. In other words, the movement directions of the fingers other than the thumb (point P2), that is, the index finger (point P1) and the middle finger (point P3) face substantially the same direction. In this case, when whether or not a rotation component is included is determined based on vectors related to the movements of the fingers other than the thumb (point P2), that is, the index finger (point P1) and the middle finger (point P3), a following problem occurs.

Figure 29:
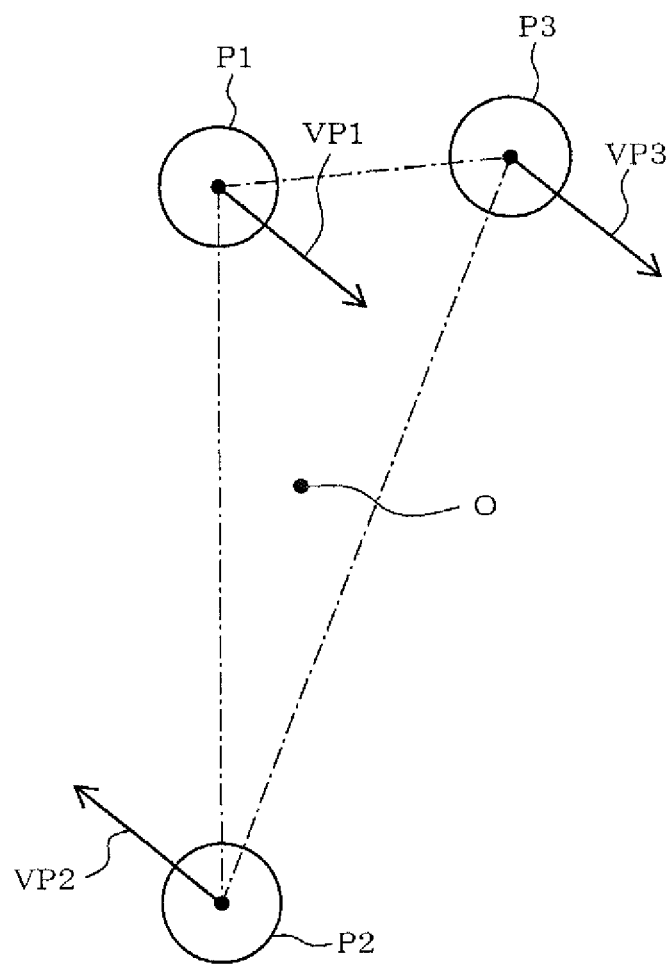
FIG. 29 is a diagram of a method for determining whether a rotation component is included in a drag operation when a drag operation is performed with three or more fingers in a circumferential direction, according to the eighth embodiment.

That is, as shown in FIG. 29, a vector related to the movement of the index finger (position P1) is VP1. A vector related to the movement of the thumb (position P2) is VP2. A vector related to the movement of the middle finger (position P3) is VP3. In this case, the to movement direction of the index finger (position P1) and the movement direction of the middle finger (position P3) are substantially the same. Therefore, the angle formed by the vector VP1 related to the movement of the index finger (position P1) and the vector VP3 related to the movement of the middle finger (position P3) is small. In this case, the likelihood is high that the angle formed by the vector VP1 related to the movement of the index finger (position P1) and the vector VP3 related to the movement of the middle finger (position P3) is less than a determination threshold, and a determination is made that the drag operation is not an operation in the circumferential direction.

Meanwhile, the movement direction of the thumb (position P2) and the movement directions of the other fingers, that is, the index finger (position and the middle finger (position P3) face substantially opposite directions on the plane of the touch panel 17. Therefore, the angle formed by the vector VP2 related to the movement of the thumb (position 2) and a vector (vector VP1 or vector VP3) related to the movement of a finger other than the thumb is large. Therefore, the likelihood is extremely low that the angle formed by the vector VP2 related to the movement of the thumb (position 2) and a vector (vector VP1 or vector VP3) related to the movement of a finger other than the thumb is less than the determination threshold. From the foregoing reasons, regarding the determination of whether or not drag operation by a plurality of fingers is an operation in the circumferential direction, it is sufficient to determine whether or not a rotation component is included in either of two fingers of which the distance is the most street, among the plurality of fingers.

The reasoning for the driving of the fourth axis J14, that is, the rotation action of the hand (flange 9) being associated with the drag operation by three fingers in the circumferential direction is similar to the reasoning for the driving of the fourth axis J14, that is, the rotation action of the hand (flange 9) being associated with the drag operation by two fingers in the circumferential direction. In this case as well, regarding the action of the fourth axis J14, the operating direction of the drag operation by the user and the rotation direction of the hand of the robot from a planar view match. Therefore, according to an embodiment such as this as well, when an axis system is driven, the user can easily associate the movement direction of the hand of the robot 2 from the operating mode by the user themselves. That is, the user can easily know the drive axis that corresponds to the operation. As a result, improvement in operability is achieved and decrease in safety can be suppressed.

Ninth Embodiment

Next, a ninth embodiment will be described with reference to FIG. 30. The ninth embodiment is an example in which a so-called gesture operation is applied to operation of an axis system of the six-axis vertical articulated robot 22. According to the ninth embodiment, an operation for driving the sixth axis J26 differs from that according to the above-described fifth embodiment. That is, as shown in FIG. 30(6), among the drive axes J21, J24, and J26 of the second group, the sixth axis J26 is performed by a drag operation by three fingers in a circumferential direction. The operation for driving as the sixth axis J26 is similar to the operation for driving the fourth axis J14 according to the above-described eighth embodiment, shown in FIG. 28(4). In this case, the method for determining whether or not a drag operation is a drag operation by three fingers in a circumferential direction is as described according to the above-described eighth embodiment. In addition, the reasoning for the driving of the sixth axis J26, that is, the rotation action of the hand (flange 31) being associated with the drag operation by three fingers in the circumferential direction is as described in the description related to the fourth axis J14 according to the above-described eighth embodiment.

In this case, regarding the action of the sixth axis J26, the operating direction of the drag operation by the user and the rotation direction of the hand of the robot 2 from a planar view match. Therefore, according to an embodiment such as this as well, when an axis system is driven, the user can easily associate the movement direction of the hand of the robot 2 from the operating mode by the user themselves. That is, the user can easily know the drive axis that corresponds to the operation. As a result, improvement in operability is achieved and decrease in safety can be suppressed.

Tenth Embodiment

Next, a tenth embodiment will be described with reference to FIG. 31. The tenth embodiment is an example in which a so-called gesture operation is applied to operation of an axis system of the six-axis vertical articulated robot 22. According to the tenth embodiment, the operation related to the fourth axis J24 according to the seventh embodiment, shown in FIG. 27(4), and the operation related to the sixth axis J26 according to the ninth embodiment, shown in FIG.

30(6), are applied to an action of an axis system according to the fourth embodiment, shown in FIG. 22. That is, the fourth axis J24 is driven based on a drag operation by two fingers in the circumferential direction, as shown in FIG. 31(4). In addition, the sixth axis J26 is driven based on a drag operation by three fingers in the circumferential direction.

Here, in the four-axis horizontal articulated robot 2, the drive axes of a first group is composed only of the fourth axis J14. Meanwhile, in the six-axis vertical articulated robot 22, the drive axes of the first group is composed of three drive axes, that is, the first axis J21, the fourth axis J24, and the sixth axis J26. According to the present embodiment, regarding the two drive axes (fourth axis J24 and sixth axis J26) near the hand (flange 31) side, among the drive axes of the first group, driving is performed based on a drag operation by a plurality of fingers in the circumferential direction.

In the six-axis vertical articulated robot 22, when the first axis J21 nearest to the base 25 side is driven, the hand (flange 31) moves over a horizontal plane, that is moves two-dimensionally. Therefore, the user tends to become aware that the action of the hand (flange 31) by the driving of the first axis J21 is a two-dimensional action on a horizontal plane. Meanwhile, when the fourth axis J24 and the sixth axis J26 near the hand side are driven, the hand (flange 31) moves not only on the horizontal plane, but also in the vertical direction, depending on the attitude of the robot 22, or in other words, moves three-dimensionally. Therefore, the user tends to become aware that the action of the hand (flange 31) by the driving of the fourth axis J24 or the sixth axis J26 is a three-dimensional rotation action with the drive axis J24 or J26 as the rotation center, rather than a two-dimensional action on a horizontal plane.

In this way, when the operations for the fourth axis J24 and the sixth axis J26, which the user tends to be aware of as three-dimensional rotation actions, are drag operations by a plurality of fingers in the circumferential direction, the awareness of the user and the movement direction of the hand (flange 31) can match. Therefore, according to an embodiment such as this as well, when an axis system is driven, the user can easily associate the movement direction of the hand of the robot 22 from the operating mode by the user themselves. That is, the user can easily know the drive axis that corresponds to the operation. As a result, improvement in operability is achieved and decrease in safety can be suppressed. Moreover, the time required for teaching can be shortened.

Eleventh Embodiment

Next, an eleventh embodiment will be described according to FIG. 32. The eleventh embodiment is an example in which a so-called gesture operation is applied to operation of an axis system of the six-axis vertical articulated robot 22. According to the eleventh embodiment, from the first axis J21 to the fifth axis J25, the drive axes correspond to the number of fingers of a drag operation in the lateral direction. In this case, in the drive axis selecting process, in accompaniment with the number of fingers of the drag operation increasing from a single finger to two fingers . . . to five fingers, the drive axis to be driven is determined such that the drive axis to be driven transitions from the base 25 side of the robot 22 to the hand side, that is, from the first axis J21 to the second axis J22 . . . to the fifth axis J25.

Specifically, as shown in FIG. 32(1), the first axis J21 is driven based on a drag operation by a single finger in the lateral direction. As shown in FIG. 32(2), the second axis J22 is driven based on a drag operation by two fingers in the lateral direction. As shown in FIG. 32(3), the third axis J23 is driven based on a drag operation by three fingers in the lateral direction. As shown in FIG. 32(4), the fourth axis J24 is driven based on a drag operation by four fingers in the lateral direction. As shown in FIG. 32(5), the fifth axis J25 is driven based on a drag operation by five fingers in the lateral direction.

In addition, as shown in FIG. 32(6), the sixth axis J26 is driven based on a drag operation by a single finger in the lateral direction. The driving of the sixth axis J26 may be performed by a drag operation by two fingers in the circumferential direction, shown in FIG. 31(4). In this case, the drag operation by two fingers in the circumferential direction may be, for example, such that a circle is drawn by two fingers or such that one finger is held stationary and a circle is drawn by the other finger. In addition, operation may be performed by one hand. Alternatively, operation may be performed by both hands. In addition, the sixth axis J26 may be driven based on a drag operation by three fingers in the circumferential direction, shown in FIG. 31(6).

In this way, as a result of the number of fingers of the drag operation matching the number of the drive axis to be driven, the awareness of the user and the drive axis can be matched. Therefore, according to an embodiment such as this as well, when an axis system is driven, the user can easily associate the axis to be driven from the operating mode by the user themselves. That is, the drive axis that corresponds to the operation can be easily known.

In addition, as a result, the user can drive the sixth axis J26, that is, perform the rotation operation of the hand by the drag operation with a single finger in the vertical direction. As described above, manual operation is often used for fine adjustment of the position and attitude of the hand of the robot. Therefore, in manual operation, the sixth axis J26 that is closest to the hand is frequently used and is required to perform intricate actions. Therefore, as a result of the driving of the sixth axis J26 being corresponded to the drag operation by a single finger that is easy and enables precise operation, the user can perform the rotation action of the hand that is frequently used in manual operation with more ease and precision. As a result, improvement in operability is achieved and decrease in safety can be suppressed. Moreover, the time required for teaching can be shortened.

When the driving of the sixth axis J26 is corresponded to the drag operation in the circumferential direction, the user can easily recognize the rotation action of the wrist of the robot by the driving of the sixth axis J26 and the drag operation in the circumferential direction in association. Therefore, as a result, a more intuitive operation can be performed.

Twelfth Embodiment

Next, a twelfth embodiment will be described with reference to FIG. 33. The twelfth embodiment is an example in which a so-called gesture operation is applied to operation of an axis system or a hand system of the four-axis horizontal articulated robot 2. According to the present embodiment, the user can operate the axis system or the hand system by changing the direction of the drag operation. According to the present embodiment, the selection operation detecting unit 18 detects a touch operation on the touch panel 17. A determining process performed by the action command generating unit is a process for determining a drive axis to be operated or an action mode, based on an operating direction of a drag operation, when the touch operation detected by the selection operation detecting unit 18 is a drag operation.

The action command generating unit 16 assigns the directions of the drag operation by a single dinger such as to be differing directions for each drive axis or drive mode of the robot 2. In this case, in an action of the axis system, each drive axis is individually driven. In addition, in an action of the hand system, the horizontal movement action, the vertical movement action, and the rotation action are performed. The movement directions of the robot are the X direction or the Y direction in the horizontal movement action, the Z-direction in the vertical movement action, and the Rz direction in the rotation action.

Next, a specific example will be described with reference to FIG. 33. In the description according to the present embodiment, the vertical direction on the touch panel, or specifically, the direction indicated by a single-dot chain line D in FIGS. 33(1) to (4) serves as reference. According to the present embodiment, the driving of each axis in the action of the axis system or the movement in each direction in the action of the hand system is assigned to an operation in a direction rotated at a 45° interval in relation to the reference D. That is, as shown in FIG. 33(1), the driving of the first axis J11 in the action of an axis system or the movement in the X direction in the action of the hand system is performed based on a drag operation in a direction along the reference D. As shown in FIG. 33(2), the driving of the second axis J12 in the action of an axis system or the movement in the Y direction in the action of the hand system is performed based on a drag operation in a direction rotated 45° towards the clockwise side in relation to the reference D.

As shown in FIG. 33(3), the driving of the third axis J13 in the action of an axis system or the movement in the Z direction (direction perpendicular to the action reference plane P) in the action of the hand system is performed based on a drag operation in a direction rotated 45° towards the counter-clockwise side in relation to the reference D. As shown in FIG. 33(4), the driving of the fourth axis J14 in the action of an axis system or the movement in the Rz direction (rotation action) in the action of the hand system is performed based on a drag operation in a direction perpendicular to the reference D, that is, the lateral direction in relation to the touch panel 17.

The direction of the drag operation in relation to the reference D, described above, is not necessarily required to be exact. A certain degree of error is allowed. For example, according to the present embodiment, regarding the drag operations actually performed by the user, an error of 22.5° in both the clockwise direction and the counter-clockwise direction is allowed for the directions of the drag operations for driving each drive axis or for enabling each action to be performed. For example, the action command generating unit 16 determines a drag operation in a direction rotated 15° towards the clockwise side or the counter-clockwise side in relation to the reference D to be an operation for driving the first axis J11 when operating the axis system and an operation for movement in the X direction when operating the hand system.

As a result, the user can select the drive axis of the robot 2 to be operated or the action mode, that is, the type of action of the robot 2 by changing the direction of the drag operation. Therefore, the user is not required to learn complicated operations for selecting the type of action, and operation becomes easier. As a result, manual operation of the four-axis robot 2 can be actualized by touch operation, without causing decrease in safety.

The touch panel 17 used in the teaching pendant 4 such as this is typically rectangular in shape. Therefore, it is thought that the user feels it easier to perform a drag operation in directions along the sides surrounding the rectangular touch panel 17, that is, the vertical direction and the lateral direction in relation to the touch panel 17, compared to drag operations in other directions. According to the present embodiment, in the action of the axis system, driving of the first axis J11, by which the hand is significantly moved, is assigned to the vertical direction in which the user finds easy to operate. Therefore, operation becomes easier, In addition, the purpose of manual operation is often fine adjustment of the position and attitude of the hand of the robot 2. Therefore, during manual operation, high precision is required of the driving of the fourth axis J14 closest to the hand of the robot 2, that is, the rotation action of the hand. According to the present embodiment, the driving of the fourth axis J14 or the movement in the Rz direction (rotation action) is assigned to the lateral direction in which the user finds easy to operation. Therefore, operation becomes easier. Assignment of the directions of the drag operation is not limited to those described above. The assignment can be changed as appropriate based on the degree of proficiency of the user, the intended use of the robot, and the like.

In addition, as a result, the number of fingers of the drag operation is not a concern. Therefore, the user can perform an input operation with a single finger. That is, the robot system 1 provides an advantage in which the user can easily perform operations with a single finger. This advantage is also effective when a pointing device, such as a so-called touch pen or stylus pen, is used. That is, when an operating environment of a robot for industrial use is considered, the user may be wearing gloves to ensure the safety of the user, or a substance that inhibits the touch operation, such as a lubricant, may be attached to the hand and fingers of the user. In this case, even when the user performs a touch operation with their hand and fingers, the robot operation apparatus may not accurately recognize the touch operation. Meanwhile, even when the user is wearing gloves, or lubricant or the like is attached to the hands and fingers of the user, the user can perform an accurate touch operation by using the above-described pointing device. In this way, according to the present embodiment, an advantage is achieved in that a pointing device can be easily used in manual operation of the robot 2.

Thirteenth Embodiment

Next, a thirteenth embodiment will be described with reference to FIG. 34. The thirteenth embodiment differs from the above-described twelfth embodiment in that the robot to be operated is the six-axis vertical articulated robot 22. That is, the thirteenth embodiment is an example in which a so-called gesture operation is applied to operation of an axis system or a hand system of the six-axis vertical articulated robot 22. According to the present embodiment as well, the user can operate the axis system or the hand system by changing the direction of the drag operation. In this case, in addition to the X direction, the Y direction, and the Rz direction according to the twelfth embodiment, an Rx direction and an Ry direction are included in the action of the hand system.

A specific example will be described with reference to FIG. 34. In the description according to the present embodiment, the vertical direction on the touch panel, or specifically, the direction indicated by a single-dot chain line D in FIG. 34(1) to (6) serves as reference. According to the present embodiment, the driving of each axis in the action of the axis system or the movement in each direction in the action of the hand system is assigned to an operation in a direction rotated at a 30° interval in relation to the reference D. That is, as on shown in FIG. 33(1), the driving of the first axis J21 in the action of an axis system or the movement in the Z direction in the action of the hand system is performed based on a drag operation in a direction along the reference D. As shown in FIG. 34(2), the driving of the second axis J22 in the action of an axis system or the movement in the X direction in the action of the hand system is performed based on a drag operation in a direction rotated 30° towards the clockwise side in relation to the reference D.

As shown in FIG. 34(3), the driving of the third axis J23 in the action of an axis system or the movement in the Y direction in the action of the hand system is performed based on a drag operation in a direction rotated 60° towards the clockwise side in relation to the reference D. The driving of the fourth axis J24 in the action of an axis system or the movement in the Rx direction in the action of the hand system is performed based on a drag operation in a direction rotated 30° towards the counter-clockwise side in relation to the reference D. The driving of the fifth axis J25 in the action of an axis system or the movement in the Ry direction in the action of the hand system is performed based on a drag operation in a direction rotated 60° towards the counter-clockwise side in relation to the reference D. The driving of the sixth axis J26 in the action of an axis system or the movement in the Rz direction in the action of the hand system is performed based on a drag operation in a direction perpendicular to the reference D.

As a result, working effects similar to those according to the twelfth embodiment described above can be achieved in the manual operation of the six-axis vertical articulated robot 22.

That is, regarding the action of an axis system, drag operations in the vertical direction and the lateral direction that are easily operated are assigned to the operations of the first axis J21 and the sixth axis J26. The driving of the first axis J21 significantly affects the movement of the hand. The sixth axis J26 is an axis that is frequently used in manual operation. In addition, the operation of the sixth axis J26 requires accurate adjustment. Therefore, as a result of the drag operations in the vertical direction and the lateral direction that are easily operated being assigned to the first axis J21 and the sixth axis J26, improvement in operability is achieved.

In this case, the operations of the second axis J22 to fifth axis J25 are assigned drag operations in oblique directions. A drag operation in an oblique direction is considered to be slightly poorer in operability compared to the drag operations in the vertical direction and the lateral direction. However, regarding the operations of the second axis J22 to fifth axis J25, it is thought that the effect of the drag operations in the oblique directions is small for the following reasons.

That is, driving of the second axis J22 and that of the third axis J23 are assigned drag operations in two adjacent oblique directions. That is, driving of the second axis J22 and that of the third axis J23 are assigned drag operations in directions rotated at angles within a range from 0° to 90° towards the clockwise side in relation to the reference D. In this case, because the operating directions for the second axis J22 and the third axis J23 are similar, erroneous operation may occur. Here, driving of the second axis J22 and that of the third axis J23 are both for moving the hand of the robot 22 in the Z direction (vertical direction).

Therefore, the movement directions of both are similar. Consequently, even should the user mistake the operations for the second axis J22 and the third axis J23, because both move the hand of the robot 22 in the Z direction, the risk of the action of the robot 22 being an action unexpected by the user is low. As a result, the danger involved when an erroneous operation is performed regarding the second axis J22 and the third axis J23 is lower compared to those regarding the first axis J21 and the sixth axis J26.

In addition, driving of the fourth axis J24 and that of the fifth axis J25 are assigned drag operations in two adjacent oblique directions. In this case, driving of the fourth axis J24 and that of the fifth axis J25 are assigned drag operations in directions rotated at angles within a range from 0° to 90° towards the counter-clockwise side in relation to the reference D. In this case, because the operation directions for the third axis J23 and the fourth axis J25 are similar, the user may perform an erroneous operation.

Here, even when the fourth axis J24 or the fifth axis J25 is driven, the movement amount of the hand of the robot 22 is smaller compared to those of the first axis J21 to third axis J23. In addition, the fourth axis J24 and the fifth axis J25 are mainly for performing fine adjustment, rather than significantly moving the hand of the robot 22. Therefore, regarding the fourth axis J24 or the fifth axis J25, the risk of a large operation being inputted is low in the first place. Therefore, even should the user mistake the operations for the fourth axis J24 and the fifth axis J25, because the inputted operating amount is small in the first place and the movement amount of the hand is small even if action is performed based on erroneous operation, the hazards involved in erroneous operation is lower compared to that that regarding the first axis J21 and the like.

In addition, regarding the action of the hand system, the action in the Z direction is assigned to the drag operation in the vertical direction. As described above, the drag operation in the vertical direction is easily associated with the movement of the hand of the robot 22 in the vertical direction (Z direction). As a result, the user can easily match the drag operation performed by the user themselves and the movement direction of the hand of the robot 22. Therefore, operability is favorable.

The actions in the X direction and the Y direction are assigned to drag operations in two adjacent oblique directions. That is, the actions in the X direction and the Y direction are assigned to drag operations in directions rotated at angles within a range from 0° to 90° towards the clockwise side in relation to the reference D. In this case, because the operating directions for the X direction and the Y direction are similar, erroneous operation may occur. However, the drag operation to which the action in the X direction is assigned has more components in the vertical direction compared to components in the lateral direction. As described above, the user easily associates the operation in the X direction with the drag operation in the vertical direction. Meanwhile, the drag operation to which the action in the Y direction is assigned has more components in the lateral direction compared to components in the vertical direction. As described above, the user easily associates the operation in the Y direction with the drag operation in the lateral direction. As a result, the risk of mistaking the action in the X direction and the action in the Y direction can be made extremely low.

In addition, the actions in the Rx direction and the Ry direction are assigned to drag operations in two adjacent oblique directions. That is, the actions in the Rx direction and the Ry direction are assigned to drag operations in directions rotated at angles within a range from 0° to 90° towards the counter-clockwise side in relation to the reference D. In this case, a drag operation in an oblique direction is considered to be slightly poorer in operability compared to the drag operations in the vertical direction and the lateral direction. However, regarding the actions in the Rx direction and the Ry direction, the frequency of use during manual operation is low compared to other actions. Therefore, even if the actions in the Rx direction and the Ry direction are assigned drag operations in the oblique direction, the effect on the overall operability is small. From the foregoing reasons, according to the present embodiment, operations for each action become easier. As a result, manual operation of the six-axis robot 22 can be actualized by touch operation without causing decrease in safety.

Fourteenth Embodiment

Next, a fourteenth embodiment will be described with reference to FIG. 35 and FIG. 36.

In recent years, low-priced devices such as so-called smartphones and tablet personal computers (PCs) (referred to, hereafter, as smart devices) have become widespread. If this low-priced smart device can be used as a device for operating a robot (teaching pendant), use of an expensive, dedicated teaching pendant is no longer required. Therefore, this also leads to cost reduction. Such smart devices are provided with a touch panel as a main interface. As a result of a user running a finger on the touch panel, two-dimensional (X-Y plane) simultaneous input can be performed. Meanwhile, in the industrial arena, the four-axis type horizontal articulated robot 2 and the six-axis type vertical articulated robot 22, such as those described above, are often used, In this case, the types of operation input required for manual operation are four types for the four-axis type robot 2 and six types for the six-axis type robot 22. Therefore, to use a smart device as a robot operation apparatus, the issue becomes how to handle operation input of two types of movement. Here, according to the present embodiment, when the robot 2 or 22 is manually operated, switching is performed between an operation for a drive axis or an action mode contributing to the position of the hand tip of the robot 2 or 22 (main operation), and an operation for a drive axis or an action mode contributing to the attitude of hand tip of the robot 2 or 22 (sub-operation).

In other words, in the action of each axis system of the four-axis type robot 2 shown in FIG. 1 and the like, the drive axes contributing to the hand tip position of the robot 2 are the first axis J11, the second axis J12, and the third axis J13. The drive axis contributing to the hand tip attitude of the robot 2 is the fourth axis J14. That is, as shown in FIG. 35, in the action of each axis system of the four-axis type robot 2, the main operation is an operation for driving the first axis J11, the second axis J12, and the third axis J13. In addition, the sub-operation is an operation for driving the fourth axis J14.

In addition, in the action of the hand system of the four-axis type robot 2 shown in FIG. 1 and the like, the action modes contributing to the hand tip position of the robot 2 are movements in the X direction, the Y direction, and the Z direction. The action mode contributing to the hand tip attitude of the robot 2 is the Rz direction. That is, as shown in FIG. 35, in the action of the hand system of the four-axis type robot 2, the main operation is an operation for moving the hand of the robot 2 in the X direction, the Y direction, and the Z direction. In addition, the sub-operation is an operation for moving the hand of the robot 2 in the Rz direction.

In a similar manner, in the action of each axis system of the six-axis type robot 22 shown in FIG. 10 and the like, the drive axes contributing to the hand tip position of the robot 22 are the first axis J21, the second axis J22, and the third axis J23. The drive axes contributing to the hand tip attitude of the robot 22 are the fourth axis J24, the fifth axis J25, and the sixth axis J26. That is, in the action of each axis system of the six-axis type robot 22, the main operation is an operation for driving the first axis J21, the second axis J22, and the third axis J23. The sub-operation is an operation for driving the fourth axis J24, the fifth axis J25, and the sixth axis J26, In addition, in the action of the hand system of the six-axis type robot 22 shown in FIG. 10 and the like, the action modes contributing to the hand tip position of the robot 22 are movements in the X direction, the Y direction, and the Z direction. The action modes contributing to the hand tip attitude of the robot 22 are movements in the Rx direction, the Ry direction, and the Rz direction. That is, in the action of the hand system of the six-axis type robot 22, the main operation is an operation for moving the hand of the robot 22 in the X direction, the Y direction, and the Z direction. In addition, the sub-operation is an operation for moving the hand of the robot 22 in the Rx direction, the Ry direction, and the Rz direction.

As shown in FIG. 36, the teaching pendant 4 according to the present embodiment is provided with a first button 41 and a second button 42, in addition to the configuration of the teaching pendant 2 according to the above-described embodiments. The first button 41 and the second button 42 are, for example, physical buttons. The first button 41 and the second button 42 may be buttons for increasing or decreasing sound volume of sound reproduced in a teaching pendant 40. In this case, the control unit 14 performs a program for a robot operation apparatus. As a result, the first button 41 and the second button 42 are given a function of switching between the main operation and the sub-operation. Consequently, the first button 41 and the second button 42 functions as a switching unit enabling switching between the main operation and the sub-operation.

For example, the first button 41 on which is attached a "+" symbol corresponds to the main operation. The second button 42 on which is attached a "−" symbol corresponds to the sub-operation. In this case, when operation of the first button 41 is detected, the control unit 14 determines that a touch operation subsequently detected by the touch operation detecting unit 15 is the main operation. Meanwhile, when operation of the second button 42 is detected, the control unit 14 determines that a touch operation subsequently detected by the touch operation detecting unit 15 is the sub-operation. In this way, the user can switch input between the main operation and the sub-operation by operating the first button 41 and the second button 42.

The switching unit is not limited to that which is used in combination with another function, such as the above-described first button 41 and the second button 42. The switching unit may be a dedicated physical button for switching between the main operation and the sub-operation. In addition, for example, the switching unit may be that displayed on the touch panel 17. As an example of a switching unit displayed on the touch panel 17, a button-shaped switching unit or a so-called slide bar that switches between the main operation and the sub-operation by being slid in either direction can be considered.

As shown in FIG. 36, the touch panel 17 is divided into a first area 171 and a second area 172. The first area 171 and the second area 172 are virtually formed on the touch panel 17 by the control unit 14 running a robot operation program. As shown in FIG. 36, according to the present embodiment, when the rectangular touch panel 17 is at a laterally long attitude, the first area 171 is positioned on the left side of the touch panel 17. The second area 172 is positioned on the right side of the touch panel 17. That is, on the touch panel 17, a left-side portion of a virtual boundary line E is the first area 171, and a right-side portion of the virtual boundary line E is the second area 172.

The arrangement of the first area 171 and the second area 172 is not limited thereto. For example, when the touch panel 17 is at a vertically long attitude, that is, when the teaching pendant 4 is rotated 90° from the state in FIG. 35, the first area 171 is positioned in an upper portion of the touch panel 17. The second area 172 is positioned in a lower portion of the touch panel 17. In addition, the positions of the first area 171 and the second area 172 may be interchanged. In this case, the teaching pendant 4 can determine its own attitude by the attitude detecting unit 19, such as a gyro sensor or an acceleration sensor.

The first area 171 is an area in which operations in two perpendicular directions can be detected by the touch operation detecting unit 15. In this case, in the first area 171, a direction indicated by arrow A1 is upwards in the vertical direction. A direction indicated by arrow A2 is downward in the vertical direction. In addition, a direction indicated by arrow B1 is rightward in the lateral direction. A direction indicated by arrow B2 is leftward in the lateral direction. The second area 172 is an area in which an operation in one direction, in this case, the vertical direction can be detected by the touch operation detecting unit 15.

That is, according to the present embodiment, the first area 171 is an area in which two types of drag operations in the vertical and lateral directions can be detected. In addition, the second area 171 is an area in which one type of drag operation in the vertical direction can be detected. Therefore, according to the present embodiment, the first area 171 is larger than the second area 172. Depending on the necessary number of operation inputs, two types of drag operations in the vertical and lateral directions may be made detectable in the second area 172 as well, in a manner similar to the first area 171.

The action command generating unit 16 generates action commands for a drive axis or an action mode that differ between when the drag operation detected by the touch operation detecting unit 15 is performed in the first area 171 and when the drag operation detected by the touch operation detecting unit 15 is performed in the second area 172. That is, regarding the main operation of the four-axis type robot 2, the drag operation in the vertical direction (the directions of arrows A1 and A2) in the first area 171 corresponds to driving of the first axis J11 in the axis system or movement in the X direction in the hand system. The drag operation in the lateral direction (the directions of arrows B1 and B2) in the first area 171 corresponds to driving of the second axis J12 in the axis system or movement in the Y direction in the hand system. The drag operation in the vertical direction (the directions of arrows A1 and A2) in the second area 172 corresponds to driving of the third axis J13 in the axis system or movement in the Z direction in the hand system.

In addition, regarding the sub-operation of the four-axis type robot 2, the drag operation in the lateral direction (the directions of arrows B1 and B2) in the first area 171 corresponds to driving of the fourth axis J14 in the axis system or movement in the Rz direction in the hand system. In the four-axis type robot 2, determination of four types of operation inputs is sufficient. Therefore, the drag operation in the vertical direction in the first area 171 and operations in the second area 172 in the sub-operation do not correspond with any drive axis or action mode.

In addition, regarding the main operation of the six-axis type robot 22, the drag operation in the vertical direction (the directions of arrows A1 and A2) in the first area 171 corresponds to driving of the second axis J22 in the axis system or movement in the X direction in the hand system. The drag operation in the lateral direction (the directions of arrows B1 and B2) in the first area 171 corresponds to driving of the third axis J23 in the axis system or movement in the Y direction in the hand system. The drag operation in the vertical direction (the directions of arrows A1 and A2) in the second area 172 corresponds to driving of the first axis J21 in the axis system or movement in the Z direction in the hand system.

In addition, regarding the sub-operation of the six-axis type robot 22, the drag operation in the vertical direction (the directions of arrows A1 and A2) in the first area 171 corresponds to driving of the fourth axis J24 in the axis system or movement in the Rx direction in the hand system. The drag operation in the lateral direction (the directions of arrows B1 and B2) in the first area 171 corresponds to driving of the fifth axis J25 in the axis system or movement in the Ry direction in the hand system. In addition, in the sub-operation, the drag operation in the vertical direction (the directions of arrows A1 and A2) in the second area 172 corresponds to driving of the sixth axis J26 in the axis system or movement in the Rz direction in the hand system. In the sub-operation of the axis system, the drag operation in the vertical direction (the directions of arrows A1 and A2) in the first area 171 may be corresponded to driving of the fifth axis J25. The drag operation in the vertical direction (the directions of arrows A1 and A2) in the first area 171 may be corresponded to the fourth axis J24. In this case, the drag operation in the vertical direction (the directions of arrows A1 and A2) in the second area 172 corresponds to driving of the fourth axis J24.

According to the present embodiment, the user can switch between the main operation and the sub-operation by operating the first button 41 and the second button 42, which are the switching unit. As a result, during manual operation of the robot 2 or 22, the user can clearly be aware of whether the user performing an operation for determining the hand tip position of the robot 2 or 22 or an operation for determining the attitude of the hand. Therefore, erroneous operation, such as the user performing an operation to change the position of the hand regardless of attempting to determine the attitude of the hand, can be suppressed. As a result, operability is improved.

In addition, the touch panel 17 is divided into the first area 171 and the second area 172. The first area 171 is an area on the touch panel 17 in which operations in two directions that are perpendicular to each other can be detected by the touch operation detecting unit 15. The second area 172 is an area on the touch panel 17 in which an operation in one direction can be detected by the touch operation detecting unit 15. In other words, the action command generating unit 16 can determine a total of three types of drag operations by drag operations in two directions inputted in the first area 171, and a drag operation in one direction inputted on the second area 172. In addition, regarding the areas 171 and 172, switching can be performed between the main operation and the sub-operation. Therefore, as a result of the teaching pendant 4 such as this, manual operation of the actions of the hand system and the actions of the axis system can be handled by both the four-axis type horizontal articulated robot 2 and the six-axis type vertical articulated robot 22 that are often used in the industrial arena.

Fifteenth Embodiment

Next, a fifteenth embodiment will be described with reference to FIG. 37 and FIG. 38.

According to the fifteenth embodiment, movement in the Z direction (vertical direction) is performed based on the attitude of the teaching pendant 4. That is, the teaching pendant 4 according to the present embodiment uses the attitude detecting unit 19 in FIG. 2 as a tilt detecting unit. The tilt detecting unit can detect the input of a tilt operation by the user by detecting the tilt of the touch panel 17. The action command generating unit 16 of the teaching pendant 4 can perform a horizontal movement action command generating process and a vertical movement action command generating process.

The horizontal movement action command generating process a process for generating an action command for moving the hand of the robot 2 or 22 in a planar direction horizontal to the action reference plane P of the robot 2 or 22, based on the touch operation detected by the touch operation detecting unit 15. The vertical movement action command generating process is a process for generating an action command for moving the hand of the robot 2 or 22 along a vertical axis direction that is perpendicular to the action reference plane P, based on the tilt operation detected by the attitude detecting unit 19 (tilt operation detecting unit).

In other words, in the action of the hand system, when performing an operation for movement in the X direction and the Y direction (planar movement action), the user performs a drag operation in the vertical direction or the lateral direction in relation to the touch panel 17. In this case, as shown in FIG. 37, the drag operation in the vertical direction in relation to the touch panel 17 corresponds to movement of the robot 2 or 22 in the X direction. The drag operation in the lateral direction in relation to the touch panel 17 corresponds to movement of the robot 2 or 22 in the Y direction.

Figure 37:
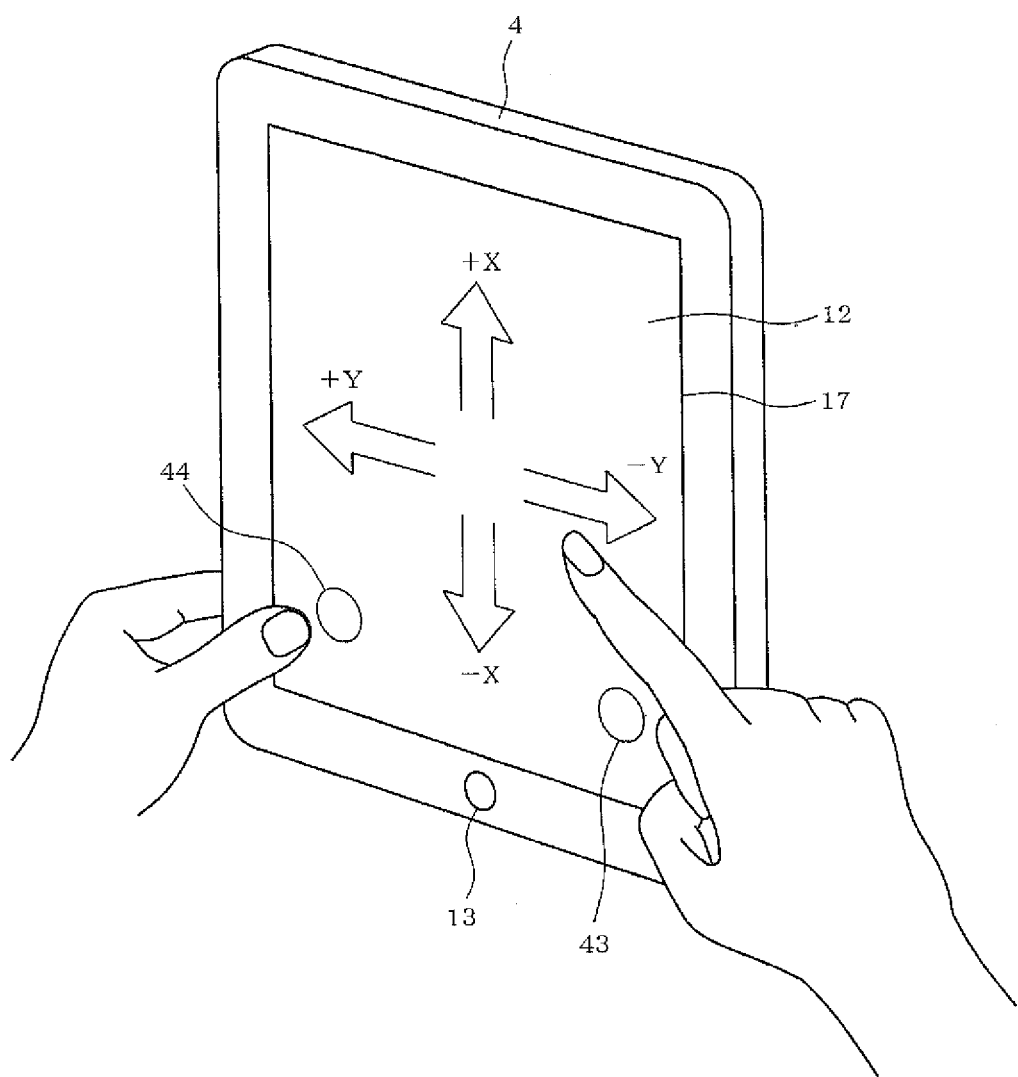
FIG. 37 is a diagram of an example of a teaching pendant according to a fifteenth embodiment.
Figure 38:
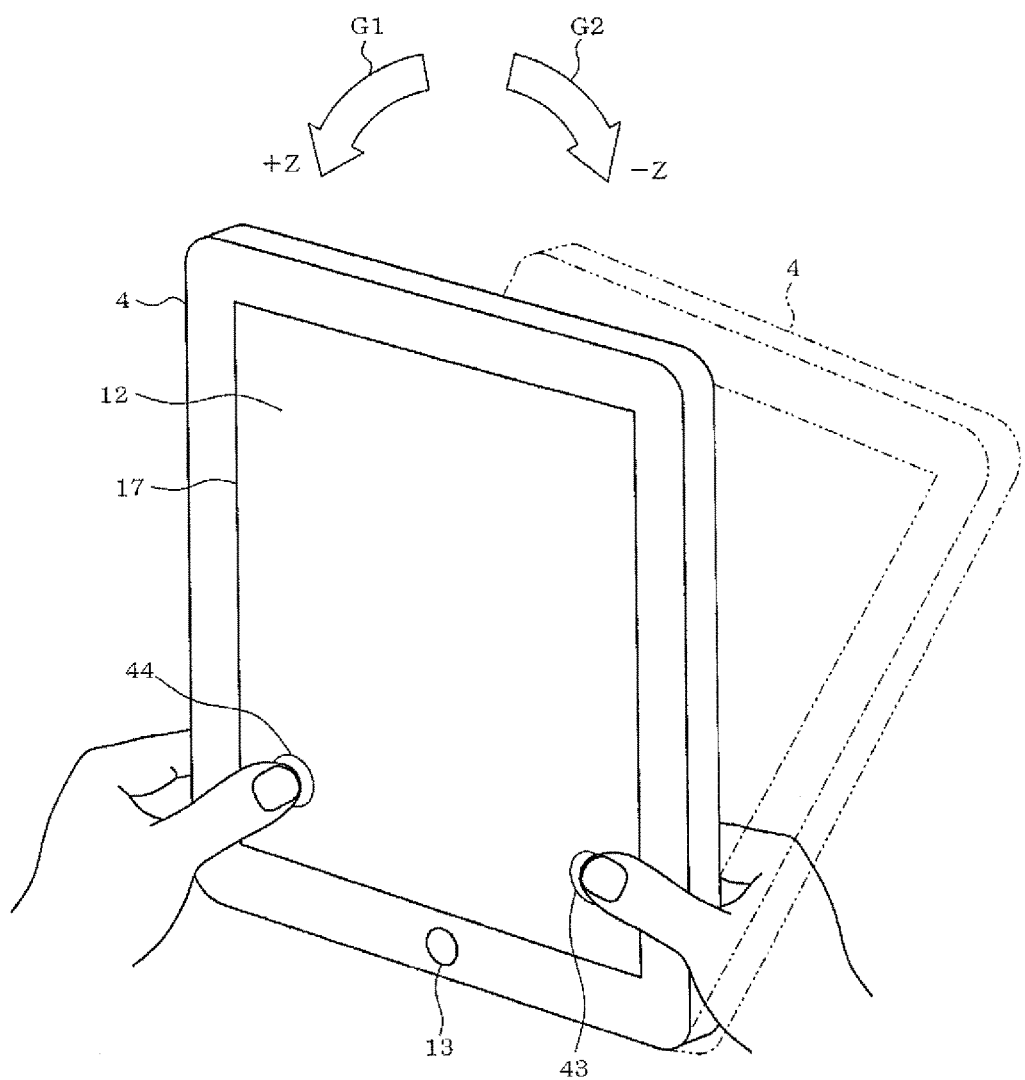
FIG. 38 is a diagram of an example of a tilt operation performed on the teaching pendant according to the fifteenth embodiment.

In addition, as shown in FIG. 37 and FIG. 38, buttons 43 and 44 that can be operated by the user are displayed on the touch panel 17. The buttons 43 and 44 are displayed in positions corresponding to both hands of the user. In this case, the button 43 is displayed in a position easily operable by the thumb of the right hand of the user, such as in the lower right portion of the touch panel 17. In addition, the button 44 is displayed in a position easily operable by the thumb of the left hand of the user, such as in the lower left portion of the touch panel 17. The user tilts the teaching pendant 4 towards the near side (user side) or the far side (the side opposite the user), or in other words, performs a tilt operation on the teaching pendant 4, while touch operating the buttons 43 and 44 with both hands. As a result, the user operates the movement of the robot 2 or 22 in the Z-axis direction.

In this case, as indicated by arrow G1 in FIG. 38, the tilt operation for tilting the teaching pendant 4 towards the near side corresponds to movement of the hand of the robot 2 or 22 in the ascending direction, that is, the direction away from the action reference plane P. In addition, as indicated by arrow G2, the tilt operation for tilting the teaching pendant 4 towards the far side corresponds to movement of the hand of the robot 2 or 22 in the descending direction, that is, the direction approaching the action reference plane P.

The action command generating unit 16 switches between the horizontal movement action command generating process and the vertical movement action command generating process by detecting the operations of the buttons 43 and 44. That is, when both buttons 43 and 44 corresponding to both hands of the user are being operated, the control unit 14 receives tilt operations and does not receive drag operations on the touch panel 17. In other cases, the control unit 14 receives drag operations on the touch panel 17 and does not receive tilt operations. In other words, the control unit 14 starts reception of the input of the tilt operation by touch operation being performed on both buttons 43 and 44. The control unit 14 ends the reception of the input of the tilt operation by both or either one of the buttons 43 and 44 being touch-operated.

In addition, the control unit 14 sets the attitude of the teaching pendant 4 at the time both buttons 43 and 44 are operated as reference for subsequent tilt operations. In this case, the direction of gravitational force, that is, the vertical direction does not necessarily serve as the reference for the tilt operation. In addition, during movement in the Z direction, the action command generating unit 16 may set the tilt amount of the teaching pendant 4 in relation to the reference as the action speed of the robot 2 or 22, or as the movement amount itself. That is, the action command generating unit 16 increases or decreases the movement speed or the movement amount of the robot 2 or 22 based on the tilt amount of the tilt operation detected by the attitude detecting unit 19 (tilt operation detecting unit). In this case, the action command generating unit 16 increases the movement speed or movement amount of the robot 2 or 22 as the tilt amount in relation to the reference increases.

As a result, during action of the hand system, the user can perform an operation for moving the hand of the robot 2 or 22 in the horizontal direction by touch-operating the touch panel 17. Therefore, when moving the hand of the robot 2 or 22 in the horizontal direction, the user can easily recognize the two-dimensional operation on the touch panel 17 and the movement of the hand of the robot 2 or 22 in the horizontal direction, that is, the two-dimensional movement, in association.

In addition, by performing an operation (tilt operation) in which the teaching pendant 4, that is, the touch panel 17 is tilted, the user can perform an operation to move the hand of the robot 2 or 22 in the vertical direction. That is, when moving the hand of the robot 2 or 22 in the vertical direction, the user performs an operation of a mode differing from the touch operation on the touch panel 17, or in other words, performs an operation to tilt the touch panel 17. Therefore, the user can clearly differentiate between the operation for movement in the horizontal direction and the operation for movement in the vertical direction. Consequently, operability improves. As a result, safety can be improved, and time required for teaching the robot 2 or 22 can be shortened.

The action command generating unit 16 increases or decreases the movement speed or the movement amount of the robot 2 or 22 based on the tilt amount of the tilt operation detected by the attitude detecting unit 19 (tilt operation detecting unit). As a result, the user can adjust the movement speed or the movement amount of the robot 2 or 22 by adjusting the tilt amount of the touch panel 17 during the tilt operation. Therefore, the user can intuitively perform the operation for moving the robot 2 or 22 in the vertical direction. As a result, improvement in operability is achieved.

The action command generating unit 16 switches between the horizontal movement action command generating process and the vertical movement action command generating process by detecting the operations of the buttons 43 and 44. As a result, even when the user erroneously tilts the teaching pendant 4 without intending to perform the vertical movement action, for example, there is no risk of the vertical movement action being performed. Therefore, erroneous operations are suppressed and improvement in safety is achieved.

Furthermore, the control unit 14 receives input of the tilt operation as long as both buttons 43 and 44 corresponding to both hands of the user are being operated. Therefore, even should either of the buttons 43 and 44 be erroneously operated, erroneous operation can be prevented. In addition, the buttons 43 and 44 are arranged in positions easily operable by the thumbs of the user. Therefore, operation is easy. In addition, because the buttons 43 and 44 are provided in correspondence with both hands, the effects on differences in operability due to differences in the dominant hand among users can be suppressed.

Sixteenth Embodiment

Next, a sixteenth embodiment will be described with reference to FIG. 39 to FIG. 41. The teaching pendant 4 according to the present embodiment is that in which the drive axis or the action mode of the robot 2 or 22 is determined by the user inputting a character, a number, or a symbol corresponding to the drive axis or the action mode to the touch panel 17. In the description below, a case in which the teaching pendant 4 is handled at an attitude in which the teaching pendant 4 is vertically long, that is, long in the up/down direction will be described. The attitude of the teaching pendant 4 is not limited to vertically long, and may be horizontally long, that is, long in the horizontal direction.

Figure 39:
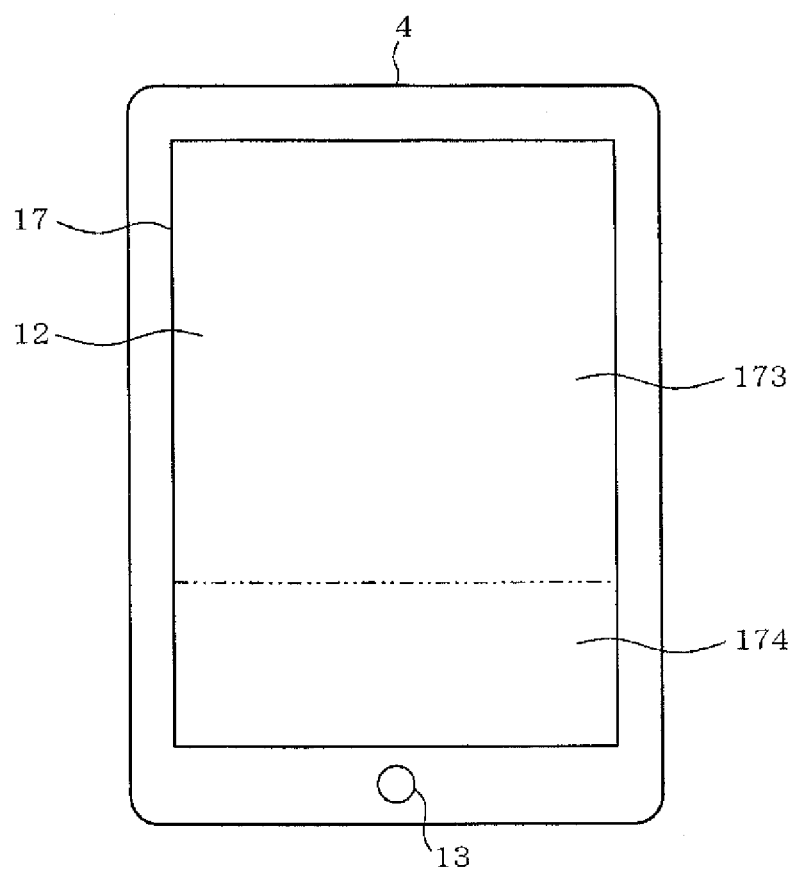
FIG. 39 is a diagram of an example of a teaching pendant according to a sixteenth embodiment, showing a start operation detection area and a movement amount determination area.
Figure 40:
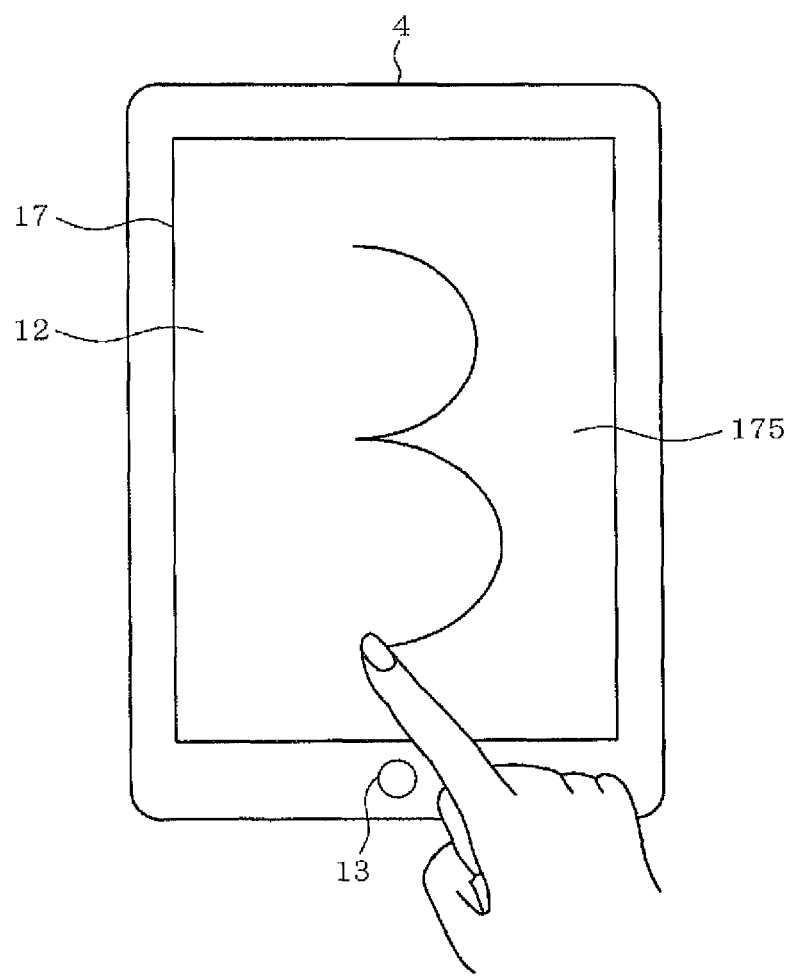
FIG. 40 is a diagram of an example of the teaching pendant according to the sixteenth embodiment, showing an action selection area

As shown in FIG. 39, the touch panel 17 has a start operation detection area 173 and a movement amount determination area 174. In addition, as shown in FIG. 40, the touch panel 17 has an action selection area 175. The start operation detection area 173 is provided in the upper portion of the touch panel 17, for example, and occupies about ⅔ of the total area of the touch panel 17. The start operation detection area 173 is an area in which a touch operation (start operation) for starting reception of an operation in the action selection area 175 is detected. The start operation detection area 173 functions as a start operation detecting unit. The start operation detecting unit may be a button displayed on the touch panel 17 or a physical button differing form the touch panel 17, instead of the start operation detection area 173 that is an area on the touch panel 17.

The movement amount determination area 174 is provided in the lower portion of the touch panel 17 and occupies about ⅓ of the total area of the touch panel 17. The movement amount determination area 174 is an area for receiving an operation (movement amount determination operation) for determining the movement amount of the robot 2 or 22. The movement amount determination operation is, for example, a drag operation in the left/right direction performed within the movement amount determination area 174. In this case, with reference to the state of the robot 2 or 22 before movement, the drag operation in the rightward direction is a positive direction and the drag operation in the leftward direction is a negative direction. The movement speed or the movement amount of the robot 2 or 22 is determined by the movement amount of the drag operation in the movement amount determination operation.

The action command generating unit 16 receives the touch operation in the action selection area 175 after the start operation is detected in the start operation detection area 173. As shown in FIG. 39, the action selection area 175 is provided in the overall area of the touch panel 17. The action selection area 175 is an area for receiving an operation (action selection operation) for selecting the drive axis of the robot 2 or 22 to be operated or the action mode. In the action selection area 175, a number, a character, or a symbol corresponding to the drive axis of the robot 2 or 22 to be operated or the action mode is inputted.

A specific example of the action selection operation is, for example, the following operation. Regarding the action of an axis system, for example, when the first axis J11 or J21 is to be operated, the action selection operation is the input of the Arabic numeral "1" corresponding to the first axis J11 or J21. When the second axis J12 or J22 is to be operated, the action selection operation is the input of the Arabic numeral "2" corresponding to the first axis J12 or J22. In addition, regarding the action of the hand system, for example, when the robot 2 or 22 is made to perform the horizontal movement action, the action selection operation is the Input of the alphabet "H" corresponding to the horizontal movement action. When the robot 2 or 22 is made to perform the vertical movement action, the action selection operation is the input of the alphabet "V" corresponding to the vertical movement action. When the robot 2 or 22 is made to perform the rotation action, the action selection operation is the input of the alphabet "R" corresponding to the rotation action. Here, "H" is the first letter of "Horizontal", "V" is the first letter of "Vertical", and "R" is the first letter of "Rotational".

Figure 41:
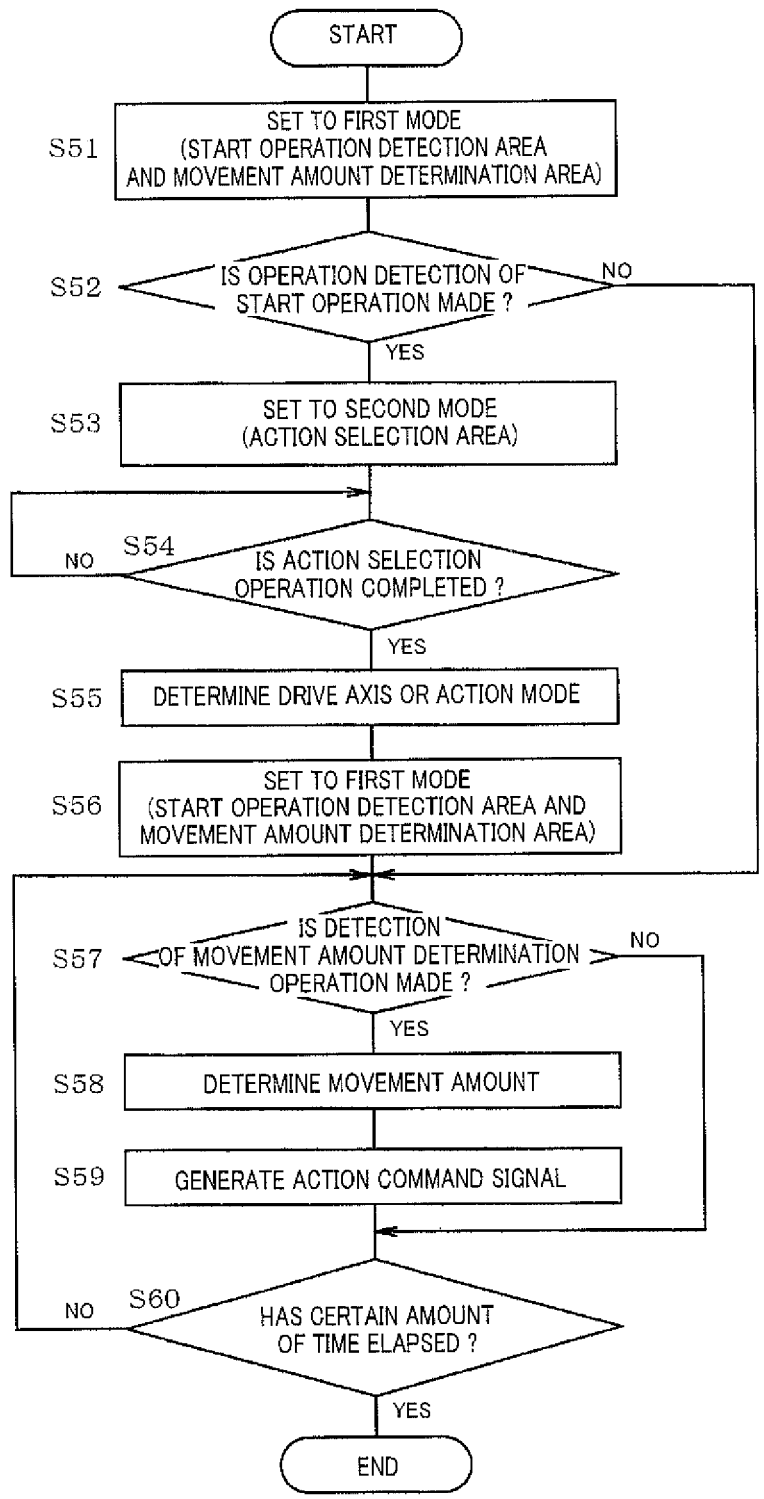
FIG. 41 is a flowchart of an example of the details of various processes performed by a control unit according to the sixteenth embodiment.

To actualize the above-described configuration, the control unit 14 performs control of the content in FIG. 41. In the description below, the processes performed by the control unit 14 include processes performed by the touch operation detecting unit 15 and the action command generating unit 16. Upon starting the control shown in FIG. 41, first, at step S51, the control unit 14 sets the touch panel 17 to first mode. As shown in FIG. 39, in the first mode, the area of the touch panel 17 is set to the start operation detection area 173 and the movement amount determination area 174. Therefore, in the first mode, the touch panel 17 receives an operation (start operation) performed in the start operation detection area 173 and an operation performed in the movement amount determination area 174, but does not receive an operation (action selection operation) performed in the action selection area 175.

Next, at step S52, the control unit 14 determines whether or not a detection of the start operation in the start operation detection area 173 is made. When determined that a detection of the start operation is not made (NO at step S52), the control unit 14 proceeds to step S57. Meanwhile, when determined that a detection of the start operation is made (YES at step S52), the control unit 14 proceeds to step S53. According to the present embodiment, the start operation and the action selection operation are a continuous series of operations. That is, of the series of operations related to the action selection operation, the operation in which initial contact with the touch panel 17 is made is the start operation.

At step S53, the control unit 14 sets the touch panel 17 to second mode. As shown in FIG. 40, in the second mode, the overall area of the touch panel 17 is set to the action selection area 175. Therefore, in the second mode, the touch panel 17 receives an operation (action selection operation) performed in the action selection area 175, but does not receive an operation (start operation) performed in the start operation detection area 173 or an operation (movement amount determination operation) performed in the movement amount determination area 174. That is, when the operation (action selection operation) in the action selection area 175 is detected, the control unit 14 disables detection of an operation in the movement amount determination area 174 during the period until the action selection operation is completed.

Next, at step S54, the control unit 14 determines whether or not the action selection operation is completed. The determination regarding whether or not the action selection operation is completed is made, for example, in the following manner. That is, when a touch operation is performed in the action selection area 175 and a touch operation is not performed for a predetermined amount of time after the finger of the user related to the touch operation has separated from the touch panel 17, the control unit 14 determines that the action selection operation is completed (YES at step S54). Meanwhile, when a touch operation is performed in the action selection area 175 and, even after the finger of the user related to the touch operation has separated from the touch panel 17, a touch operation is further performed in the action selection area 175 within the predetermined amount of time, the control unit 14 determines that the action selection operation is being continued (NO at step S54). As a result, the control unit 14 can determine even an operation input that cannot be inputted by a single stroke, such as the character When determined that the action selection operation is completed (YES at step S54), the control unit 14 determines the drive axis or the action mode of the robot 2 or 22 based on the inputted action selection operation (step S55). Then, at step S56, the control unit 14 sets the touch panel 17 to the first mode. As a result, as shown in FIG. 39, the area of the touch panel 17 is set again to the start operation detection area 173 and the movement amount determination area 174.

Next, at step S57, the control unit 14 determines whether or not a detection of a drag operation (movement amount determination operation) in the movement amount determination area 174 is made. When determined that a detection of a drag operation (movement amount determination operation) in the movement amount determination area 174 is made, the control unit 14 proceeds to step S58. The control unit 14 then determines the movement amount of the robot 2 or 22 by the drive axis or in the action mode determined at step S55, based on the movement amount of the drag operation (movement amount detection operation) detected at step S57.

Subsequently, at step S59, the control unit 14 generates an action command for moving the robot 2 or 222 by the movement amount determined at step S58. Then, the action command is transmitted to the controller 3. The controller 3 controls the action of the robot 2 or 22 based on the action command. Thereafter, the control unit 14 proceeds to step S60. Meanwhile, when determined, at step S57, that a detection of a drag operation in the movement amount determination area 174 is not made, the control unit 14 proceeds to step S60.

After detecting the movement amount determination operation at step S57 or after setting the first mode at step S51 or S56, at step S60, the control unit 14 determines whether or not a certain amount of time has elapsed. When determined that the certain amount of time has not elapsed (NO at step S60), the control unit 14 proceeds to step S57 and continues detection of the movement amount determination operation. Meanwhile, when determined that the certain amount of time has elapsed (YES at step S60), the control unit 14 completes the series of processes.

In the teaching pendant 4 such as this, when selecting the action of the robot 2 or 22, the user performs a touch operation (action selection operation) in the action selection area 175. When determining the movement amount of the robot 2 or 22, the user performs a touch operation (movement amount determination operation) in the movement amount determination area 174. Therefore, the user can clearly differentiate between the operation for selecting the action of the robot 2 or 22 (action selection operation) and the operation for determining the movement amount of the robot 2 or 22 (movement amount determination operation). As a result, improvement in the operability of the teaching pendant 4 is achieved. As a result, improvement in safety is achieved, and the time required for teaching can be shortened.

The control unit 14 does not receive the touch operation (action selection operation) in the action selection area 175 until after the touch operation (start operation) in the start operation detection area 173 is detected. That is, the user can perform the operation (action selection operation) in the action selection area 175 by intentionally performing the start operation. As a result, unintentional operation input in the action selection area 175 is reduced. Therefore, an unintentional action being performed by erroneous operation can be suppressed. As a result, safety is further improved.

The action selection operation is an operation in which a number, a character, or a symbol corresponding to a drive axis or an action mode is inputted to the touch panel 17. As a result, by inputting a number, a character, or a symbol to the touch panel 17, the user can perform the operation for the drive axis or action mode corresponding to the input. Therefore, the user can easily recognize the operation input (action selection operation) for determining the action of the robot 2 or 22 and the action of the robot 2 or 22 performed by the operation input in association. Consequently, an erroneous operation, that is, the user selecting an erroneous action is suppressed, and improvement in operability is achieved. As a result, improvement in safety is achieved and the time required for teaching can be reduced.

When an operation (movement amount determination operation) in the movement amount determination area 174 is not made for a certain amount of time after the input of the action selection operation or after the input of the movement amount determination operation, the control unit 14 ends the process. That is, when a certain amount of time elapses from after the action selection operation or the movement amount determination operation is performed, input of the action selection operation is required again. As a result, even when time passes from the previous operation and the user forgets which drive axis or action mode is currently selected, the user can recognize the selection of the drive axis or action mode by being made to input the action selection operation again. As a result, mistaken selection of the drive axis or the action mode can be prevented. The drive axis or the action mode that is currently selected may be displayed in the display unit 12 of the touch panel 17.

Seventeenth Embodiment

Next, a seventeenth embodiment will be described with reference to FIG. 42 and FIG. 43. The present invention relates to determination of the movement speed and the movement amount of the robot 2 or 22 when a drag operation is performed as the so-called gesture operation.

According to the present embodiment, the action command generating unit 16 is able to perform an operation determining process, a speed calculating process, and an action command generating process. The operation determining process is a process for determining the movement amount of a finger by a drag operation when the touch operation detected by the touch operation detecting unit 15 is the drag operation. The speed calculating process is a process for calculating the movement speed of the robot 2 or 22 based on the movement amount of the finger determined in the operation determining process. The action command generating process is a process for generating an action command for moving the robot 2 or 22 at the movement speed calculated in the speed calculating process.

The action command generating unit 16 can perform a movement amount calculating process for calculating the movement distance of the robot 2 or 22 based on the movement amount of the finger in the drag operation. For example, in FIG. 42, a start point of a drag operation is indicated by point Sp. An end point of the drag operation is indicated by point Ep. The end of the drag operation is when the finger of the user separates from the touch panel 17. In this case, the movement amount of the finger in the drag operation is a distance L from the start point Sp to the end point Ep. The control unit 14 calculates a movement distance Lr of the robot 2 or 22 based on the movement distance L of the drag operation. In addition, the control unit 14 calculates an average speed Vr of the robot 2 or 22 based on a value obtained by dividing the movement distance L by an input time of the drag operation, that is, the average speed V related to the movement of the finger in the drag operation.

Figure 42:
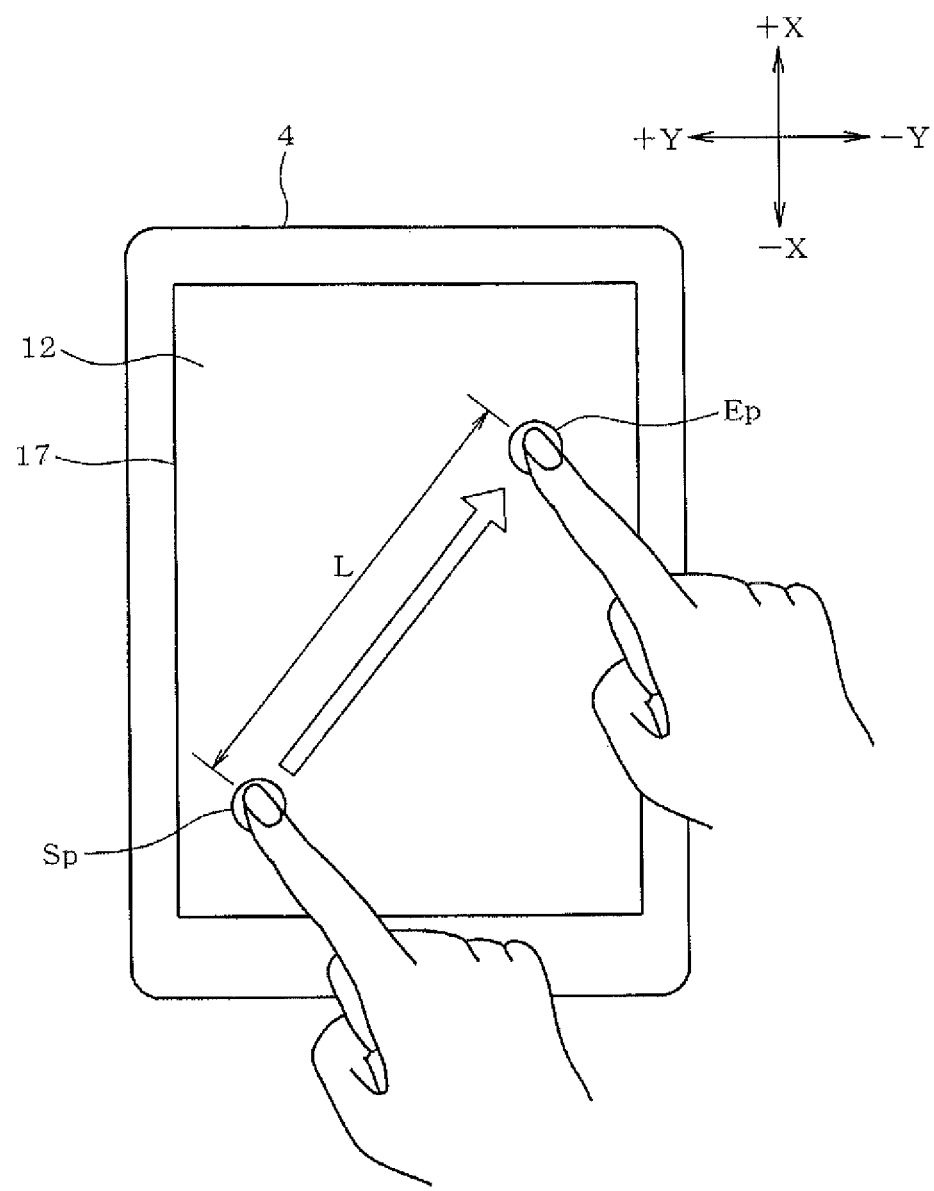
FIG. 42 is a diagram of an example of a drag operation inputted to a touch panel according to a seventeenth embodiment.
Figure 43:
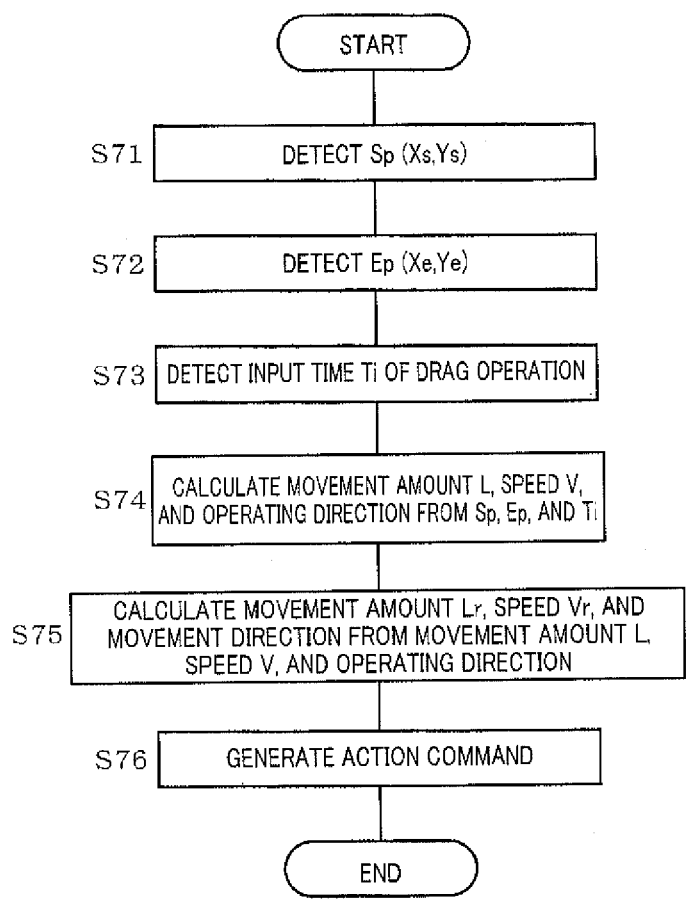
FIG. 43 is a flowchart of an example of the details of various processes performed by a control unit according to the seventeenth embodiment.

To actualize the above-described configuration, the control unit 14 performs control of the content in FIG. 43. In the description below, the processes performed by the control unit 14 include processes performed by the touch operation detecting unit 15 and the action command generating unit 16. In addition, the X-Y coordinate system on the touch panel 17 shown in FIG. 42 is not necessarily required to match the coordinate system of the robot 2 or 22.

Upon detecting a drag operation and starting control shown in FIG. 43, at steps S71 and S72, the control unit 14 detects the start point Sp (Xs,Ys) and the end point Ep (Xe,Ye) of the drag operation. Next, at step S73, the control unit 14 detects the time required for the drag operation, that is, the input time Ti of the drag operation. Next, at step S74, the control unit 14 calculates the movement amount L of the finger in the drag operation, the average speed V of the finger in the drag operation, and the operating direction of the drag operation, from the start point Sp (Xs,Ys) and the end point Ep (Xe,Ye). Step S74 includes the operation determining process.

Subsequently, at step S75, the control unit 14 calculates the movement amount Lr, the average speed VG and the movement direction of the robot 2 or 22 from the movement amount L, the average speed V, and the operating direction of the drag operation calculated at step S74. Step S75 includes the speed calculating process. Then, at step S76, the control unit 14 generates an action command based on the movement amount Lr, the average speed Vr, and the movement direction (action command generating process). The action command is then transmitted to the controller 3. The controller 3 controls the action of the robot 2 or 22 based on the action command. As a result, the control unit 14 completes the series of processes.

According to the present embodiment, the control unit 14 can perform the speed calculating process for calculating the movement speed Vr of the robot 2 or 22 based on the movement amount L of the finger in the drag operation. As a result, a correlation is present between the movement amount L of the finger in the drag operation by the user and the movement speed Vr of the robot 2 or 22. Therefore, the user can adjust the movement speed Vr of the robot by adjusting the movement amount L of the finger in the drag operation. Consequently, the user can perform an intuitive operation, and improvement in operability is achieved. As a result, improvement in safety is achieved, and the time required for teaching can be reduced.

In addition, the control unit 14 can perform the movement amount calculating process for calculating the movement distance Lr of the robot 2 or 22 based on the movement amount L of the finger in the drag operation. As a result, the user the user can adjust the movement amount Lr, that is, the movement distance Lr of the robot 2 or 22 by adjusting the movement amount L of the finger in the drag operation. Furthermore, the speed calculating process is a process for determining the movement speed Vr of the robot 2 or 22 based on a value obtained by dividing the movement amount L of the finger in the drag operation by the amount of time required for input of the drag operation. As a result, the user can adjust the movement speed Vr of the robot 2 or 22 by adjusting the amount of time required for input of the drag operation.

Therefore, during input of the drag operation, the user can adjust both the movement speed Vr and the movement amount Lr of the robot 2 or 22 by adjusting the movement amount L and the input time Ti of the drag operation. That is, the user can adjust both the movement speed Vr and the movement amount Lr of the robot 2 or 22 by a single drag operation. As a result, the user can perform an intuitive operation. In addition, as a result, the user is not required to perform a plurality of operations, such as an operation for determining the movement speed Vr of the robot 2 or 22 and an operation for determining the movement amount L of the robot 2 or 22, to determine the movement speed Vr and the movement amount Lr of the robot 2 or 22. Therefore, the operation is simplified and improvement in operability is achieved. As a result, improvement in safety is achieved, and the amount of time required for teaching can be reduced.

The start point Sp and the end point Ep indicated by circles on the display unit 12 and the white arrow in FIG. 42 are shown for convenience in describing the movement of the drag operation, and are not actually displayed on the display unit 12 during operation. However, the teaching pendant 4 may display the start point Sp, the end point Ep, and the white arrow on the display unit 12 in accompaniment with the drag operation. As a result, the display is useful when the user confirms the operation content by the user themselves.

Eighteenth Embodiment

Next, an eighteenth embodiment will be described with reference to FIG. 44 and also FIG. 45. The present embodiment is a configuration for performing the action of the robot 2 or 22 in substantially real-time, in relation to an operation input. That is, according to the above-described seventeenth embodiment, the action of the robot 2 or 22 is performed after the input of the drag operation is completed. Therefore, the action of the robot 2 or 22 is performed after the completion of the drag operation. Consequently, a time lag occurs between the input of the drag operation by the user and the actual action of the robot 2 or 22. Meanwhile, according to the present embodiment, the action command for the robot 2 or 22 is generated as appropriate, even before the completion of the drag operation. Therefore, the actual action of the robot 2 or 22 is performed in substantially real-time in relation to the input of the drag operation by the user.

Specifically, the control unit 14 performs an operation determining process, a speed calculating process, and an action command generating process at a certain interval S while a drag operation is being performed. While a drag operation is being performed refers to a period from when the finger of the user touches the touch panel 17 and the drag operation is started until the finger of the user separates from the touch panel 17. In this case, as shown in FIG. 44, the period over which input is performed of a drag operation of a distance L between the start point Sp and the end point Ep of the drag operation is the period over which the drag operation is being performed.

Figure 44:
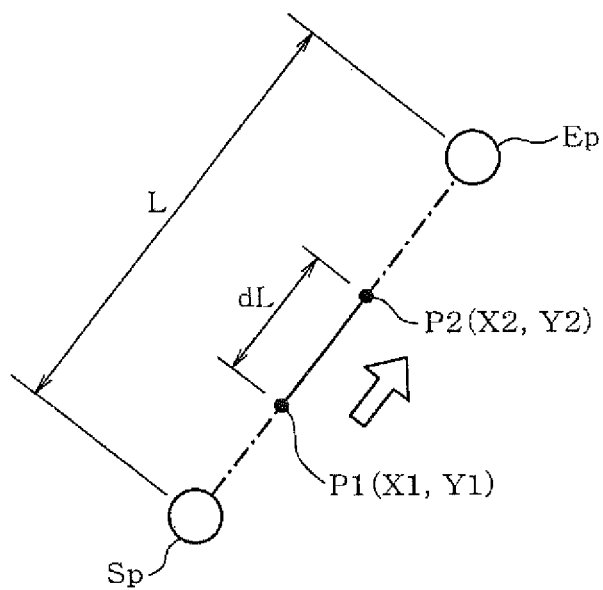
FIG. 44 is a diagram of the movement of a finger over a certain period during a drag operation inputted to a touch panel according to an eighteenth embodiment.
Figure 45:
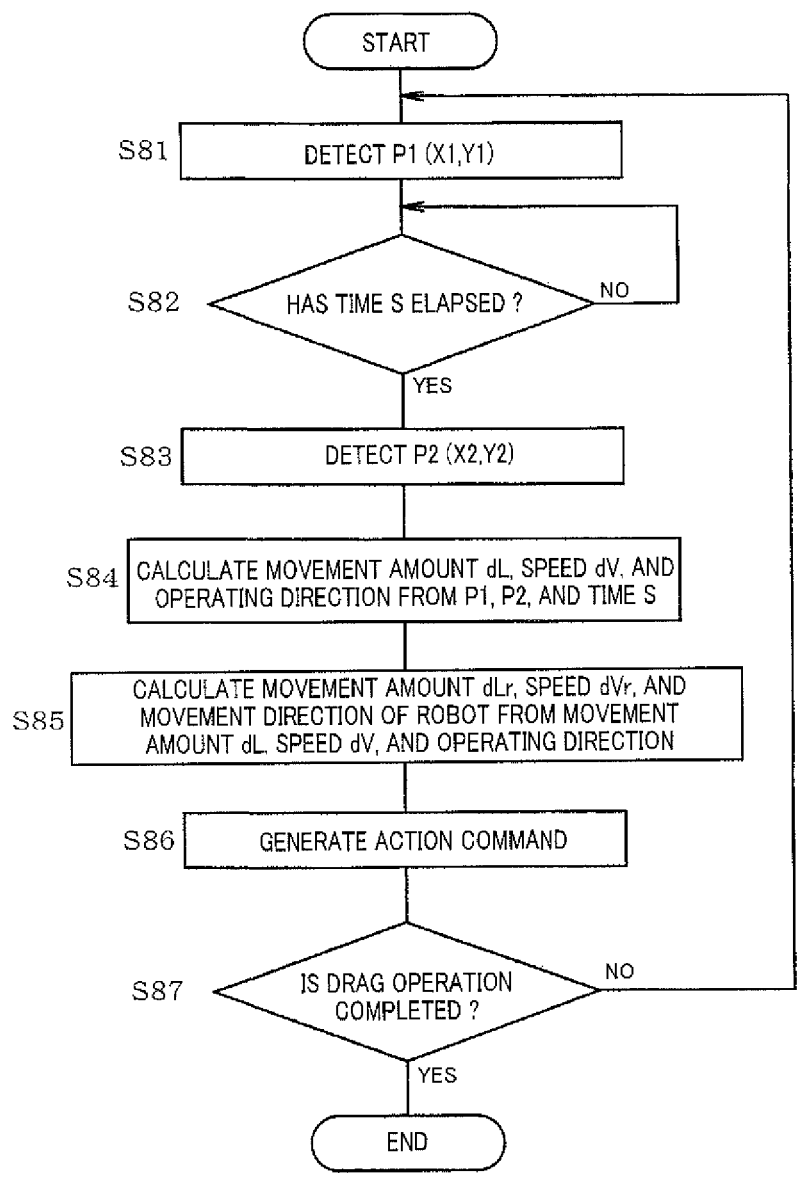
FIG. 45 is a flowchart of an example of the details of various processes performed by a control unit according to the eighteenth embodiment.

To actualize the above-described configuration, the control unit 14 performs control of the content in FIG. 44. In the description below, the processes performed by the control unit 14 include processes performed by the touch operation detecting unit 15 and the action command generating unit 16. The control unit 14 performs the processing content shown in FIG. 45 while detecting the input of a drag operation. Upon starting the control shown in FIG. 45, at step S81, the control unit 14 detects a current point P1 (X1,Y1) of the finger in the drag operation. Next, at step S82, the control unit 14 waits for the elapse of a certain amount of time S (NO at S82). When determined that the amount of time S has elapsed (YES at S82), at step S83, the control unit 14 detects a current point P2 (X2,Y2) of the finger in the drag operation.

Next, at step S84, the control unit 14 calculates the operating direction of the drag operation, as well as the movement amount dL and the movement speed dV of the drag operation per certain amount of time 5, from the points P1 and P2, and the amount of time 5. Step S84 includes the operation determining process. Next, at step S85, the control unit 14 calculates the movement direction of the robot 2 or 22, as well as the movement amount dLr and the movement speed dVr per certain amount of time 5, from the movement amount dL, the movement speed dV, and the operating direction of the drag operation calculated at step S84. Step S84 includes the speed calculating process.

Next, at step S86, the control unit 14 generates an action command based on the movement amount dLr, the average speed dVr and the movement direction per certain amount of time S (action command generating process). Then, the action command is transmitted to the controller 3. The controller 3 controls the action of the robot 2 or 22 based on the action command. Subsequently, at step S87, the control unit 14 determines whether or not input of the drag operation is completed. When determined that the input of the drag operation is not completed (NO at step S81), the control unit 14 proceeds to step S81 and repeats step S81 to step S87. Meanwhile, when determined that the input of the drag operation is completed (YES at step S81), the control unit 14 ends the series of processes. In this way, the control unit 14 repeats the operation determining process, the speed calculating process, and the action command generating process during the certain amount of time S, that is, the certain cycle S while the drag operation is being performed.

According to the present embodiment, the control unit 14 can generate the action command without waiting for the user to complete the drag operation. Therefore, the action command generating unit 16 can generate the action command for operating the robot 2 or 22 in substantially real-time in relation to the drag operation by the user. Consequently, the time lag between the input of the drag operation by the user and the actual action of the robot 2 or 22 can be minimized. Therefore, the user can perform a more intuitive operation. As a result, improvement in safety and shortening of teaching time can be achieved.

Nineteenth Embodiment

Figure 46:
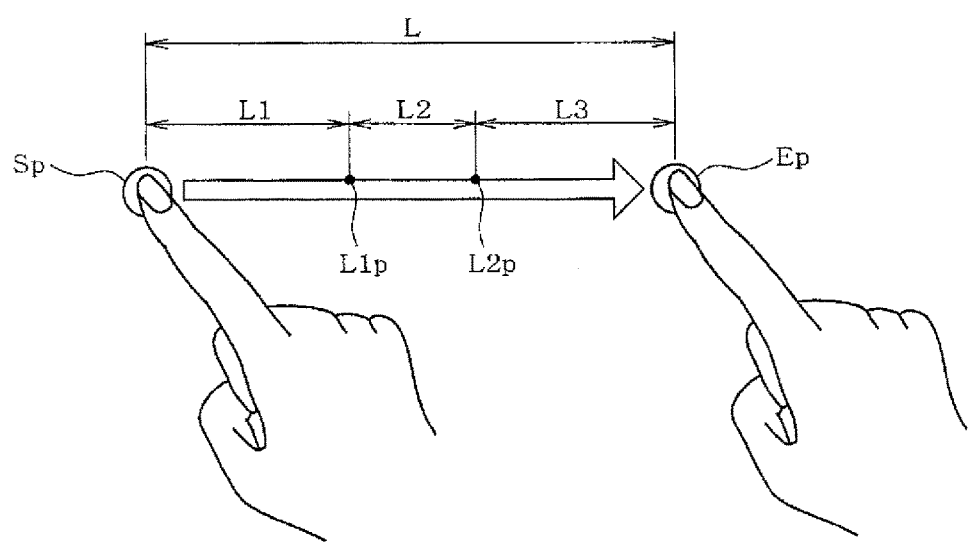
FIG. 46 is a diagram of the movement amount of a finger in a drag operation inputted to the touch panel according to the eighteenth embodiment.

Next, a nineteenth embodiment will be described with reference to FIG. 46 to FIG. 48. The present embodiment is related to a scaling factor between the operating amount of a drag operation and the movement amount of the robot 2 or 22, when a drag operation is performed as the so-called gesture operation. In FIG. 46, an operating amount of the drag operation from the start point Sp to the end point Ep of the drag operation is L.

To enable the robot 2 or 22 to perform precise action amounting to the operating amount of the inputted drag operation or more, the teaching pendant 4 can consider setting a scaling factor between the operating amount of the drag operation and the movement amount of the robot 2 or 22. For example, when the scaling factor is set to 0.1 times, the user can move the robot 2 or 22 by 0.1 mm by performing a drag operation of 1 mm. However, the following problem occurs when the fixed scaling factor is merely set. That is, for example, there are cases in which a large action in several to several tens of millimeter units (coarse action) is to be performed while performing fine action (fine action) in 0.1 mm units. However, when the scaling factor is set to 0.1 times, for example, the robot can only be moved slightly, by 20 mm, even by a drag operation of 200 mm (corresponding to the length of a long side of a 10 inch screen). Therefore, when attempting to move the robot by 1000 mm, for example, the user has to repeat the drag operation of 200 mm, 50 times. The operation is cumbersome and operability is poor.

Therefore, according to the present embodiment, the action command generating unit 16 can perform an operation determining process and a movement amount determining process. The operation detecting process determines the movement amount of the finger of a drag operation detected by the touch operation detecting unit 15. As shown in FIG. 46, the movement amount determining process determines the movement amount of the robot 2 or 22 by setting the scaling factor to a first scaling factor from the operation start point Sp until a first segment L1 is passed, and setting the scaling factor to a value greater than the first scaling factor after the first segment L1 is passed. The scaling factor is used to determine the movement amount of the robot 2 or 22 by enlarging or reducing the movement amount of the finger in the drag operation determined in the operation determining process.

In addition, according to the present embodiment, the movement amount determining process determines the movement amount of the robot by setting the scaling factor to a second scaling factor after the movement of the finger in the drag operation passes the first segment L1 and until a second segment L1 is passed, and setting the scaling factor to a third scaling factor that is a fixed value after the movement of the finger in the drag operation passes the second segment L2. The second scaling factor is a value within a range from the first scaling factor to the third scaling factor and continuously increases based on the movement amount of the finger in the drag operation.

Specifically, as shown in FIG. 46, the first segment L1 is a segment of a predetermined length (such as 50 mm) from the start point Sp of the drag operation. That is, in this case, as shown in FIG. 47, the first segment L1 is a segment from an operating amount 0 mm (start point Sp) to an operating amount 50 mm (end point Lip of the first segment L1). The length of the first segment L1 is fixed regardless of the operating amount L of the drag operation. The first scaling factor f1 is set for the drag operation within the first segment L1. The first scaling factor f1 is a fixed value that is less than 1. For example, as shown in FIG. 47(1), the first scaling factor ft is 0.1 times (f1=0.1).

The second segment L2 is a segment of a predetermined length (such as 100 mm) from the end point Lip of the first segment L1. That is, in this case, as shown in FIG. 47, the second segment L2 is a segment from the operating amount 50 mm (the end point Lip of the first segment L1) to an operating amount 150 mm (end point L2p of the second segment L2). The length of the second segment L2 is fixed regardless of the operating amount L of the drag operation. The second scaling factor f2 is set for the drag operation within the second segment L2. The second scaling factor f2 is a value that is greater than the first scaling factor f1 and less than the third scaling factor f3. That is, the second scaling factor f1 is a variable value within a range from the first scaling factor f1 to the third scaling factor f3 and continuously increases based on the movement amount of the finger in the drag operation, that is, the distance L from the start point Sp.

The second scaling factor f2 can be expressed by a following (expression 1). According to the present embodiment, the second scaling factor f2 proportionally increases within the range from the first scaling factor f1 to the third scaling factor f3. However, this is not limited thereto. For example, the second scaling factor f2 may be increased quadratically, or increased exponentially, within the range from the first scaling factor f1 to the third scaling factor f3.

$$f2=0.099\times(L-50)+0.1 \quad \text{(expression 1)}$$

The third segment is the segment after the end point L2p of the second segment L2. That is, in this case, the third segment L3 is the segment after the operating amount 150 mm (the end point L2p of the second segment L2). The length of the third segment L3 varies depending on the operating amount L of the drag operation. That is, the length of the third segment L2 is a value obtained by the lengths of the first segment L1 and the second segment L2 being subtracted from the operating amount L of the drag operation. The third scaling factor f3 is set for the drag operation in the third segment L3. The third scaling factor f3 is a fixed value that is greater than the first scaling factor and the second scaling factor. In this case, as shown in FIG. 47(1) for example, the third scaling factor f3 is set to 10 times (f3=10), which is greater than 1.

Regarding the drag operation in the first segment L1, the action command generating unit 16 sets a value obtained by multiplying the operating amount L thereof by the first scaling factor f1, as the moving amount of the robot 2 or 22. In addition, regarding the drag operation in the second segment L2, the action command generating unit 16 sets a value obtained by multiplying the operating amount L thereof by the second scaling factor f2, as the moving amount of the robot 2 or 22. Furthermore, regarding the drag operation in the third segment L3, the action command generating unit 16 sets a value obtained by multiplying the operating amount L thereof by the third scaling factor f3, as the moving amount of the robot 2 or 22. When the robot 2 or 22 is to perform a fine action (fine action) in 0.1 mm units, for example, the user repeats the drag operation within the first segment L1. Meanwhile, when the robot 2 or 22 is to perform a large action (coarse action), for example, the user performs the drag operation beyond the first segment L1 and the second segment L2, up to the third segment L3.

The variations in the movement amount of the robot 2 or 22 in relation to the operating amount L of the drag operation are as shown in FIG. 47(2). For example, when the movement amount L of the drag operation is 200 mm, the movement amount of the robot 2 or 22 in relation to the operation in the first segment L1 is 0.1×50=5 mm. In addition, the movement amount of the robot 2 or 22 in relation to the operation in the second segment L2 is ((10−0.1)×100/2)+(0.1×100)=505 mm. Furthermore, the movement amount of the robot 2 or 22 in relation to the operation in the third segment L3 is 10×50=500 mm. In other words, the movement amount of the robot 2 or 22 for all segments, that is, the first segment L1, the second segment L2, and the third segment L3 is 1010 mm. Therefore, the user can move the robot 2 or 22 by 1010 mm by a drag operation of 200 mm.

In this case, the movement amount of the robot 2 or 22 varies as follows in each segment. That is, the movement amount of the robot 2 or 22 increases linearly in relation to the operation in the first segment L1 (the segment from operating amount 0 mm to 50 mm). In addition, the movement amount of the robot 2 or 22 increases quadratically in relation to the operation in the second segment L2 (the segment from operating amount 50 mm to 150 mm). Furthermore, the movement amount of the robot 2 or 22 increases linearly in relation to the operation in the third segment L3 (the segment from operating amount 150 mm onwards).

As a result, the user can move the robot 2 or 22 at the first scaling factor f1 that is a fixed scaling factor less than 1, by performing the drag operation in the first segment L1. That is, the user can make the robot 2 or 22 perform fine action by repeatedly performing the drag operation in the first segment L1. In addition, by performing the drag operation beyond the first segment L1, the user can move the robot 2 or 22 at a scaling factor greater than the first scaling factor for the portion beyond the first segment L1. That is, the user can make the robot 2 or 22 perform coarse action by performing an operation beyond the first segment L1.

In this way, the user can move the robot 2 or 22 at differing scaling factors in a single drag operation. As a result, for example, both actions, that is, fine action and coarse action of the robot 2 or 22 can be actualized by a single drag operation. Therefore, the user can actualize both the fine action and the coarse action without performing a special operation for switching between the fine action and the coarse action of the robot 2 or 22. Consequently, the operation is simplified, and improvement in operability is achieved. As a result, improvement in safety is achieved, and time required for teaching can be reduced.

In addition, according to the present embodiment, the movement amount determining process determines the movement amount of the robot 2 or 22 by setting the scaling factor to the second scaling factor f2 after the movement of the finger in the drag operation passes the first segment L1 and until a second segment L1 is passed, and setting the scaling factor to the third scaling factor f3 that is a fixed value after the movement of the finger in the drag operation passes the second segment L2. As a result, the user can make the robot perform a fine action at the first scaling factor f1 that is less than 1 by repeatedly performing the drag operation in the first segment L1. In addition, by performing the drag operation beyond the first segment L1, the user can make the robot 2 or 22 perform a coarse action at the second scaling factor f2 or the third scaling factor f3 that are greater than the first scaling factor f1.

Furthermore, the second scaling factor f2 is a value within a range from the first scaling factor f1 to the third scaling factor f3 and continuously increases based on the movement amount L of the finger in the drag operation. As a result, the second scaling factor f2 that is between the fine action at the first scaling factor f1 and the coarse action at the third scaling factor f3 continuously increases based on the movement amount L of the finger in the drag operation, within the range from the first scaling factor f1 to the third scaling factor f3. That is, the first scaling factor f1 and the third scaling factor f3, which are fixed values, are connected by the second scaling factor f2 that continuously changes. Therefore, the scaling factor for determining the movement amount of the robot 2 or 22 in relation to the operating amount L of the drag operation by the user switches from the first scaling factor f1 to the third scaling factor f3, through the second scaling factor f2. As a result, the scaling factor for determining the movement amount of the robot 2 or 22 suddenly switching from the first scaling factor f1 to the third scaling factor f3 can be prevented. That is, the action of the robot 2 or 22 suddenly changing from fine action to coarse action can be prevented. Therefore, sudden changes in speed (sudden action) of the robot 2 or 22 that occur as a result of sudden change in scaling factor that is unintended by the user can be prevented. As a result, further improvement in safety can be achieved.

As shown in FIGS. 48(1) and (2), the first scaling factor f1 may be 0.01 times, the third scaling factor f3 may be 1.0 times, and the second scaling factor f2 may be a value expressed by a following (expression 2), within the range from the first scaling factor f1=0.01 to the third scaling factor f3=1.0. As a result, the scaling factors of 0.01 times and 0.1 times may be used in combination. Further intricate actions can be easily performed.

$$f2=0.0099\times(L-50)+0.01 \qquad \text{(expression 2)}$$

(Comparison with Conventional Teaching Methods)

Figure 49:
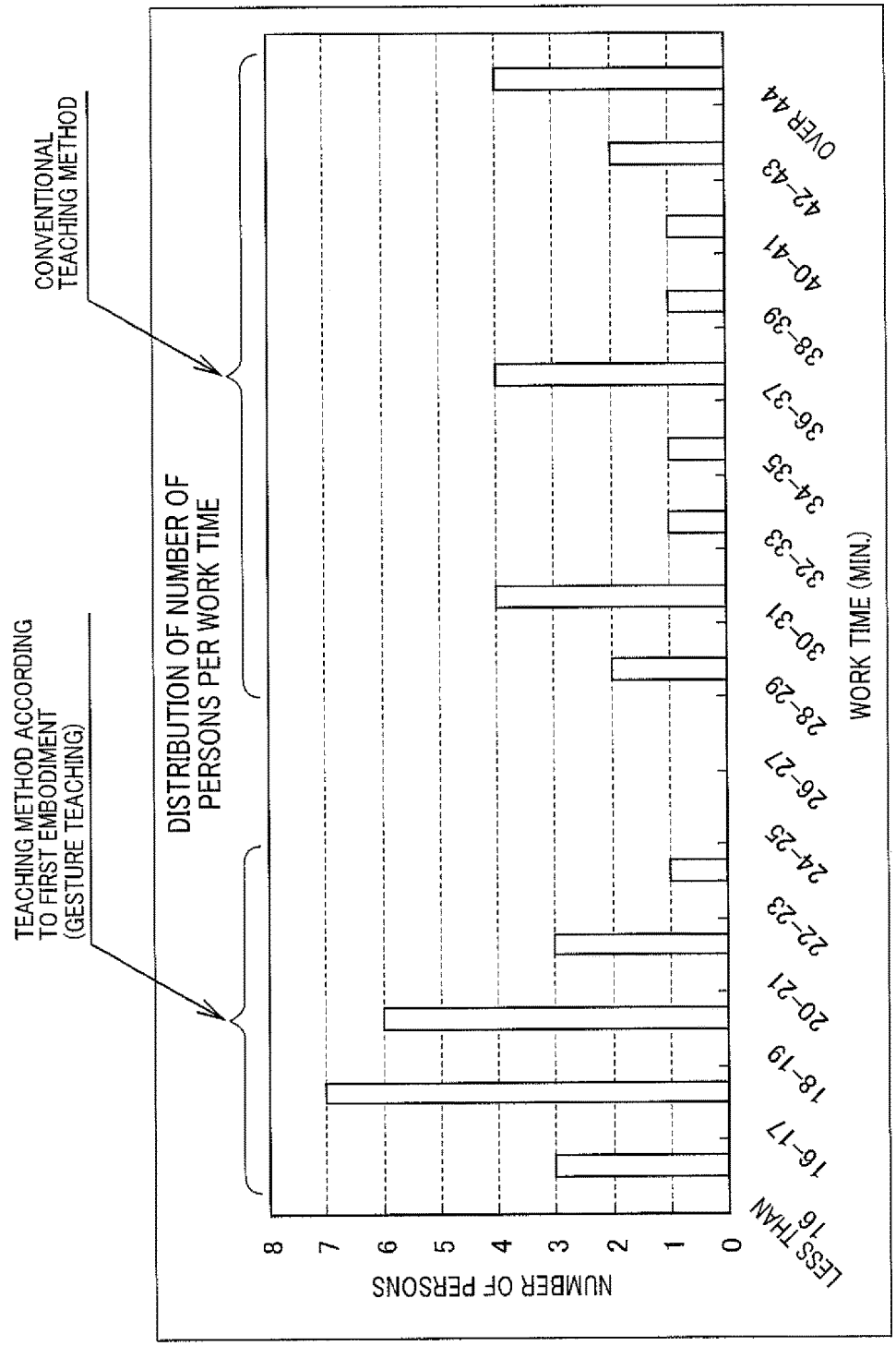
FIG. 49 is a graph of a comparison of measured time required for teaching between a conventional teaching method and a teaching method of the present invention, performed to confirm the effects of the present invention.

In FIG. 49, a diagram is given in which one of the many advantages of the teaching method (gesture teaching method) of the present invention in which a drag operation is performed on a touch panel, that is, shortening of time required for teaching is verified. The diagram shows a comparison of the advantage of a shortened amount of required time between the teaching method (gesture teaching) of the present application and a conventional teaching method using a touch panel. The amount of time required to move the hand of the same robot from a certain position to another position is indicated on the horizontal axis. The number of people (evaluators) participating in the evaluation is indicated on the vertical axis. As the evaluators, the comparison was conducted with a total of 20 evaluators, with beginner-level persons (beginners), intermediate-level persons, and expert-level persons (veterans) participating at a ratio of about ⅓ each. Each evaluator performed teaching of the same task twice, by the conventional teaching method, and by the teaching method according to the first embodiment as a representative method of the present invention.

As a result, as can be clearly seen from FIG. 49, in the case of the teaching method according to the first embodiment, first, the teaching time was significantly shortened compared to the conventional method. Furthermore, in the case of the conventional teaching method, the dispersion in teaching time is significant. That is, the differences in the level of skill between the beginners and the veterans are significantly dependent on the length of the teaching time. Conversely, in the case of the teaching method according to the present embodiment, the difference between whether a person is a beginner or a veteran is not as great in terms of the teaching time, compared to the conventional method. That is, the teaching method according to the first embodiment is not much affected by the differences in the level of skill in teaching, meaning that a beginner can also easily perform teaching. This advantage is intrinsic to the present invention, and is a general tendency that also applies to the teaching method (gesture teaching method) according to the other embodiments. As a result, it has been substantiated that simplification and shortening of time of manual operation (teaching) of a robot, which is an object of the present invention, is possible.

Other Embodiments

The present invention is not limited to the embodiments described above and in the drawings. The following modifications or expansions are possible.

When manual operation of a robot is performed, there may be, to some extent, cases in which a plurality of actions are intentionally performed at the same time in combination. To respond to such cases, the line between operations for performing the actions may be made ambiguous. That is, in this case, the measures taken to clarify the separation of operations for performing the actions may not be performed.

In some of the above-described embodiments, a configuration in which the robot operation apparatus of the present invention is applied to the dedicated teaching pendant 4 used in a robot system is described. However, this is not limited thereto. For example, as a result of a dedicated application (robot operation program) being installed on a general-purpose tablet-type terminal (tablet PC) or smartphone (multiple function mobile phone), functions similar to functions such as those described according to the above-described embodiments can be actualized.

In addition to the four-axis horizontal articulated-type robot 2 and the six-axis vertical articulated-type robot 22 described according to the above-described embodiments, the articulated robot includes, for example, an orthogonal-type robot having a plurality of drive axes. In this case, the drive axis is not limited to a mechanical rotation axis, and includes, for example, a system in which driving is performed by a linear motor.

The robot operation apparatus of the present invention is not limited to the four-axis horizontal articulated-type robot 2 and the six-axis vertical articulated-type robot 22, and can be used to manually operate various robots.

REFERENCE SIGNS LIST

In the drawings, 1 and 21 denote a robot system. 2 and 22 denote a robot. 3 denotes a controller. 4 denotes a teaching pendant (robot operation apparatus). 5 and 25 denote a base. 9 and 31 denote a flange (hand of the robot). 11 denotes a case. 11*a* denotes a gripping portion. 15 denotes a touch operation detecting unit. 16 denotes an action command generating unit, 17 denotes a touch panel. 171 denotes a first area. 172 denotes a second area. 173 denotes a start operation detection area (start operation detecting unit). 174 denotes a movement amount determination area. 175 denotes an action selection area. 18 denotes a selection operation detecting unit, 19 denotes an attitude detecting unit (tilt operation detecting unit). 41 denotes a first button (switching unit). 42 denotes a second button (switching unit).

What is claimed is:

1. A robot operation apparatus comprising:
   a touch panel that receives input of a touch operation from a user;
   a touch operation detecting unit that is capable of detecting a touch operation in a planar direction that is inputted to the touch panel;
   an action command generating unit that generates an action command for operating an articulated robot having a plurality of drive axes, based on a detection result from the touch operation detecting unit; and
   a selection operation detecting unit that detects a selection operation by a user for selecting a drive axis or an action mode of the robot to be operated, wherein
   the action command generating unit is configured to perform:
      an operation determining process for determining the drive axis or the action mode of the robot to be operated based on the selection operation detected by the selection operation detecting unit, and when the touch operation detected by the touch operation detecting unit is a drag operation, determining a movement amount of the drag operation, and
      an action command generating process for determining a movement amount of the robot based on the movement amount of the drag operation determined in the operation determining process, and generating an action command for moving the robot at the drive axis or in the action mode to be operated by the movement amount, and
   the operation determining process includes a process for determining the drive axis or the action mode to be operated based on a number of fingers or an operating direction, or the number of fingers and the operating direction of a drag operation, when the touch operation detected by the selection operation detecting unit is the drag operation.

2. The robot operation apparatus according to claim 1, wherein:
   the operation determining process includes
      a first operation determining process for determining whether or not the detected touch operation is a first operation that is a drag operation by a single finger,
      a second operation determining process for determining whether or not the detected touch operation is a second operation that is a drag operation by two fingers and an operation in a predetermined direction, and
      a third operation determining process for determining whether or not the detected touch operation is a third operation that is a drag operation by two fingers and an operation in a direction differing from that of the second operation; and
   the action command generating process includes
      a horizontal movement action command generating process for generating, when determined that the touch operation is the first operation in the first operation determining process, the action command for moving a hand of the robot in a planar direction that is horizontal to an action reference plane of the robot,
      a vertical movement action command generating process for generating, when determined that the touch operation is the second operation in the second operation determining process, the action command for moving the hand of the robot along a vertical axis direction perpendicular to the action reference plane, and
      a rotation action command generating process for generating, when determined that the touch operation is the third operation in the third operation determining process, the action command for rotating the hand of the robot.

3. The robot operation apparatus according to claim 2, wherein:
   the second operation is a drag operation by two fingers in a linear direction, and an operation in which a distance between the fingers gradually shortens or gradually lengthens during a period in which the drag operation is performed;
   the third operation is a drag operation by two fingers in a circumferential direction; and
   the vertical movement action command generating process includes
      an approaching command generating process for generating, when the second operation is that in which the distance between the fingers gradually lengthens, the action command for moving the hand of the robot in a direction approaching the action reference plane, and
      a separating command generating process for generating, when the second operation is that in which the distance between the fingers gradually shortens, the action command for moving the hand of the robot in a direction away from the action reference plane.

4. The robot operation apparatus according to claim 2, wherein:
   the second operation is an operation in a vertical direction on the touch panel; and
   the third operation is an operation in a lateral direction perpendicular to the vertical direction on the touch panel.

5. The robot operation apparatus according to claim 1, wherein:
   the action command generating unit determines, when a single location of a touch operation is detected, the number of fingers of the touch operation after the elapse of a predetermined allowable delay time from the time of detection.

6. The robot operation apparatus according to claim 1, wherein:
   the action command generating unit extracts, in a touch operation by a plurality of fingers, two fingers of which a distance between touch positions of the fingers is the farthest, among the plurality of fingers, determines that the drag operation is not an operation in a circumferential direction when an angle formed by a vector related to movement of either of the two fingers and a vector between the two fingers is less than a determination threshold, and determines that the drag operation is an operation in a circumferential direction when the angle is the determination threshold or greater.

7. The robot operation apparatus according to claim 1, wherein:
   the action command generating unit disables, when a drag operation is detected, detection of a touch operation in an area within a predetermined range near a touch location by the touch operation, over a period until the drag operation is completed.

8. The robot operation apparatus according to claim 1, wherein:
the touch panel is divided into a first area and a second area in which an operation in a single direction or in two directions that are perpendicular to each other can be detected by the touch operation detecting unit; and
the action command generating unit generates action commands for a drive axis or an action mode that differ between when a drag operation detected by the touch operation detecting unit is performed in the first area and when the drag operation is performed in the second area.

9. The robot operation apparatus according to claim 1, wherein:
the action command generating unit is capable of performing
an operation determining process for determining, when a touch operation detected by the touch operation detecting unit is a drag operation, a movement amount of a finger in the drag operation,
a speed calculating process for calculating a movement speed of the robot based on the movement amount of the finger detected in the operation determining process, and
an action command generating process for generating an action command for moving the robot at the movement speed calculated in the speed calculating process.

10. The robot operation apparatus according to claim 9, wherein:
the action command generating unit is capable of performing a movement amount calculating process for calculating a movement distance of the robot based on the movement amount of the finger; and
the speed calculating process is a process for determining a movement speed of the robot based on a value obtained by the movement amount of the finger being divided by an amount of time required for input of the drag operation.

11. The robot operation apparatus according to claim 9, wherein:
the action command generating unit is capable of performing the operation determining process, the speed calculating process, and the action command generating process at a certain cycle, while the drag operation is being performed.

12. The robot operation apparatus according to claim 1, wherein:
the action command generating unit is capable of performing
an operation determining process for determining a movement amount of a finger in a drag operation detected by the touch operation detecting unit, and
a movement amount determining process for setting, regarding a scaling factor for determining a movement amount of the robot by increasing or decreasing the movement amount of the finger determined in the operation determining process, the scaling factor from an operation start point until the drag operation passes a first segment to a first scaling factor that is a fixed value less than 1, sets the scaling factor after the drag operation passes the first segment to a value greater than the first scaling factor, and determining the movement amount of the robot.

13. The robot operation apparatus according to claim 12, wherein:
the movement amount determining process is a process for setting the scaling factor after the movement of the finger in the drag operation passes the first segment until the movement passes a second segment to a second scaling factor, setting the scaling factor after the movement of the finger in the drag operation passes the second segment to a third value that is a fixed value, and determining the movement amount of the robot; and
the second scaling factor is a value within a range from the first scaling factor to the third scaling factor that continuously increases depending on the movement amount of the finger in the drag operation.

14. The robot operation apparatus according to claim 1, wherein:
the touch operation detecting unit
detects a touch operation on a touch panel provided in a case that can be held by the user, and
excludes, from a detection target, a touch operation in an area of a predetermined range adjacent to a gripping portion that is expected to be gripped when the user holds the case.

15. A robot operation apparatus comprising:
a touch panel that receives input of a touch operation from a user;
a touch operation detecting unit that is capable of detecting a touch operation in a planar direction that is inputted to the touch panel;
an action command generating unit that generates an action command for operating an articulated robot having a plurality of drive axes, based on a detection result from the touch operation detecting unit; and
a selection operation detecting unit that detects a selection operation by a user for selecting a drive axis or an action mode of the robot to be operated, wherein
the action command generating unit is configured perform
an operation determining process for determining the drive axis or the action mode of the robot to be operated based on the selection operation detected by the selection operation detecting unit, and when the touch operation detected by the touch operation detecting unit is a drag operation, determining a movement amount of the drag operation, and
an action command generating process for determining a movement amount of the robot based on the movement amount of the drag operation determined in the operation determining process, and generating an action command for moving the robot at the drive axis or in the action mode to be operated by the movement amount, and
the action command generating process includes a drive axis selecting process for selecting a single drive axis to be driven, among the plurality of drive axes, based on a number of fingers or an operating direction, or the number of fingers and the operating direction of a drag operation, when the detected touch operation is a drag operation by a finger.

16. The robot operation apparatus according to claim 15, wherein
the drive axis selecting process includes
a first drive axis selecting process for selecting, when the operating direction of the drag operation is a vertical direction on the touch panel, a single drive axis to be driven, among drive axes of a first group that move the hand of the robot in a vertical direction in relation to the action reference plane, based on the number of fingers of the drag operation; and
a second drive axis selecting process for selecting, when the operating direction of the drag operation is a lateral direction perpendicular to the vertical direction, or a circumferential direction on the touch panel, a single drive axis to be driven, among drive axes other than the drive axes of the first group, based on the number of fingers of the drag operation.

17. The robot operation apparatus according to claim 15, wherein:
the drive axis selecting process determines the drive axis to be driven by transitioning from a drive axis on a base side of the robot to a drive axis on the hand side, in accompaniment with increase in the number of fingers of the drag operation.

18. The robot operation apparatus according to claim 15, wherein:
the drive axis selecting process determines the drive axis to be driven by transitioning from a drive axis on the hand side of the robot to a drive axis on the base side, in accompaniment with increase in the number of fingers of the drag operation.

19. A robot operation apparatus comprising:
a touch panel that receives input of a touch operation from a user;
a touch operation detecting unit that is capable of detecting a touch operation in a planar direction that is inputted to the touch panel;
an action command generating unit that generates an action command for operating an articulated robot having a plurality of drive axes, based on a detection result from the touch operation detecting unit; and
a selection operation detecting unit that detects a selection operation by a user for selecting a drive axis or an action mode of the robot to be operated, wherein
the action command generating unit is configured to perform
an operation determining process for determining the drive axis or the action mode of the robot to be operated based on the selection operation detected by the selection operation detecting unit, and when the touch operation detected by the touch operation detecting unit is a drag operation, determining a movement amount of the drag operation, and
an action command generating process for determining a movement amount of the robot based on the movement amount of the drag operation determined in the operation determining process, and generating an action command for moving the robot at the drive axis or in the action mode to be operated by the movement amount, and
the action command generating unit assigns directions of the drag operation such as to be a differing direction for each drive axis or action mode of the robot.

20. A robot operation apparatus comprising:
a touch panel that receives input of a touch operation from a user;
a touch operation detecting unit that is capable of detecting a touch operation in a planar direction that is inputted to the touch panel;
an action command generating unit that generates an action command for operating an articulated robot having a plurality of drive axes, based on a detection result from the touch operation detecting unit; and
a switching unit that is capable of switching between a main operation and a sub-operation, the main operation being an operation for operating, among the plurality of drive axes or action modes of the robot, a drive axis or an action mode contributing to a position of a hand of the robot, and the sub-operation being an operation for operating a drive axis or an action mode contributing to an attitude of the hand of the robot,
wherein:
the touch panel is divided into a first area and a second area in which an operation in a single direction or in two directions that are perpendicular to each other can be detected by the touch operation detecting unit; and
the action command generating unit generates action commands for a drive axis or an action mode that differ between when a drag operation detected by the touch operation detecting unit is performed in the first area and when the drag operation is performed in the second area.

21. A robot operation apparatus comprising:
a touch panel that receives input of a touch operation from a user;
a touch operation detecting unit that is capable of detecting a touch operation in a planar direction that is inputted to the touch panel;
a tilt operation detecting unit that is capable of detecting input of a tilt operation by the user by detecting a tilt of the touch panel; and
an action command generating unit that generates an action command for operating an articulated robot having a plurality of drive axes, wherein
the action command generating unit is capable of performing
a horizontal movement action command generating process for generating the action command for moving a hand of the robot in a planar direction that is horizontal to an action reference plane of the robot, based on the touch operation detected by the touch operation detecting unit, and
a vertical movement action command generating process for generating the action command for moving the hand of the robot along a vertical axis direction perpendicular to the action reference plane, based on the tilt operation detected by the tilt operation detecting unit.

22. The robot operation apparatus according to claim 21, wherein:
the action command generating unit increases or decreases a movement speed or a movement amount of the robot based on a tilt amount of the tilt operation detected by the tilt operation detecting unit.

23. A robot system characterized by comprising:
a four-axis, horizontal, articulated robot;
a controller that controls an action of the robot; and
a robot operation apparatus, the robot operation apparatus comprising:
a touch panel that receives input of a touch operation from a user;
a touch operation detecting unit that is capable of detecting a touch operation in a planar direction that is inputted to the touch panel;
an action command generating unit that generates an action command for operating an articulated-type robot having a plurality of drive axes, based on a detection result from the touch operation detecting unit; and a selection operation detecting unit that detects a selection operation by a user for selecting a drive axis or an action mode of the robot to be operated, wherein the action command generating unit is configured to perform an operation determining process for determining the drive axis or the action mode of the robot to be operated based on the selection operation detected by the selection operation detecting unit, and when the touch operation detected by the touch operation detecting unit is a drag operation, determining a movement amount of the drag operation, and an action command generating process for determining a movement amount of the robot based on the movement amount of the drag operation determined in the operation determining process, and generating an action command for moving the robot at the drive axis or in the action mode to be operated by the movement amount, and the operation determining process includes a process for determining the drive axis or the action mode to be operated based on a number of fingers or an operating direction, or the number of fingers and the operating direction of a drag operation, when the touch operation detected by the selection operation detecting unit is the drag operation.

24. A robot system characterized by comprising:
a six-axis, vertical, articulated robot;
a controller that controls an action of the robot; and
a robot operation apparatus, the robot operation apparatus comprising:
a touch panel that receives input of a touch operation from a user;
a touch operation detecting unit that is capable of detecting a touch operation in a planar direction that is inputted to the touch panel;
an action command generating unit that generates an action command for operating an articulated-type robot having a plurality of drive axes, based on a detection result from the touch operation detecting unit; and
a selection operation detecting unit that detects a selection operation by a user for selecting a drive axis or an action mode of the robot to be operated, wherein the action command generating unit is configured to perform an operation determining process for determining the drive axis or the action mode of the robot to be operated based on the selection operation detected by the selection operation detecting unit, and when the touch operation detected by the touch operation detecting unit is a drag operation, determining a movement amount of the drag operation, and an action command generating process for determining a movement amount of the robot based on the movement amount of the drag operation determined in the operation determining process, and generating an action command for moving the robot at the drive axis or in the action mode to be operated by the movement amount, and the operation determining process includes a process for determining the drive axis or the action mode to be operated based on a number of fingers or an operating direction, or the number of fingers and the operating direction of a drag operation, when the touch operation detected by the selection operation detecting unit is the drag operation.

25. A robot operation program previously stored in a non-transitory computer-readable storage and executed by a computer which has read the program from the storage, the computer being included in a robot operation apparatus, wherein:

the robot operation apparatus includes
a touch panel that receives input of a touch operation from a user,
a touch operation detecting unit that is capable of detecting a touch operation in a planar direction that is inputted to the touch panel, and
a tilt operation detecting unit that is capable of detecting input of a tilt operation by the user by detecting a tilt of the touch panel; and the program enables the computer to perform
a horizontal movement action command generating process for generating an action command for moving a hand of an articulated robot having a plurality of drive axes in a planar direction that is horizontal to an action reference plane of the robot, based on the touch operation detected by the touch operation detecting unit, and
a vertical movement action command generating process for generating the action command for moving the hand of the robot along a vertical axis direction that is perpendicular to the action reference surface, based on the tilt operation detected by the tilt operation detecting unit.

\* \* \* \* \*